US009897904B2

(12) United States Patent
Nishi et al.

(10) Patent No.: US 9,897,904 B2
(45) Date of Patent: Feb. 20, 2018

(54) LIGHT SOURCE DEVICE, DUST COLLECTING MEMBER, AND PROJECTOR

(71) Applicant: SEIKO EPSON CORPORATION, Tokyo (JP)

(72) Inventors: Toshizo Nishi, Azumino (JP); Masahiro Saito, Shiojiri (JP); Toshihiko Nagumo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 66 days.

(21) Appl. No.: 15/317,667

(22) PCT Filed: Jul. 8, 2015

(86) PCT No.: PCT/JP2015/003430
§ 371 (c)(1),
(2) Date: Dec. 9, 2016

(87) PCT Pub. No.: WO2016/009618
PCT Pub. Date: Jan. 21, 2016

(65) Prior Publication Data
US 2017/0108764 A1    Apr. 20, 2017

(30) Foreign Application Priority Data

Jul. 15, 2014  (JP) .................................. 2014-145425
Jan. 28, 2015  (JP) .................................. 2015-014824
Jan. 28, 2015  (JP) .................................. 2015-014825

(51) Int. Cl.
G03B 21/16        (2006.01)
H04N 9/31         (2006.01)
(Continued)

(52) U.S. Cl.
CPC ........ *G03B 21/2086* (2013.01); *F21V 29/503* (2015.01); *F21V 29/677* (2015.01); *G03B 21/005* (2013.01); *G03B 21/16* (2013.01)

(58) Field of Classification Search
CPC .. G03B 21/16; G03B 21/145; G03B 21/2086; H04N 9/3144; F21V 29/503; F21V 29/677; H01J 61/52; H01J 61/523; H01J 61/526
(Continued)

(56) References Cited

U.S. PATENT DOCUMENTS 8,322,861 B2 * 12/2012 Tsai ........................ F21V 29/02
                                                      353/52
2009/0027627 A1 * 1/2009 Noda ..................... G03B 21/16
                                                      353/61
(Continued)

FOREIGN PATENT DOCUMENTS

JP        2013-117742 A      6/2013

*Primary Examiner* — Ryan Howard
(74) *Attorney, Agent, or Firm* — Oliff PLC

(57) ABSTRACT

A light source which has a housing accommodating a light source lamp and having an exhaust port, a duct, and a fan are provided. The duct has an inlet facing the exhaust port, a branching part which branches air from the inlet, a duct part extending in a first direction orthogonal to an opening plane of the exhaust port, and a duct part extending in a second direction intersecting with the first direction. The fan is arranged in a position for sucking the air circulating through the duct part. The duct part has a plurality of sidewall parts, an opening, and a mesh.

22 Claims, 30 Drawing Sheets

(51) Int. Cl.
*G03B 21/20* (2006.01)
*G03B 21/00* (2006.01)
*F21V 29/503* (2015.01)
*F21V 29/67* (2015.01)

(58) Field of Classification Search
USPC ......... 353/61, 57, 58, 60; 362/294, 345, 373
See application file for complete search history.

(56) References Cited

U.S. PATENT DOCUMENTS

2009/0268170 A1* 10/2009 Nakashita .............. G03B 21/16
353/61
2010/0103382 A1 4/2010 Onodera et al.

* cited by examiner

LIGHT SOURCE DEVICE, DUST COLLECTING MEMBER, AND PROJECTOR

TECHNICAL FIELD

The present invention relates to a light source device and a projector.

BACKGROUND ART

Traditionally, a projector which forms an image corresponding to image information by modulating light emitted from a light source device and projects the image in an enlarged manner on a projection target surface such as a screen is known. In a projector like this, a light source device which has a light source lamp such as an ultra-high-pressure mercury lamp, and a housing for accommodating the light source lamp inside, is often used.

Here, the light source lamp can burst due to deterioration with time. In this case, the light source needs to be replaced and it is also necessary to prevent fragments of the light source lamp from being scattered outside. To this end, a light source in which a mesh is provided at an inlet for introducing cooling air into the housing and at an outlet for discharging the cooling air out of the housing is known (see PTL 1, for example).

CITATION LIST

Patent Literature

PTL 1: JP-A-2013-117742

SUMMARY OF INVENTION

Technical Problem

Here, relatively large fragments of the light source lamp can be restrained from being scattered outside the housing by the mesh. However, relatively small fragments (dust) may pass through the meshes due to the blast pressure when the light source lamp bursts. It is conceivable that the mesh should be finer in order to restrain such fragments from being scattered outside the projector at the time of replacing the light source device or the like.

However, if the mesh is made finer, the resistance of air passing through the mesh becomes higher, thus causing a problem that the discharge efficiency of the air which has cooled the light source lamp drops and hence the cooling efficiency of the light source lamp drops.

Particularly, many recent projectors employ a light source lamp with high emission luminance, and with this, the temperature of the light source lamp when lit is higher than before. Based on this, the problem due to the drop in cooling efficiency becomes significant.

The invention is aiming to solve at least a part of the foregoing problems, and an object of the invention is to provide alight source device, a dust collecting member, and a projector in which fragments of the light lamp at the time of rupture can be restrained from being scattered while the drop in the cooling efficiency of the light source lamp is restrained

Solution to Problem

A projector according to a first aspect of the invention includes: a light source device having a light source lamp and a housing for accommodating the light source lamp inside; a duct through which air discharged from the housing circulates; and a fan which discharges the air circulating through the duct, to outside the duct. The housing has an exhaust port for discharging the air in the housing. The duct includes: an inlet which faces the exhaust port and introduces the air discharged from the exhaust port into the duct; a branching part which branches the air introduced from the inlet; a first duct part which extends along a first direction that is a direction orthogonal to an opening plane connecting an edge of the exhaust port and also heading toward the inlet from the exhaust port, and through which the air introduced from the inlet can circulate via the branching part; and a second duct part which extends from the branching part, along a second direction intersecting with the first direction, and through which the air introduced from the inlet can circulate via the branching part. The fan is arranged at a position for sucking the air circulating through the second duct part. The first duct part includes: a plurality of sidewall parts forming the first duct part; an opening which is formed at least in one of the plurality of sidewall parts and through which the air circulating through the first duct part is discharged out of the first duct part; and a mesh covering the opening.

Here, in the state where the light source lamp has not ruptured, the air discharged from the exhaust port of the housing is introduced into the duct from the inlet facing the exhaust port. This air is sucked by the fan, thus circulates through the second duct part from the branching part, and is discharged out of the duct by the fan. In this way, the air discharged from the housing is sucked by the fan, circulates through the duct, and is discharged out of the duct.

Meanwhile, in the case where the light source lamp has ruptured, air containing fragments (dust) of the light source lamp is discharged from the exhaust port and introduced into the duct via the inlet. Since the exhaust pressure of this air from the exhaust port is increased by the blast pressure generated at the time of the rupture of the light source lamp, the air travels straight in the first direction orthogonal to the opening plane of the exhaust port and flows into the first duct part via the branching part. Since an opening is formed in at least one of the plurality of sidewall parts forming this first duct part, the air flowing into the first duct part is discharged out of the first duct part via the opening. When this air passes through the mesh covering the opening, the fragments are captured by the mesh and retained inside the first duct part. Thus, the fragments are restrained from being scattered.

Thus, since small fragments of the light source lamp can be restrained from being scattered without making finer the foregoing mesh provided in the light source device, the fragments of the light source lamp can be restrained from being scattered without lowering the cooling efficiency of the light source device.

Also, the light source device is generally configured to be replaceable. However, if a configuration to restrain the scattering of not only large fragments but also small fragments of the light source lamp is provided in the light source device, not only the light source device tends to be expensive but also there is a risk of a drop in the cooling efficiency of the light source lamp, as described above. Moreover, if such a configuration is provided in the light source device, the light source device increases in complexity and size.

In contrast, if the duct has the configuration to restrain the scattering of the fragments, the configuration to capture the fragments need not be provided in the light source device. Therefore, the light source device can be configured inexpensively without lowering cooling efficiency, and the increase in the complexity and size of the light source device can be restrained as well.

In the first aspect, it is preferable that the opening is a duct-side exhaust port through which the air circulating through the first duct part is discharged out of the duct.

According to the first aspect, the air which has circulated through the first duct part is discharged out of the duct via the opening. Thus, the fragments of the light source lamp retained within the first duct part can be restrained from being sucked by the fan and scattered out of the first duct part. Also, even if very small fragments pass through the opening with the air, the fragments are discharged out of the duct and therefore can be restrained from being sucked by the fan and discharged out of the projector. In addition, since the fragments are less likely to be located near the light source device, the fragments can be restrained from being scattered at the time of replacing the light source device.

In the first aspect, it is preferable that the mesh is arranged in a position substantially orthogonal to the first direction.

According to the first aspect, the device can be configured in such a way that the air, carrying the fragments at the time of the rupture of the light source lamp and being discharged along the first direction from the exhaust port, securely passes through the mesh, thus making it easier to capture the fragments by the mesh. Therefore, the fragments of the light source lamp can be further restrained from being discharged out of the projector.

In the first aspect, it is preferable that the opening is formed in the shape of a slit on one end side of the sidewall part substantially orthogonal to the first direction, of the plurality of sidewall parts, and that the mesh is located on the side opposite to the first direction from the opening.

According to the first aspect, since the opening is formed in the shape of a slit, even if the light of the light source lamp leaks from the exhaust port of the housing, the light can be restrained from leaking out of the duct, compared with the case where the opening is formed in the entire sidewall part.

Also, the mesh is located on the side opposite to the first direction from the opening, that is, upstream in the flow of the air passing through the opening. Thus, the captured fragments can be retrained within the duct more easily than in the case where the mesh is located downstream. Therefore, the fragments can be securely restrained from being discharged out of the duct.

In the first aspect, it is preferable that the first duct part extends along the second direction after extending in the first direction, and that the opening is formed in the sidewall part located on the side of the second direction, of the plurality of sidewall parts, and connects the first duct part to the second duct part.

Here, in the case where the light source lamp has not ruptured, the air discharged from the exhaust port of the light source device circulates through the second duct part and is sucked by the fan. Meanwhile, in the case where the light source lamp has ruptured, the air discharged from the light source device due to the blast pressure circulates through the first duct part, and flows into the second duct part connected to the first duct part via the opening after the fragments are captured by the mesh.

Thus, the device can be configured in such a way that the air introduced into the duct from the inlet circulates through the second duct part both in the case where the light source lamp has ruptured and in the case where the light source lamp has not ruptured. Thus, both in the case where the light source lamp has ruptured and in the case where the light source lamp has not ruptured, the air introduced into the duct from the inlet can be discharged out of the duct by the fan. That is, the discharge flow paths of the introduced air can be unified. Therefore, the configuration of the duct can be simplified, compared with the configuration in which the air circulating through the first duct part (for example, the air discharged due to the blast pressure when the light source lamp ruptures) and the air circulating through the second duct part (for example, the air which has cooled the light source lamp) are respectively discharged out of the duct from different openings.

A light source device according to a second aspect of the invention includes a light source lamp and a light source casing in which the light source lamp is accommodated. The light source casing includes a main body part having an accommodation space where the light source lamp is accommodated, and an air guide part which guides air in the accommodation space to outside. The main body part has an outflow port through which the air in the accommodation space flows out. The air guide part includes: a branching part which branches the air introduced from the outflow port; a first duct part which extends along a first direction orthogonal to an opening plane connecting an edge of the outflow port, and through which the air introduced into the air guide part can circulate via the branching part; and a second duct part which extends from the branching part, along a second direction intersecting with the first direction, and through which the air introduced into the air guide part can circulate via the branching part. The first duct part includes: a plurality of sidewall parts forming the first duct part; a first opening which is formed at least in one of the plurality of sidewall parts and allows the air circulating through the first duct part to circulate outside the first duct part; and a mesh covering the first opening. The second duct part includes a second opening which allows the air circulating therein to circulate outside the second duct part.

According to the second aspect, the air discharged from the outflow port of the main body part, that is, the air in the accommodation space where the light source lamp is accommodated, is guided into the air guide part from an inlet.

Here, in states other than the time of rupture of the light source lamp (the state where the light source lamp has not ruptured or the state after the rupture of the light source lamp), the exhaust pressure from the outflow port is relatively not high. Therefore, by sucking, by a fan or the like, the air which has circulated through the second duct part, the air which has cooled the light source lamp can be discharged out of the air guide part and hence out of the light source casing.

Meanwhile, at the time of rupture of the light source lamp, the air containing dust such as fragments of the light source lamp or the like flows into the air guide part from the outflow port. At this time, since the exhaust pressure from the outflow port becomes relatively high due to the blast pressure generated by the rupture of the light source lamp, the air introduced into the air guide part circulates in the first direction orthogonal to the opening plane of the outflow port and flows into the first duct part from the branching part. Since the first opening is formed at least in one of the plurality of sidewall parts forming this first duct part, the air flowing into the first duct part is discharged out of the first duct part via the first opening. When this air passes through the first opening, the dust is captured by the mesh covering the first opening. Thus, since the dust is retained within the first duct part, the scattering of the dust (fragments of the light source lamp) outside the air guide part is restrained.

Thus, even in the case where another mesh is provided at the outflow port, small fragments of the light source lamp can be restrained from being scattered outside the light source device without making this another mesh finer. Therefore, the scattering of the fragments can be restrained without lowering the cooling efficiency of the light source lamp.

In the second aspect, it is preferable that the first opening is formed in the sidewall part substantially orthogonal to the first direction, of the plurality of sidewall parts forming the first duct part, and discharges the air circulating through the first duct part, out of the light source casing along the first direction.

Also, the state substantially orthogonal to the first direction includes a state orthogonal to the first direction and a state slightly tilted from the state orthogonal to the first direction.

Here, due to the blast pressure generated at the time of rupture of the light source lamp, the air in the accommodation space, that is, the air containing the dust, tends to flow into the first duct part extending in the first direction via the outflow port, the inlet, and the branching part. The first opening provided in this first duct part is formed in the sidewall part and discharges the air circulating through the first duct part, out of the light source casing along the first direction. Thus, since the air circulating through the first duct part can be quickly discharged from the first opening, the air circulating through the first duct part can be restrained from flowing backward by being blasted against the sidewall part. Therefore, the air containing the dust can be restrained from circulating toward the second duct part, and the dust can be restrained from being discharged out of the light source casing.

In the second aspect, it is preferable that the first opening is formed in the shape of a slit, and that the mesh is located on the side opposite to the first direction from the first opening.

Here, in the case where the light of the light source lamp in the main body part leaks outside the main body part via the outflow port, if the first opening is formed substantially on the entire surface of the sidewall part orthogonal to the first direction, the light travels in the first direction and can leak outside the air guide part via the first opening and hence outside the light source casing.

In contrast, according to the second aspect, since the first opening is formed in the shape of a slit, the opening area of the first opening can be reduced. Therefore, even if the light leaks outside the main body part via the outflow port, the light can be restrained from leaking outside the air guide part and hence outside the light source casing.

Also, the mesh is located on the side opposite to the first direction from the first opening, that is, upstream in the direction of circulation of the air passing through the first opening. Thus, the captured dust can be retained in the first duct part more easily than in the case where the mesh is located downstream. Therefore, the dust containing fragments of the light source lamp can be securely restrained from being discharged out of the light source casing.

In the second aspect, it is preferable that the mesh is arranged in a position substantially orthogonal to the first direction.

According to the second aspect, since the device can be configured in such a way that the air, containing the dust at the time of rupture of the light source lamp and discharged along the first direction from the outflow port, securely passes through the mesh, thus making it easier to capture the dust by the mesh. Therefore, the fragments of the light source lamp can be further restrained from being discharged out of the first duct part and hence out of the light source casing.

In the second aspect, it is preferable that the first duct part extends along the second direction after extending in the first direction, that the first opening is formed in the sidewall part located on the side of the second direction, of the plurality of sidewall parts forming the first duct part, and that the mesh is arranged in a position substantially orthogonal to the second direction.

According to the second aspect, the air discharged in the first direction from the outflow port due to the blast pressure generated by the rupture of the light source lamp circulates in the first direction through the first duct part and subsequently circulates in the second direction orthogonal to the first direction. Then, the air which has circulated through the first duct part, passing through the first opening formed in the sidewall part located on the side of the second direction in the first duct part, and through the mesh, is discharged out of the first duct part.

Thus, since the shape of the first duct part on the terminal end side in the flow path of the air circulating through the first duct part is a cul-de-sac, the dust captured by the mesh can be retained in the first duct part more easily. Therefore, the dust containing fragments of the light source lamp can be securely restrained from being discharged out of the light source casing.

In the second aspect, it is preferable that the device has an integrating part where the air which has circulated through the first duct part and has passed through the mesh and the air which has circulated through the second duct part are integrated together, and that the integrating part has an exhaust port through which the air flowing therein is discharged out of the light source casing.

According to the second aspect, the air which has circulated through the first duct part and the air which has circulated through the second duct part can be integrated together and discharged from the exhaust port. Therefore, the configuration of the duct or the like in which the air discharged from the air guide part is introduced can be simplified, compared with the case where the air which has circulated through the first duct part and the air which has circulated through the second duct part are discharged from different sites in the air guide part.

Also, in the case where another mesh is provided at the exhaust port, even if the dust captured by the mesh moves toward the second duct part when the light source device is moved or the like, the dust can be restrained from being scattered out of the air guide part from the exhaust port and hence out of the light source casing, by this another mesh.

In the second aspect, it is preferable that the air guide part is provided in attachable/detachable manner to the main body part.

According to the second aspect, since the air guide part is attachable to and detachable from the main body part, the air guide part in which the dust containing fragments of the light source lamp is retained can be detached from the main body part. Therefore, the light source device can be manufactured by replacing the air guide part with the replacement of the light source lamp. Thus, the reusability and recyclability of the light source device can be improved.

A projector according to a third aspect of the invention includes: the light source device according to the second aspect; a light modulation device which modulates light emitted from the light source device; a projection optical device which projects the light modulated by the light modulation device; and an exterior casing forming an exterior. The light source device is arranged in an attachable/detachable manner inside the exterior casing.

According to the third aspect, effects similar to those of the light source device according to the second aspect can be achieved. Also, since the light source device is arranged in an attachable/detachable manner in a position inside the exterior casing, when the light source lamp ruptures, fragments of the light source lamp will not be scattered and the light source device can be replaced with a new light source device.

In the third aspect, it is preferable that a duct and a fan, each arranged inside the exterior casing, are provided, that the exterior casing has a casing-side exhaust port through which inside air is discharged, that the duct connects the air guide part to the casing-side exhaust port, and that the fan is arranged in the duct and discharges the air which has circulated through the air guide part out of the exterior casing from the casing-side exhaust port.

According to the third aspect, by driving the fan in the duct connecting the air guide part to the casing-side exhaust port, the air inside the accommodation space (for example, the air which has cooled the light source lamp) can be sucked and the air can be discharged out of the exterior casing via the casing-side exhaust port. Thus, the cooling efficiency of the light source lamp can be improved.

A dust collecting member according to a fourth aspect of the invention is a dust collecting member used when incorporated in a projector which includes a light source lamp and a light source device having a light source casing for accommodating the light source lamp. The dust collecting member is to collect dust from air flowing in from the light source casing. The dust collecting member includes: an inlet through which air flowing out from an outflow port of the light source casing is introduced; a branching part which branches the air introduced from the inlet; a first duct part which extends along a first direction orthogonal to an opening plane connecting an edge of the outflow port, and through which the air introduced from the inlet can circulate via the branching part; and a second duct part which extends from the branching part, along a second direction intersecting with the first direction, and through which the air introduced from the inlet can circulate via the branching part. The first duct part includes: a plurality of sidewall parts forming the first duct part; a first opening which is formed at least in one of the plurality of sidewall parts and allows the air circulating through the first duct part to circulate outside the first duct part; and a mesh covering the first opening. The second duct part includes a second opening which allows the air circulating therein to circulate outside the second duct part.

According to the fourth aspect, the air flowing out from the outflow port of the light source casing is introduced into the dust collecting member from the inlet.

Here, in states other than the time of rupture of the light source lamp (the state where the light source lamp has not ruptured or the state after the rupture of the light source lamp), the exhaust pressure from the outflow port is relatively not high. Therefore, by sucking, by a fan or the like, the air which has circulated through the second duct part, for example, the air which has cooled the light source lamp can be discharged out of the dust collecting member.

Meanwhile, at the time of rupture of the light source lamp, the air containing dust such as fragments of the light source lamp or the like flows into the dust collecting member from the outflow port. At this time, since the exhaust pressure from the outflow port is relatively high due to the blast pressure generated by the rupture of the light source lamp, the air introduced into the dust collecting member circulates in the first direction orthogonal to the opening plane of the outflow port and flows into the first duct part from the branching part. Since the first opening is formed at least in one of the plurality of sidewall parts forming this first duct part, the air flowing into the first duct part is discharged out of the first duct part via the first opening. When this air passes through the first opening, the dust is captured by the mesh covering the first opening. Thus, since the dust is retained within the first duct part, the scattering of the dust (fragments of the light source lamp) outside the dust collecting member is restrained.

Thus, even in the case where another mesh is provided at the outflow port, small fragments of the light source lamp can be restrained from being scattered outside the dust collecting member without making this another mesh finer. Therefore, the scattering of the fragments can be restrained without lowering the cooling efficiency of the light source lamp.

In the fourth aspect, it is preferable that the first opening is formed in the sidewall part substantially orthogonal to the first direction, of the plurality of sidewall parts forming the first duct part, and discharges the air circulating through the first duct part, out of the dust collecting member along the first direction.

Also, the state substantially orthogonal to the first direction includes a state orthogonal to the first direction and a state slightly tilted from the state orthogonal to the first direction.

Here, due to the blast pressure generated at the time of rupture of the light source lamp, the air in the light source casing, that is, the air containing the dust, tends to flow into the first duct part extending in the first direction via the outflow port of the light source casing, and the inlet and the branching part of the dust collecting member. The first opening provided in this first duct part is formed in the sidewall part substantially orthogonal to the first direction and discharges the air circulating through the first duct part, out of the dust collecting member along the first direction. Thus, since the air circulating through the first duct part can be quickly discharged from the first opening, the air circulating through the first duct part can be restrained from flowing backward by being blasted against the sidewall part. Therefore, the air containing the dust can be restrained from circulating toward the second duct part, and the dust can be restrained from being discharged out of the dust collecting member.

In the fourth aspect, it is preferable that the first opening is formed in the shape of a slit, and that the mesh is located on the side opposite to the first direction from the first opening.

Here, in the case where the light of the light source lamp leaks outside from the outflow port, if the first opening is formed substantially on the entire surface of the sidewall part orthogonal to the first direction, the leaking light travels in the first direction and can leak outside the dust collecting member via the first opening.

In contrast, according to the fourth aspect, since the first opening is formed in the shape of a slit, the opening area of the first opening can be reduced. Therefore, even if the light leaks outside the light source casing part via the outflow port, the light can be restrained from leaking outside the dust collecting member.

Also, the mesh is located on the side opposite to the first direction from the first opening, that is, upstream in the direction of circulation of the air passing through the first opening. Thus, the captured dust can be retained in the first duct part more easily than in the case where the mesh is located downstream. Therefore, the dust containing fragments of the light source lamp can be securely restrained from being discharged out of the dust collecting member.

In the fourth aspect, it is preferable that the mesh is arranged in a position substantially orthogonal to the first direction.

According to the fourth aspect, since the dust collecting member can be configured in such a way that the air, containing the dust at the time of rupture of the light source lamp and discharged along the first direction from the outflow part, securely passes through the mesh, thus making it easier to capture the dust by the mesh. Therefore, the fragments of the light source lamp can be further restrained from being discharged out of the first duct part and hence out of the dust collecting member.

In the fourth aspect, it is preferable that the first duct part extends along the second direction after extending in the first direction, that the first opening is formed in the sidewall part located on the side of the second direction, of the plurality of sidewall parts forming the first duct part, and that the mesh is arranged in a position substantially orthogonal to the second direction.

According to the fourth aspect, the air discharged in the first direction from the outflow port due to the blast pressure generated by the rupture of the light source lamp circulates in the first direction through the first duct part and subsequently circulates in the second direction orthogonal to the first direction. Then, the air which has circulated through the first duct part, passing through the first opening formed in the sidewall part located on the side of the second direction in the first duct part, and through the mesh, is discharged out of the first duct part.

Thus, since the shape of the first duct part on the terminal end side in the flow path of the air circulating through the first duct part is a cul-de-sac, the dust captured by the mesh can be retained in the first duct part more easily. Therefore, the dust containing fragments of the light source lamp can be securely restrained from being discharged out of the dust collecting member.

In the fourth aspect, it is preferable that an integrating part where the air which has circulated through the first duct part and has passed through the mesh and the air which has circulated through the second duct part are integrated together is provided, and that the integrating part has an exhaust port through which the air flowing therein is discharged out of the dust collecting member.

According to the fourth aspect, the air which has circulated through the first duct part and the air which has circulated through the second duct part can be integrated together and discharged from the exhaust port. Therefore, the configuration of the duct or the like in which the air discharged from the dust collecting member is introduced can be simplified, compared with the case where the air which has circulated through the first duct part and the air which has circulated through the second duct part are discharged from different sites in the dust collecting member.

Also, in the case where another mesh is provided at the exhaust port, even if the dust captured by the mesh moves toward the second duct part when the dust collecting member is moved or the like, the dust can be restrained from being scattered out of the dust collecting member from the exhaust port.

A projector according to a fifth aspect of the invention includes: an exterior casing forming an exterior; a light source device; a light modulation device which modulates light emitted from the light source device; a projection optical device which projects the light modulated by the light modulation device; and the dust collecting member according to the fourth aspect. The light source device includes a light source lamp, and a light source casing which accommodates the light source lamp and has an exhaust port through which air that has cooled the light source lamp is discharged. The dust collecting member is installed in an attachable/detachable manner in a position inside the exterior casing in which the air discharged from the exhaust port is introduced via the inlet.

According to the fifth aspect, effects similar to those of the dust collecting member according to the fourth aspect can be achieved. Also, since the dust collecting member is arranged in an attachable/detachable manner in a position inside the exterior casing, when the light source lamp ruptures, the dust collecting member can be replaced along with the light source device. Thus, the inside of the exterior casing can be kept clean.

In the fifth aspect, it is preferable that a duct and a fan, each arranged inside the exterior casing, are provided, that the exterior casing has a casing-side exhaust port through which inside air is discharged, that the duct connects the dust collecting member to the casing-side exhaust port, and that the fan is arranged in the duct and discharges the air which has circulated through the dust collecting member out of the exterior casing from the casing-side exhaust port.

According to the fifth aspect, by driving the fan in the duct connecting the dust collecting member to the casing-side exhaust port, the air inside the light source casing (for example, the air which has cooled the light source lamp) can be sucked and the air can be discharged out of the exterior casing via the casing-side exhaust port. Thus, the cooling efficiency of the light source lamp can be improved.

DESCRIPTION OF EMBODIMENTS

[First Embodiment]

Hereinafter, a first embodiment of the invention will be described on the basis of the drawings.

[Schematic Configuration of Projector]

Figure 1:
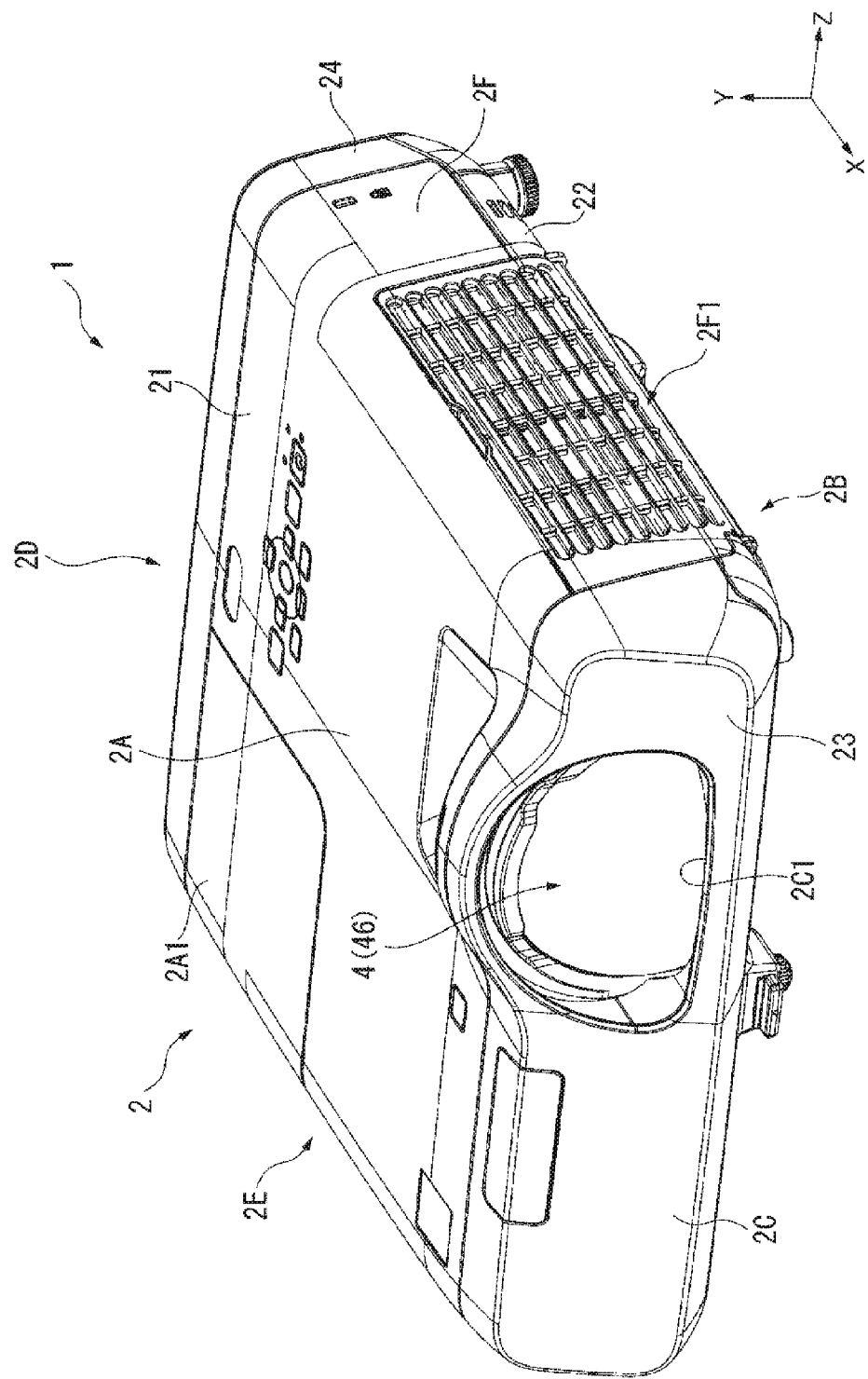
FIG. 1 is a perspective view showing a projector according to a first embodiment.
Figure 2:
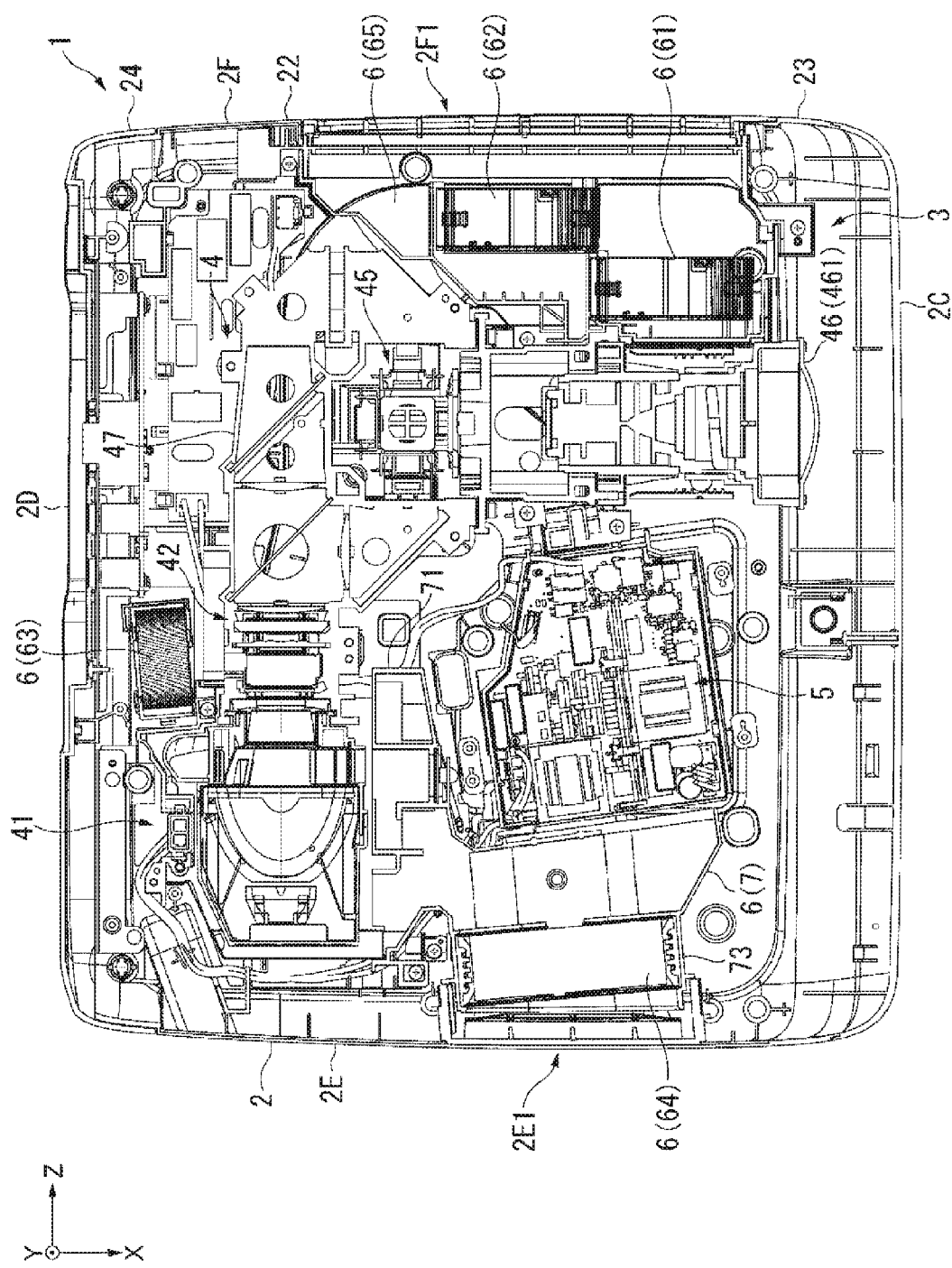
FIG. 2 is a plan view showing a device main body in the first embodiment.

FIG. 1 is a perspective view showing the appearance of a projector 1 according to this embodiment. FIG. 2 is a view showing the inside of the projector 1. In FIG. 2, the illustration of a part of a device main body 3 provided in the projector 1 is omitted.

The projector 1 according to this embodiment forms an image corresponding to image information by modulating light emitted from a light source device accommodated inside, and projects the image in an enlarged manner on a projection target surface such as a screen. This projector 1 includes an exterior casing 2 forming its exterior (FIG. 1 and FIG. 2), and the device main body 3 accommodated inside the exterior casing 2 (FIG. 2), as shown in FIG. 1 and FIG. 2.

[Configuration of Exterior Casing]

The exterior casing 2 has the shape substantially of a rectangular parallelepiped as a whole, as shown in FIG. 1, and is formed of a synthetic resin in this embodiment. This exterior casing 2 has an upper case 21, a lower case 22, a front case 23, and a rear case 24, and is formed by having these combined.

The upper case 21 forms a top surface part 2A of the exterior casing 2 and a part of each of a left lateral surface part 2E and a right lateral surface part 2F. The lower case 22 forms a bottom surface part 2B of the exterior casing 2 and a part of each of the left lateral surface part 2E and the right lateral surface part 2F. The front case 23 and the rear case 24 form a front surface part 2C and a rear surface part 2D of the exterior casing 2, respectively.

On the top surface part 2A, a lamp cover 2A1 covering the position of arrangement of a light source device 41 (FIG. 2) accommodated inside is installed in an attachable/detachable manner. As this lamp cover 2A1 is detached, the light source device 41 is exposed and this enables replacement of the light source device 41.

In the front surface part 20, a substantially semicircular opening 201 is formed through which an image projected from a projection optical device 46, described later, passes.

In the right lateral surface part 2F, a suction port 2F1 is formed through which the outside air is sucked by a cooling device 6 (FIG. 2), described later, and is introduced into the exterior casing 2.

In the left lateral surface part 2E, an exhaust port 2E1 is formed through which the air circulating through the exterior casing 2 and used to cool a cooling target is discharged, as shown in FIG. 2. A duct 7, described later, is connected to this exhaust port 2E1.

[Configuration of Device Main Body]

The device main body 3 is equivalent to the internal configuration of the projector 1 and includes an image forming device 4, a power supply device 5, and a cooling device 6, as shown in FIG. 2. Although not illustrated, in addition to these, the device main body 3 has a control device or the like which controls the operation of the entire projector 1.

[Configuration of Image Forming Device]

Figure 3:
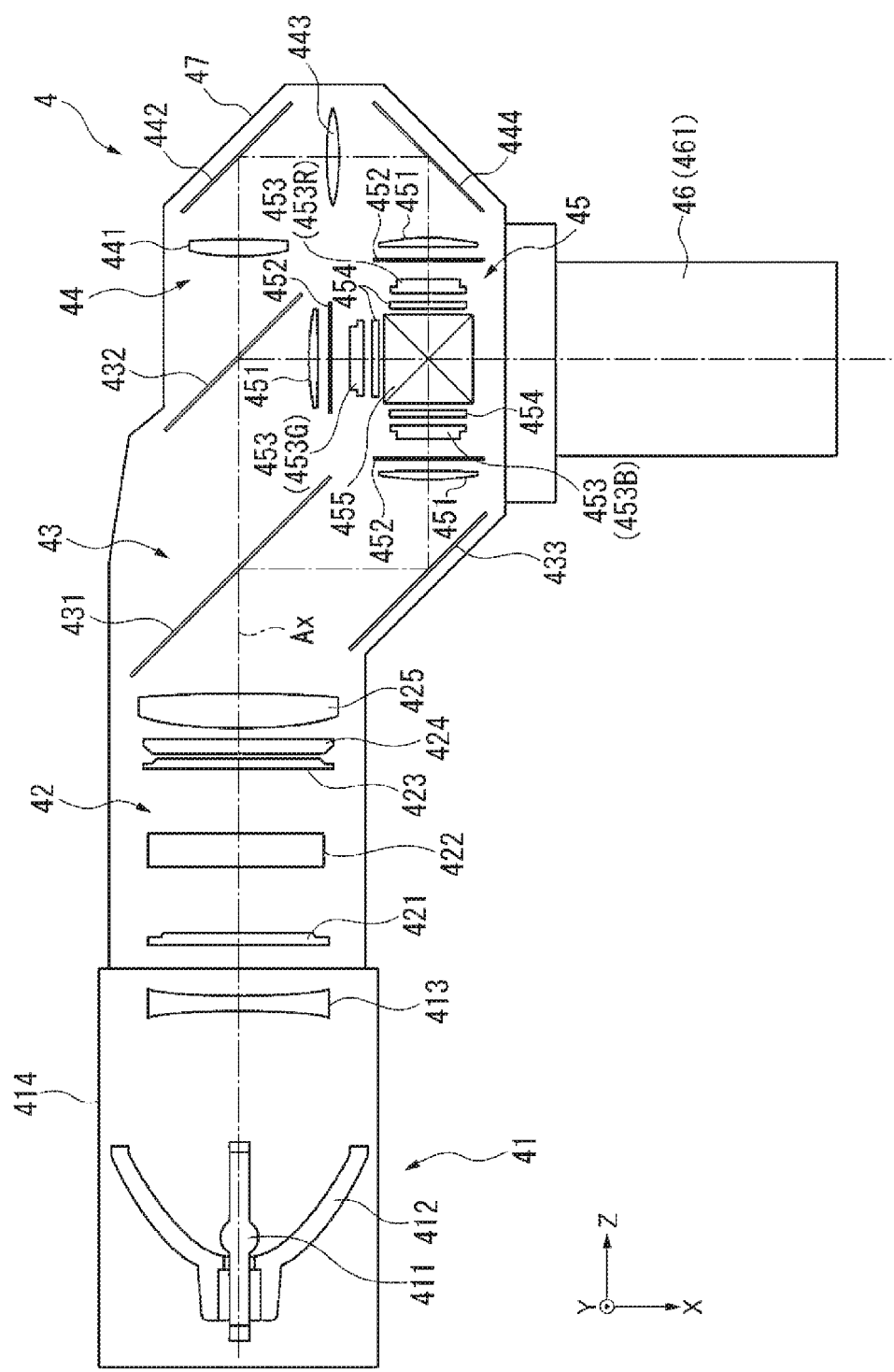
FIG. 3 is a schematic view showing the configuration of an image forming device in the first embodiment.

FIG. 3 is a schematic view showing the configuration of the image forming device 4.

The image forming device 4 forms and projects an image corresponding to image information under the control of the control device. This image forming device 4 has a light source device 41, an illumination optical device 42, a color separation device 43, a relay device 44, an electro-optical device 45, a projection optical device 46, and an optical component casing 47 supporting these, as shown in FIG. 3.

The light source device 41 emits a luminous flux to the illumination optical device 42. This light source device 41 has a light source lamp 411, a reflector 412, a parallelizing lens 413, and a housing 414 accommodating these inside. This housing 414 will be described later.

The illumination optical device 42 equalizes the illuminance within a plane orthogonal to the centre axis of the luminous flux emitted from the light source device 41. This illumination optical device 42 has a first lens array 421, a light control device 422, a second lens array 423, a polarization conversion element 424, and a superimposing lens 425, in order of incidence of the light from the light source device 41.

The color separation device 43 separates the luminous flux incident from the illumination optical device 42 into the three color lights of red (R), green (G), and blue (B). This color separation device 43 has dichroic mirrors 431, 432, and a reflection mirror 433.

The relay device 44 is provided on the optical path of the red light having a longer optical path than the other color lights, of the three separated color lights. This relay device 44 has a light incident-side lens 441, a relay lens 443, and reflection mirrors 442, 444.

The electro-optical device 45 modulates each of the separated color lights according to image information and subsequently combines the respective color lines. This electro-optical device 45 has a field lens 451, a light incident-side polarizer 452, a liquid crystal panel 453 as a light modulator (the liquid crystal panels for red, green, and blue being denoted by 453R, 453G, and 453B, respectively), a light exiting-side polarizer 454, and a cross dichroic prism 455 as a color combining optical device which combines the respective modulated color lights and thus forms a projection image, provided for each color light.

The projection optical device 46 projects the formed projection image in an enlarged manner on the projection target surface. This projection optical device 46 is formed as combined lenses including a plurality of lenses (not illustrated) and a lens barrel 461 accommodating the plurality of lenses inside.

The optical component casing 47 has a component accommodation member which accommodates various optical components, a lid-like member which closes an opening for accommodating components, formed in the component accommodation member, and a support member which supports the projection optical device 46, though not illustrated in detail. An illumination optical axis Ax is set on this optical component casing 47, and the individual deices 41 to 46 are arranged at predetermined positions in relation to the illumination optical axis Ax. Therefore, when the light source device 41 is arranged in the optical component casing 47, the center axis of the light emitted from the light source device 41 coincides with the illumination optical axis Ax.

[Configuration of Power Supply Device]

Back to FIG. 2, the power supply device 5 is arranged substantially at the center in the exterior casing 2. Specifically, the power supply device 5 is arranged between both end parts (the end opposite to the light exiting side in the light source device 41 and the end part on the side of the projecting direction in the projection optical device 46) of the image forming device 4 formed substantially in an L-shape along the rear surface part 2D and along the right lateral surface part 2F. This power supply device 5 has an AC-DC converter circuit, a voltage converter circuit, and a lighting control circuit, though not illustrated in detail.

The AC-DC converter circuit converts the mains alternating current inputted to an inlet connector arranged in the rear surface part 2D, to a direct current. The voltage converter circuit increases and decreases voltage according to the electronic component supplied with the converted direct current. The lighting control circuit generates an alternating rectangular wave current from the converted direct current and supplies this current to the light source device 41 so as to switch on the light source device 41. Of these, the lighting control circuit is controlled by the control device.

[Configuration of Cooling Device]

The cooling device 6 causes cooling air introduced from outside the exterior casing 2 to circulate through a cooling target forming the device main body 3 and thus cools the cooling target. This cooling device 6 has fans 61 to 64 and ducts 65, 7.

The fans 61, 62 are made up of centrifugal fans (sirocco fans) and arranged between the projection optical device 46 and the right lateral surface part 2F, with their suction surfaces facing the suction port 2F1. These fans 61, 62 suck the air outside the exterior casing 2 via the suction port 2F1 and introduce the air into the exterior casing 2. Then, the fans 61, 62 send the sucked air to the vicinities of the respective liquid crystal panels 453 and light exiting-side polarizers 454 via the duct 65 so as to cool these.

The fan 63 is made up of a centrifugal fan and arranged near the light source device 41. This fan 63 sucks the air inside the exterior casing 2 and sends the air to the light source device 41, thus cooling the light source lamp 411.

The duct 7 is formed in a substantially L-shaped as viewed in a plan view and is arranged at a position on the side of the left lateral surface part 2E inside the exterior casing 2. Specifically, a part on one end side of the duct 7 is arranged between the light source device 41 and the power supply device 5, and a part on the other end side is arranged between the left lateral surface part 2E and the power supply device 5. This duct 7 introduces the air which has cooled the light source device 41, the illumination optical device 42 and the power supply device 5 and the air which has circulated through the exterior casing 2, to the inside. This duct 7 will be described in detail later.

The fan 64 is made up of an axial fan. This fan 64 is arranged in the duct 7 and discharges the air which has circulated through the duct 7, out of the exterior casing 2 via the exhaust port 2E1.

[Configuration of Housing]

Figure 4:
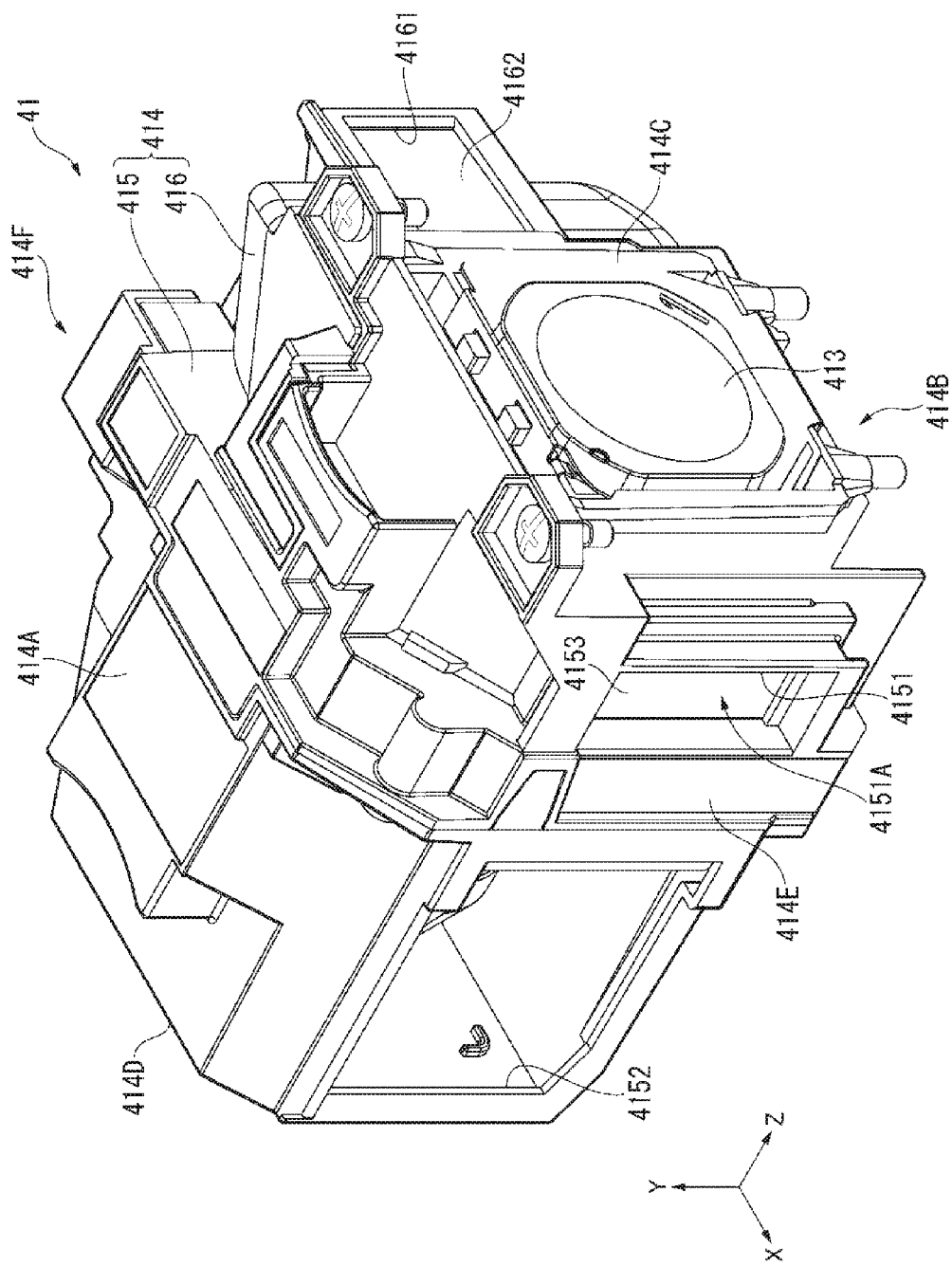
FIG. 4 is a perspective view showing a light source device in the first embodiment, as viewed from the light exiting side.
Figure 5:
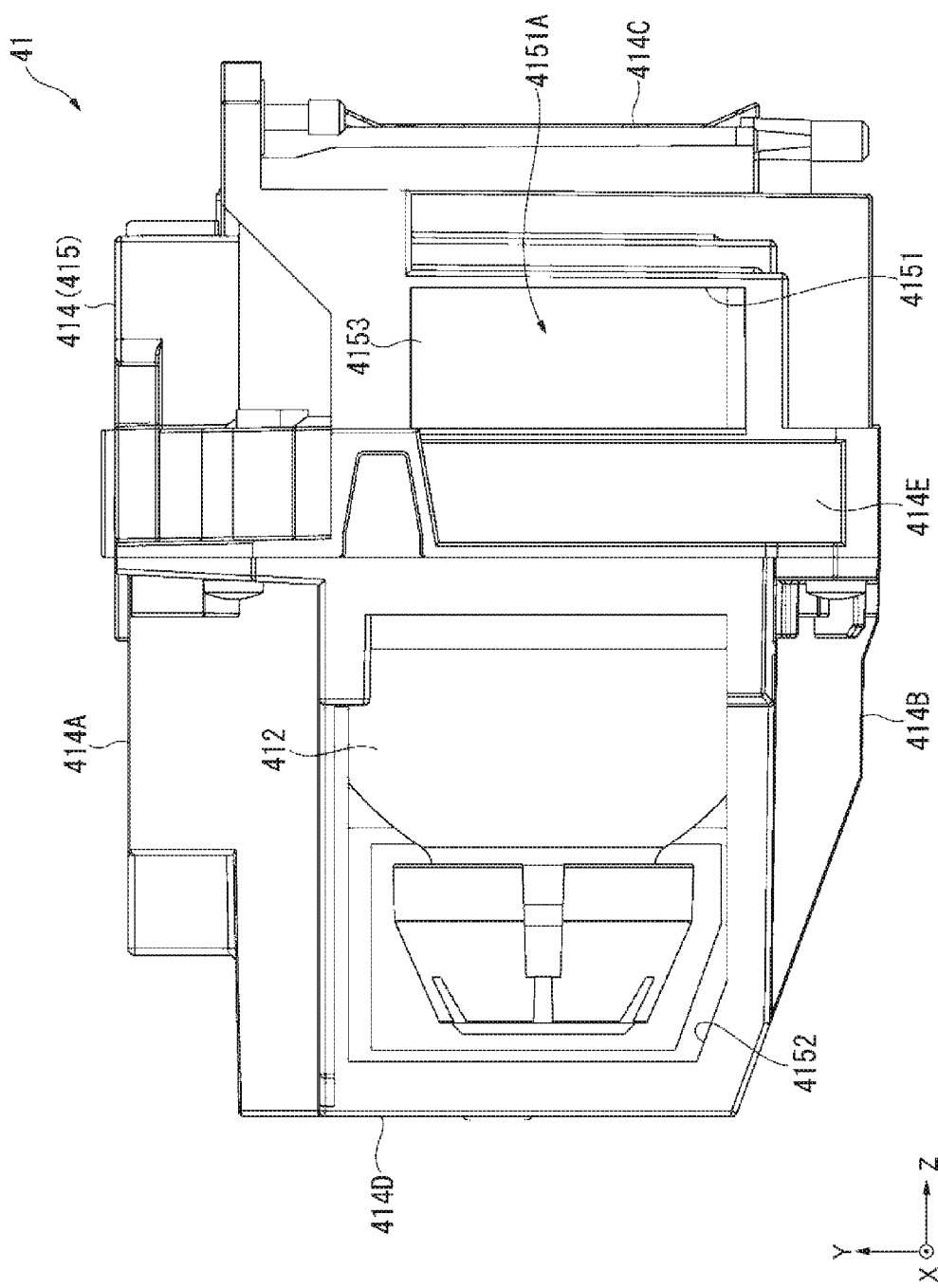
FIG. 5 is a side view showing the light source device in the first embodiment.

FIG. 4 is a perspective view showing the light source device 41, as viewed from the light exiting side. FIG. 5 is a side view showing the light source device 41, as viewed from the side of a left lateral surface part 414E.

Here, the housing 414 forming the light source device 41 will be described.

The housing 414 has a main body part 415 (FIG. 4 and FIG. 5) and a duct member 416 (FIG. 4), as shown in FIG. 4 and FIG. 5. Then, these are combined to form a top surface part 414A, a bottom surface part 414B, a front surface part 414C, a rear surface part 414D, a left lateral surface part 414E, and right lateral surface part 414F of the housing 414.

The main body part 415 is formed of a synthetic resin containing a glass filler, has an accommodation space S (see FIG. 6) in which the light source lamp 411 and the reflector 412 are accommodated, and also has the parallelizing lens 413 attached therein. In other words, this accommodation space S is the space formed by the inner surface of the main body part 415 and the inner surface of the reflector 412, and the space where the light source lamp 411 is arranged.

In a right lateral surface part of this main body part 415, an inlet through which air is introduced into the main body part 415 is formed at each position on the side of the top surface part 414A and on the side of the bottom surface part 414B, though not illustrated. Then, the duct member 416 is attached to the right lateral surface part so as to cover these inlets.

In a left lateral surface part of the main body part 415 forming the left lateral surface part 414E, exhaust ports 4151, 4152 are formed.

The exhaust port 4151 discharges the air introduced into the main body part 415 and cooling the light source lamp 411, out of the housing 414. This exhaust port 4151 is formed in a substantially rectangular shape, and a mesh 4153 for retraining relatively fragments from being scattered outside when the light source lamp 411 has ruptured is arranged on the inner side of the exhaust port 4151.

The exhaust port 4152 discharges the air which has circulated on the side of the rear surface (surface opposite to the light exiting side) of the reflector 412 and has cooled the reflector 412, out of the housing 414.

The duct member 416 has an inlet 4161 opening to the side of the front surface part 414C. The inlet 4161 is connected to the ejection port of the fan 63. Inside this inlet 4161, a mesh 4162 for restraining fragments from being scattered when the light source lamp 411 has ruptured is arranged.

Also, a flow path switching member which causes the air that has moved in a vertical direction due to its own weight and has been introduced into the duct member 416 via the inlet 4161, to circulate upward in the vertical direction, is provided inside the duct member 416, though not illustrated.

In this housing 414, as the flow path switching member moves according to the attitude of the light source device 41, the direction of circulation of the air introduced into the duct member 416 is changed to upward in the vertical direction. This air is introduced into the main body part 415 via the inlet located upward in the vertical direction, of the inlets formed in the right lateral surface part of the main body part 415, and is blasted against the light source lamp 411 from above. Thus, the light source lamp 411 is cooled effectively.

Subsequently, the air used to cool the light source lamp 411 (hereinafter referred to as light source cooling air) is discharged out of the housing 414 via the exhaust port 4151 and flows into the duct 7 facing the exhaust port 4151.

[Configuration of Duct]

Figure 6:
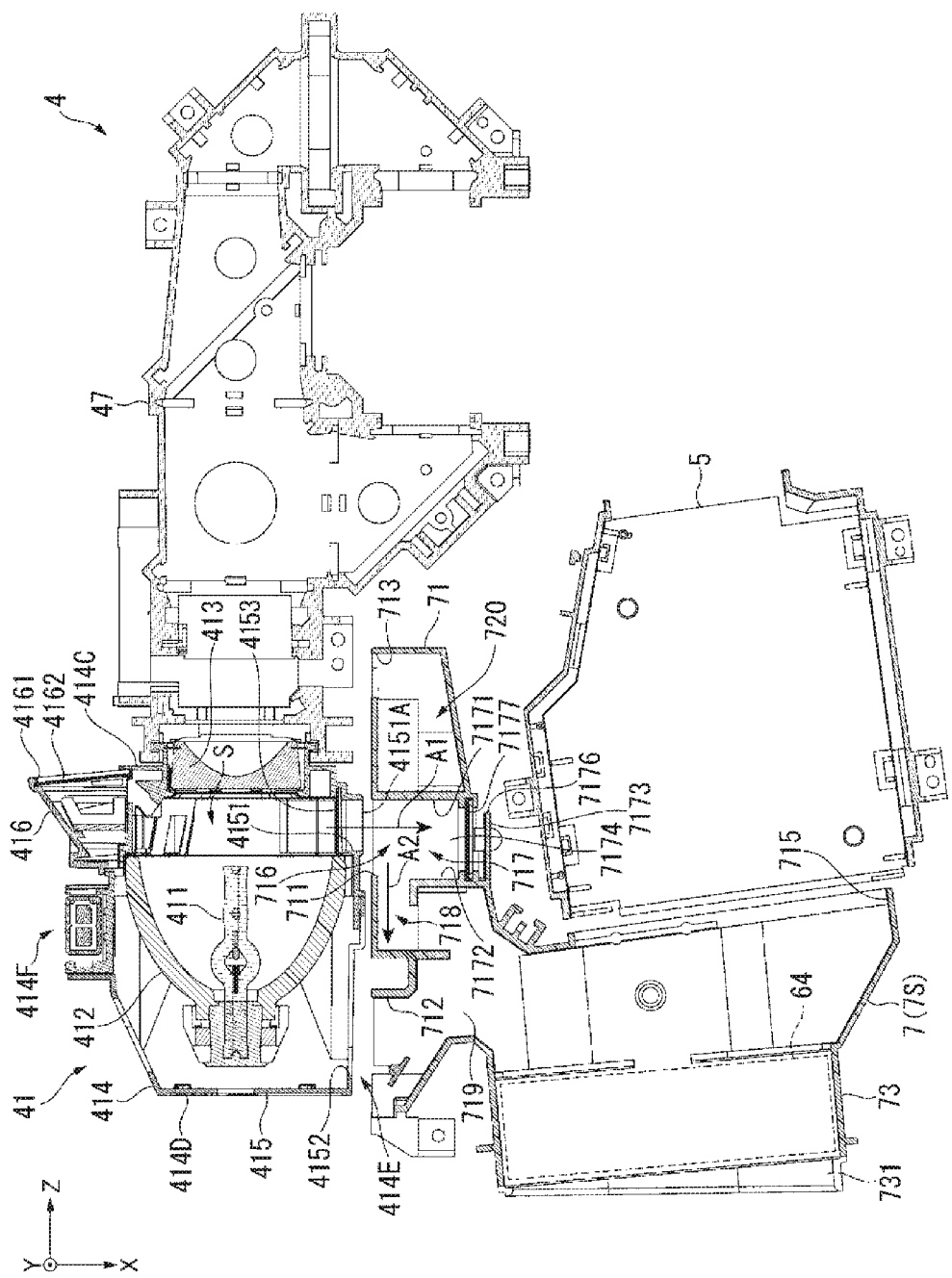
FIG. 6 is a view showing the positional relation between the image forming device, a power supply device, and a duct in the first embodiment.

FIG. 6 is a view showing the positional relation between the image forming device 4 and the power supply device 5, and the duct 7.

In the description below, a Z-direction indicates the direction light emission from the light source device 41, and an X-direction and Y-direction indicate directions orthogonal to the Z-direction and orthogonal to each other. If the projector 1 is placed on placement surface in such an attitude that the bottom surface part 2B faces the placement surface and that the Z-direction is along a horizontal direction (if placed in a prescribed state, the Y-direction indicates a direction toward the top surface part 2A from the bottom surface part 2B (upward direction from below), and the X-direction indicates a direction toward the front surface part 2C from the rear surface part 2D (from right to left as viewed from the Z-direction).

The duct 7 introduces the air which has cooled the image forming device 4 and the power supply device 5 or the like, to the inside, and discharges the air out of the exterior casing 2 via the exhaust pert 2E1 by the fan 64 provided inside. This duct 7 has a substantially L-shaped introduction part 71 facing the light source device 41, the illumination optical device 42, and the power supply device 5, and an arrangement part 73 connected to the introduction part 71, as shown in FIG. 6.

Figure 7:
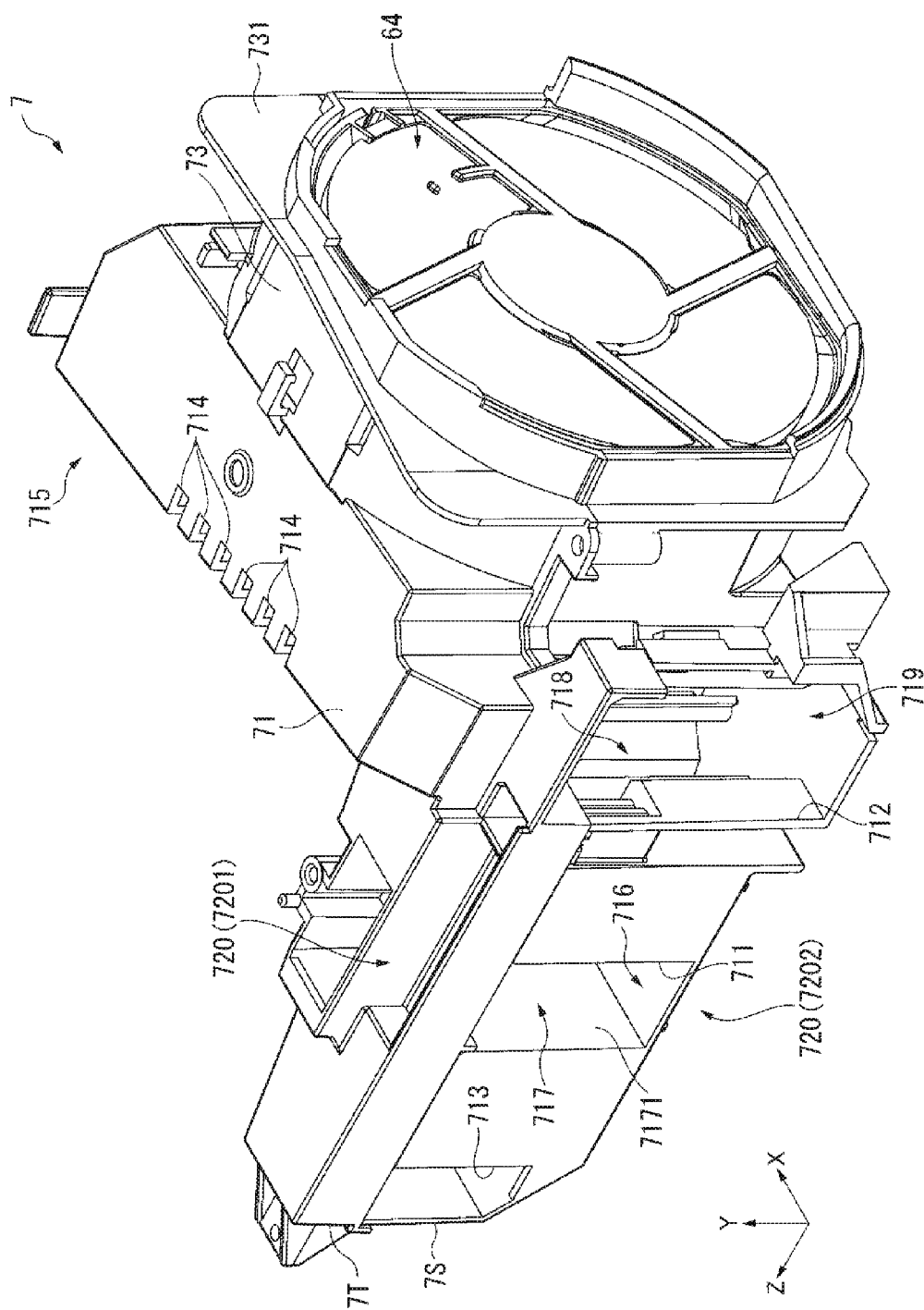
FIG. 7 is a perspective view showing the duct in the first embodiment.
Figure 8:
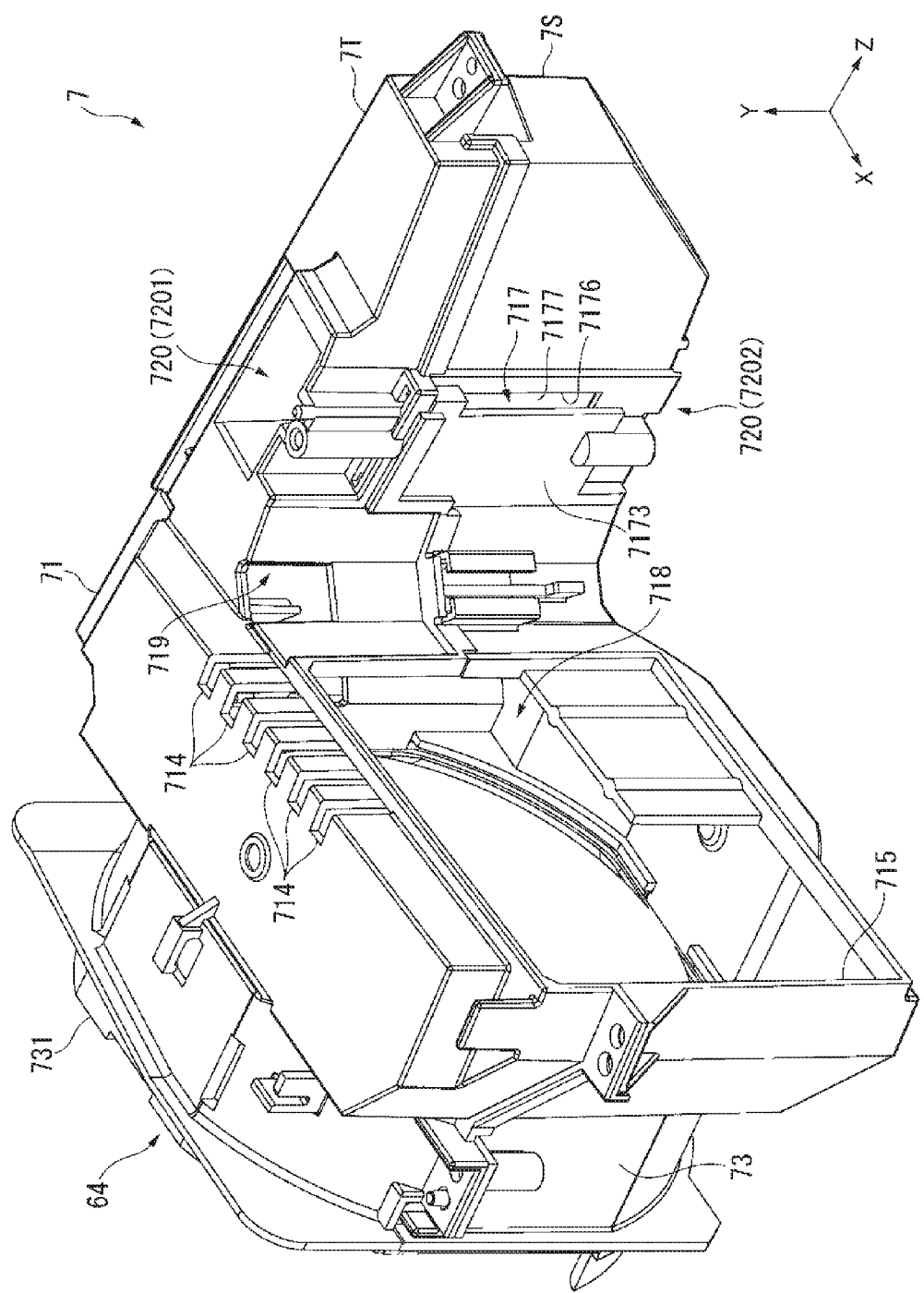
FIG. 8 is a perspective view showing the duct in the first embodiment.

FIG. 7 is a perspective view showing the duct 7, as viewed from the side opposite to the Z-direction. FIG. 8 is a perspective view showing the duct 7, as viewed from the side of the Z-direction.

The duct 7 has a duct main body 7S located on the side opposite to the Y-direction, and a lid-like member 7T located on the side of the Y-direction from the duct main body 7S, as shown in FIG. 7 and FIG. 8. Then, these are combined to form the duct 7, and the introduction part 71 and the arrangement part 73 through which air circulates are formed inside.

[Configuration of Introduction Part]

The introduction part 71 faces each of the image forming device 4 and the power supply device 5 and introduces the air which has cooled these, to the inside, as shown in FIG. 6. This introduction part 71 has inlets 711 to 715, a branching part 716, and duct parts 717 to 720.

The inlet 711 is formed in such a way as to face the exhaust port 4151, on the surface facing the left lateral surface part 414E of the light source device 41 in the introduction part 71. The area of a substantially rectangular opening plane (imaginary plane connecting the edge forming the opening) of this inlet 711 is greater than an opening plane 4151A of the exhaust port 4151 and is configured in such a way that almost all of the air discharged from the exhaust port 4151 flows into the introduction part 71 via the inlet 711.

The branching part 716 is located on the inner side of the introduction port 711 and communicates with the duct parts 717, 718, described later. Of the air introduced to this branching part 716 via the inlet 711, the air with a high exhaust pressure from the exhaust port 4151 flows into the duct part 717 via the branching part 716. Also, the air the exhaust pressure of which is low flows into the duct part 718 via the branching part 716 due to the suction force of the fan 64 arranged in the arrangement part 73, described later.

The duct part 717 is equivalent to the first duct part of the invention. This duct part 717 is a duct part extending from the branching part 716, along a first direction A1 which is a direction orthogonal to the opening plane 4151A of the exhaust port 4151 and toward the inlet 711 from the exhaust port 4151 (in this embodiment, a direction parallel to the X-direction), as shown in FIG. 6. This duct part 717 is formed by sidewall parts 7171 to 7174 formed by the duct main body 7S and the lid-like member 7T (see the illustration for the sidewall part on the side of the Y-direction).

In the sidewall part 7173 located on the side of the first direction A1, of these sidewall parts, a slit-like opening 7176 elongated in the Y-direction is formed at an end part on the side of the Z-direction of the sidewall part 7173.

Also, in the duct part 717, on the side opposite to the first direction A1 from the opening 7176, a mesh 7177 made of a metal is fixed orthogonally to the first direction A1. This mesh 7177 is formed in the shape of a plate and has the function of capturing dust (for example, fragments of the light source lamp 411) contained in the air circulating through the duct part 717 along the first direction A1. The dust captured by this mesh 7177 has mass and therefore drops in a vertical direction (that is, the direction opposite to the Y-direction) and remains within the duct part 717.

Meanwhile, of the sidewall parts forming the duct part 717, the sidewall part 7171 located on the side of the Z-direction and along the XY plane forms an edge of the inlet 711. This sidewall part 7171 is formed in such a way that the light source cooling air is guided into the duct part 717 even in the case where the light source cooling air within the housing 414 circulates in a direction tilted with respect to the first direction A1 (direction tilted toward the Z-direction as the air circulates along the first direction A1, which is the same direction as the X-direction) due to the blast pressure when the light source lamp 411 has ruptured.

The duct part 718 is equivalent to the second duct part in the first aspect and is connected to the branching part 716 along with the duct part 717. This duct part 718 is a duct part extending from the branching part 716, along a second direction A2 that is a direction intersecting with the first direction A1 (in this embodiment a direction orthogonal to the first direction A1 and opposite to the Z-direction). This duct part 718 has the function of guiding the air circulating through the inside, to the fan 64 arranged in the arrangement part 73, described later. That is, when the fan 64 is driven, the air introduced to the branching part 716 from the inlet 711 flows into the duct part 718 due to the suction force of the fan 64, circulates through the duct part 718, and is guided to the fan 64.

The inlet 712 is formed near the end part on the side opposite to the Z-direction, on the surface of the introduction part 71 facing the image forming device 4, as shown in FIG. 6 and FIG. 7. That is, the inlet 712 is located further on the side opposite to the Z-direction than the inlet 711. This inlet 712 introduces the air discharged from the exhaust port 4152 (see FIG. 4 and FIG. 5), that is, the air which has cooled the rear side of the reflector 412 to the inside of the introduction part 71.

The duct part 719 communicates with the duct part 718 and guides the air introduced via the inlet 712, to the duct part 718.

The inlet 713 is formed substantially in a rectangular shape near the end part on the side of the Z-direction, on the surface of the introduction part 71 facing the image forming device 4. That is, the inlet 713 introduces the air which has cooled the illumination optical device 42 (for example, the light control device 422 and the polarization conversion element 424) into the introduction part 71.

The duct part 720 has a pair of communicating parts 7201, 7202 sandwiching the duct part 717 from the side of the Y-direction and the side opposite to the Y-direction (the communicating part on the side of the Y-direction being 7201, and the communicating part on the side opposite to the Y-direction being 7202), as shown in FIG. 7 and FIG. 8. These communicating parts 7201, 7202 guide the air introduced from the inlet 713, to the duct part 718.

The inlets 714, 715 are formed at sites along the X-direction and facing the power supply device 5, in substantially L-shaped introduction part 71.

The inlet 714 is formed in the shape of a slit and in a plural number on the side of the Y-direction, as shown in FIG. 8, and the inlet 715 is formed substantially in an L-shape on the end surface on the side of the Z-direction. The air within the exterior casing 2 (for example, the air which has cooled the power supply device 5) is introduced into the introduction part 71 via these inlets 714, 715.

[Configuration of Arrangement Part]

The arrangement part 73 is connected to the introduction part 71. Specifically, the arrangement part 73 is formed in such a way as to protrude to the side opposite to the Z-direction, from a site along the X-direction of the introduction part 71. The fan 64 is arranged inside this arrangement part 73. That is, in the duct 7, the fan 64 is arranged in such a way as to be able to cause the air introduced from the inlet 711 to flow into the duct part 718 from the branching part 716, and suck the air which has circulated through the duct part 718.

This arrangement part 73 has a connecting part 731 protruding further in the direction opposite to the Z-direction (that is, the direction of discharge of air by the fan 64). This connecting part 731 is formed substantially cylindrically, as shown in FIG. 7, and is connected to the exhaust port 2E1 on the inner side of the left lateral surface part 2E.

With the fan 64 arranged inside this arrangement part 73, the air which has circulated through the duct part 718 and the air introduced inside via the these inlets 714, 715 are sucked by the fan 64 and discharged out of the exterior casing 2 from the exhaust port 2E1 via the connecting part 731.

[Flow Path of Air Introduced from Light Source Device in Case where Light Source Lamp has not Ruptured]

Figure 9:
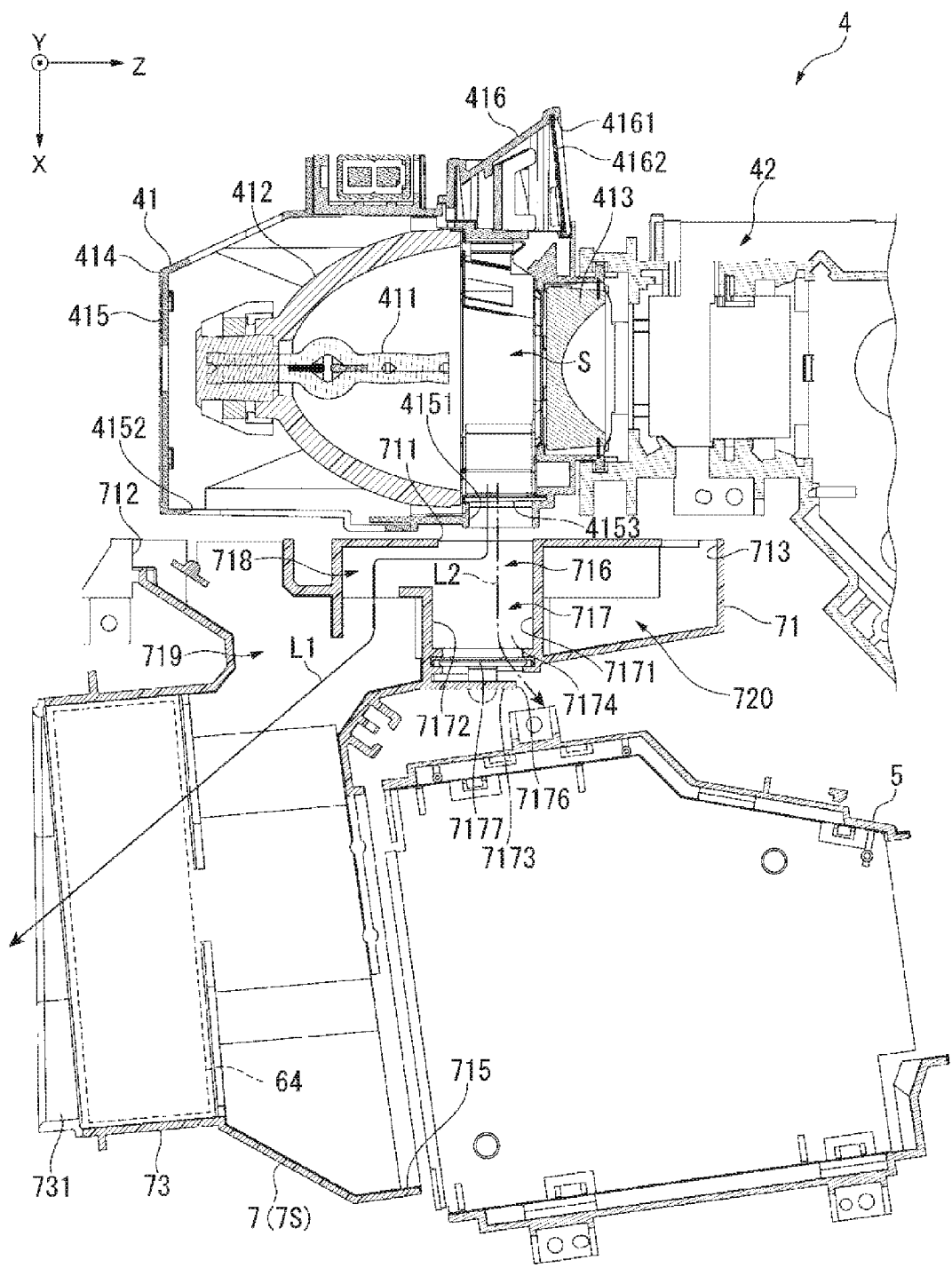
FIG. 9 is a view showing the flow path of air discharged from the light source device in the first embodiment.

FIG. 9 is a view showing the flow path of the air introduced into the duct 7 from the light source device 41. In FIG. 9, the flow path of the air in the state where the light source lamp 411 has not ruptured is indicated by a solid line arrow L1, and the flow path of the air in the case where the light source lamp 411 has ruptured is indicated by a chain-dotted line arrow L2.

The light source cooling air in the housing 414 is introduced into the introduction part 71 (duct 7) via the inlet 711 facing the exhaust port 4151.

Here, in the state where the light source lamp 411 has not ruptured, the light source cooling air is discharged from the exhaust port 4151 due to the convection within the housing 414 and therefore the exhaust pressure of the light source cooling air from the exhaust port 4151 is not so high. Therefore, as indicated by the solid line arrow L1 in FIG. 9, the light source cooling air introduced into the introduction part 71 from the exhaust port 4151 and the inlet 711 circulates along the second direction A2 (direction opposite to the Z-direction) from the branching part 716 due to the suction force of the fan 64, and thus flows into the duct part 718.

After circulating through the duct part 718 and being sucked by the fan 64, this light source cooling air is discharged out of the exterior casing 2 via the exhaust port 2E1 connected to the connecting part 731.

[Flow Path of Air Introduced from Light Source Device in Case where Light Source Lamp Has Ruptured]

Meanwhile, if the light source lamp 411 has ruptured, the blast pressure due to the rupture is generated within the housing 414, and therefore the exhaust pressure of the light source cooling air from the exhaust port 4151 is higher than the exhaust pressure in the state where the light source lamp 411 has not ruptured, as described above. Specifically, the exhaust pressure at the time when the light source cooling air has reached the branching part 716 is higher than the suction pressure by the fan 64 at the branching part 716. Therefore, the air discharged from the exhaust port 4151 at the time of rupture of the light source lamp 411 is introduced into the introduction part 71 via the inlet 711, as indicated by the chain-dotted line arrow L2 in FIG. 9, and subsequently circulates along the first direction A1 from the branching part 716 and flows into the duct part 717.

This light source cooling air circulates through the duct part 717 along the first direction A1, passes through the mesh 7177, and is discharged out of the duct 7 via the opening 7176.

Here, the light source cooling air discharged from the exhaust port 4151 at the time of rupture of the light source lamp 411 contains dust which is fragments of the light source lamp 411. This dust is captured by the mesh 7177 in the process where the light source cooling air passes through the mesh 7177. Since this dust has mass, the dust drops in the vertical direction and remains in the duct part 717 after the blast pressure has subsided.

Meanwhile, after the blast pressure has subsided, the air introduced into the introduction part 71 via the inlet 711 flows into the duct part 718 from the branching part 716 due to the suction force of the fan 64, as described above. When the blast pressure is not generated in this way, the air cannot easily circulate through the duct part 717. Therefore, the dust captured by the mesh 7177 tends to remain in the duct part 717 and cannot be easily discharged out of the duct 7.

Although the illustration of the flow path is omitted from FIG. 9, whether it is the case where the light source lamp 411 has not ruptured or the case where the light source lamp 411 has ruptured, the air which has cooled the rear side of the reflector 412 flows into the duct part 718 via the inlet 712 and the duct part 719, and the air which has cooled the illumination optical device 42 flows into the duct part 718 via the inlet 713 and the duct part 720, by the driving of the fan 64. The air circulating through this duct part 718 is sucked by the fan 64, along with the air which has cooled the power supply device 5 and has been introduced into the introduction part 71 via the these inlets 714, 715 (see FIG. 8), and is discharged out of the exterior casing 2 from the exhaust port 2E1.

[Effects of First Embodiment]

The projector 1 according to the embodiment described above has the following effects.

As described above, in the state where the light source lamp 411 has not ruptured, the air discharged by the convection from the exhaust port 4151 is introduced into the duct 7 from the inlet 711 facing the exhaust port 4151. This air circulates through the duct part 718 from the branching part 716 due to the suction force of the fan 64 and is discharged out of the duct 7 and hence out of the exterior casing 2 by the fan 64.

Meanwhile, in the case where the light source lamp 411 has ruptured, the light source cooling air containing fragments of the light source lamp 411 (dust) is discharged from the exhaust port 4151 and introduced into the duct 7 via the inlet 711. Since the exhaust pressure of this air from the exhaust port 4151 is increased by the blast pressure generated at the time of rupture of the light source lamp 411, the air moves straight in the first direction A1 and flows into the duct part 717 via the branching part 716. Here, since the opening 7176 is formed in the sidewall part 7173 forming the duct part 717, the air which has flowed into the duct part 717 is discharged out of the duct part 717 via the opening 7176 and hence out of the duct 7. When this air passes through the mesh 7177, the fragments contained in the air are captured by the mesh 7177 and the scattering of the fragments is restrained.

Therefore, since the scattering of small fragments of the light source lamp 411 can be restrained without making finer the mesh 4153 provided in the exhaust port 4151, the scattering of fragments of the light source lamp 411 can be restrained without lowering the cooling efficiency of the light source device.

Also, in the projector 1, the light source device 41 is configured to be replaceable for reasons such as the rupture and service life of the light source lamp 411. Here, large fragments of the light source lamp 411 can be captured by the mesh 4153. However, if a configuration that can even capture small fragments is provided in the light source device 41, not only the light source device 41 tends to be expensive but also there is a risk of a reduction in the cooling efficiency of the light source lamp 411 as described above. Moreover, if such a configuration is provided in the light source device 41, the light source device 41 increases in complexity and size.

In contrast, since the duct 7 has a configuration to restrain the scattering of fragments of the light source lamp 411, the increase in complexity and size of the configuration of the light source device 41 can be restrained and the light source device 41 can be configured inexpensively without lowering cooling efficiency.

The air which has circulated through the duct part 717 is discharged out of the duct 7 via the opening 7176. Thus, since the air is discharged from the opening 7176 without stagnating in the duct part 717, the fragments of the light source lamp 411 carried from the light source device 41 and retained in the duct part 717 can be restrained from being sucked by the fan 64 and discharged out of the exterior casing 2. Also, even in the case where very small fragments pass through the mesh 7177 and the opening 7176 with the air, the fragments are discharged at a position outside the duct 7 and inside the exterior casing 2. Therefore, even in this case, the fragments of the light source lamp 411 can be restrained from being discharged out of the exterior casing 2.

The mesh 7177 in the duct part 717 is arranged at a position substantially orthogonal to the first direction A1. Thus, the mesh 7177 can be configured in such a way that the air containing fragments and discharged along the first direction A1 from the exhaust port 4151 securely passes through the mesh 7177 at the time of rupture of the light source lamp 411. Therefore, since the fragments can be captured easily by the mesh 7177, the fragments can be further restrained from being discharged out of the exterior casing 2.

The opening 7176 is formed in the shape of a slit at the end part on the size of the Z-direction, of the sidewall part 7173 substantially orthogonal to the first direction A1. Thus, even in the case where the light of the light source lamp 411 leaks out from the exhaust port 4151 in the light source device 41, the light can be restrained from leaking out of the duct 7, compared with the case where the opening 7176 is formed substantially on the entire surface of the sidewall part 7173.

Also, the mesh 7177 is located on the side opposite to the first direction A1 from the opening 7176, that is, upstream in the flow path of the air passing through the opening 7176. Thus, the captured fragments can be retained in the duct 7 more easily than in the case where the mesh 7177 is located downstream. Therefore, the fragments can be securely restrained from being discharged out of the duct V.

[Modification of First Embodiment]

In the projector 1, the fan 64 is configured to discharge the air introduced into the duct 7, via the exhaust port 2E1 formed in the left lateral surface part 2E of the exterior casing 2. That is, in the projector 1, the fan 64 is arranged in the duct 7 in such a way that the air sucking direction and discharge direction are along the direction opposite to the Z-direction. However, instead of such a duct 7, a duct in which the fan 64 is arranged in such a way that the air sucking direction and discharge direction are along the X-direction may be employed.

Figure 10:
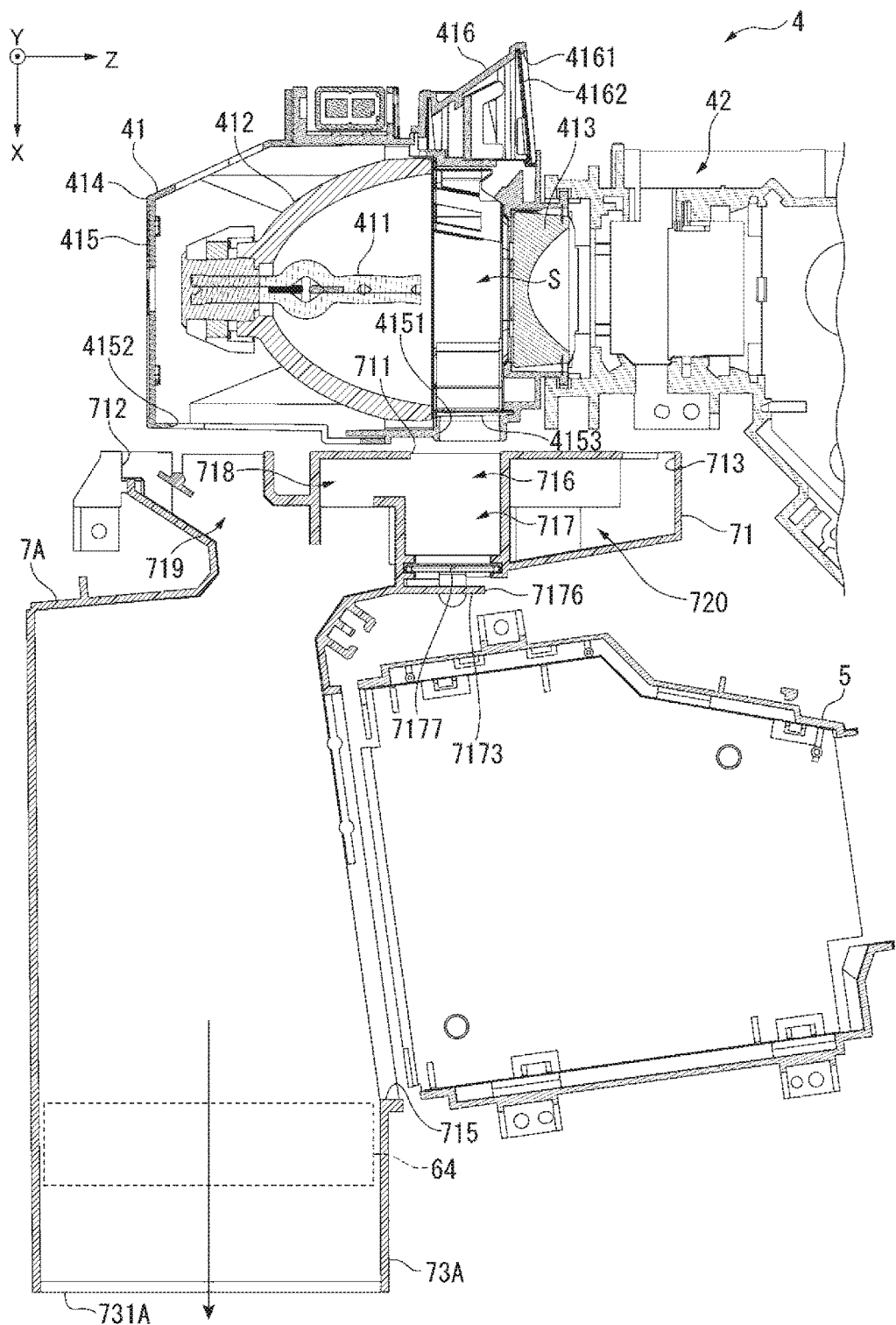
FIG. 10 is a view showing a modification of the duct in the first embodiment.

FIG. 10 is a view showing a duct 7A which is a modification of the duct 7.

The duct 7A, which is a modification of the duct 7, has a configuration and functions similar to those of the duct 7 except for having an arrangement part 73A instead of the arrangement part 73, as shown in FIG. 10.

The arrangement part 73A is located at the end part on the side of the X-direction of the introduction part 71. In this arrangement part 73A, the fan 64 made up of an axial fan is arranged in such a way that the air sucking direction and discharge direction are along the X-direction.

A connecting part 731A provided in this arrangement part 73A is formed in such a way as to protrude to the discharge side of the fan 64 arranged in the arrangement part 73A, that is, toward the X-direction with respect to the fan 64. The connecting part 731A is connected to the inner surface of the front surface part 2C.

In the case where such a duct 7A is employed, the exterior casing 2 in which the exhaust port 2E1 is not formed in the left lateral surface part 20 and in which an exhaust port (not illustrated) is formed in the front surface part 2C is employed. Then, the connecting part 731A is connected to the exhaust port on the inner side of the front surface part 2C, and the exhaust air from the fan 64 is discharged out of the exterior casing 2 from the side of the front surface part 2C.

The projector 1 having such a duct 7A, too, can achieve effects similar to the projector 1 having the duct 7.

[Second Embodiment]

Next, a second embodiment of the invention will be described.

The projector according to this embodiment has a configuration similar to that of the projector 1 but is different from the projector 1 in that the configuration of the duct part through which the air containing fragments circulates when the light source lamp 411 has ruptured is different. In the description below, the same parts or substantially the same parts as those already described are denoted by the same reference signs and will not be described further.

Figure 11:
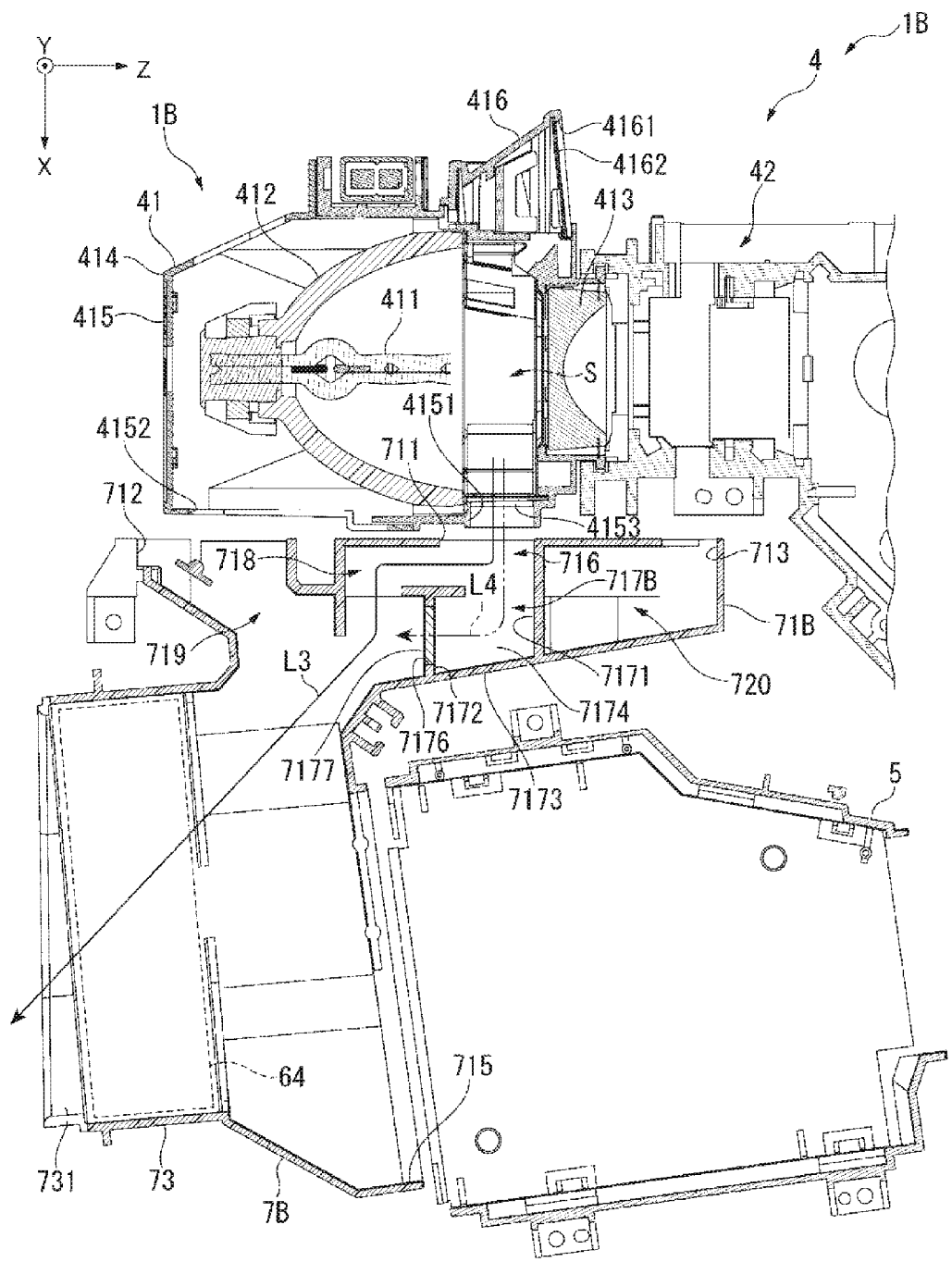
FIG. 11 is a view showing a light source device, a power supply device, and a duct provided in a projector according to a second embodiment.

FIG. 11 is a cross-sectional view taken along the XZ plane, of a part of an image forming device 4, a power supply device 5, and a duct 7B provided in a projector 13 according to this embodiment. More specifically, FIG. 11 is a view showing the flow path of the air circulating through the duct 7B from the light source device 41.

The projector 1B according to this embodiment has a configuration and functions similar to those of the projector 1, except for having the duct 7B instead of the duct 7. The duct 7B has an introduction part 71B and an arrangement part 73, as shown in FIG. 11.

The introduction part 71B is, similarly to the introduction part 71, formed substantially in an L-shape which has a part along the Z-direction and a part along the X-direction, as viewed from the side of the Y-direction. This introduction part 71B has a configuration and functions similar to those of the introduction part 71, except for having a duct part 717B with a different shape and configuration from the duct part 717. That is, the introduction part 71B has inlets 711 to 715, a branching part 716, and duct parts 717B, 718 to 720.

The duct part 717B is, similarly to the duct part 717, a duct part extending along the first direction A1 from the branching part 716. The air discharged in the first direction A1 from the exhaust port 4151 and introduced into the introduction part 71B via the inlet 711 at the time of rupture of the light source lamp 411 circulates through this duct part 717B.

This duct part 717B is, similarly to the duct part 717, surrounded by a sidewall part 7171 located on the size of the Z-direction, a sidewall part 7172 located on the side opposite to the Z-direction, a sidewall part 7173 located on the side of the X-direction, a sidewall part 7174 located on the side opposite to the Y-direction, and a sidewall part (not illustrated) located on the side of the Y-direction.

Here, in the duct part 717B, the opening 7176 is not formed in the sidewall part 7173, and the opening 7176 is formed in the sidewall part 7172 located in the second direction A2. Then, the opening 7176 connects the duct part 717B to the duct part 718. While the opening 7176 in this embodiment is formed in a rectangular shape having a relatively large opening plane, the opening may be formed in the shape of a slit.

Also, the mesh 7177 is provided in the opening 7176. The mesh 7177 may be provided in such a way as to cover the opening 7176 on the side of the Z-direction or on the side opposite to the Z-direction.

[Flow Path of Air Introduced from Light Source Device]

In the state where the light source lamp 411 has not ruptured, as in the ducts 7, 7A, the light source cooling air discharged from the exhaust port 4151 by the convection is introduced into the introduction part 71B from the inlet 711 as indicated by a solid line arrow L3 in FIG. 11. Then, the light source cooling air flows into the duct part 718 along the second direction A2 from the branching part 716 due to the suction force of the fan 64. This light source cooling air circulates through the duct part 718, is sucked by the fan 64, and is discharged out of the exterior casing 2 via the connecting part 731 and the exhaust port 2E1.

Meanwhile, in the case where the light source lamp 411 has ruptured, since the blast pressure is generated within the housing 414, as described above, the exhaust pressure of the light source cooling air (containing fragments or the like of the light source lamp 411) discharged from the exhaust port 4151 is higher than the exhaust pressure in the state where the light source lamp 411 has not ruptured. Therefore, the air circulates along the first direction and is introduced into the introduction part 71B from the inlet 711, as indicated by a chain-dotted line arrow L4 in FIG. 11, and subsequently flows into the duct part 717B from the branching part 716.

The light source cooling air which has flowed into the duct part 717B collides with the sidewall part 7173 forming the duct part 717B and has its pressure weakened, and the circulating direction of the air is changed to a direction along the second direction A2 due to the suction force of the fan 64 acting via the opening 7176. The fragments contained in this light source cooling air are captured by the mesh 7177 in the process of passing through the opening 7176, and subsequently drop in a vertical direction and remains in the duct part 717B. Also, the air which has passed through the opening 7176 flows into the duct part 718 and is sucked by the fan 64 similarly to the above. Thus, the fragments are restrained from being discharged out of the duct 7B.

Although the illustration of the flow path is omitted from FIG. 11, by the driving of the fan 64, the air which has cooled the rear side of the reflector 412 flows into the duct part 718 via the inlet 712 and the duct part 719, and the air which has cooled the light control device 422 and the polarization conversion element 424 flows into the duct part 718 via the inlet 713 and the duct part 720, irrespective of whether the light source lamp 411 has ruptured or not. Moreover, the air which has cooled the power supply device 5 flows into the introduction part 71B via the inlets 714 (not illustrated in FIG. 11), 715, and merges with the air circulating through the duct part 718. Then, the air is discharged out of the exterior casing 2 from the exhaust port 2E1 by the fan 64 similarly to the above.

[Effects of Second Embodiment]

The projector 1B according to the embodiment described above has the following effects, in addition to effects similar to those of the projector 1.

In the state where the light source lamp 411 has not ruptured, the air discharged from the exhaust port 4151 circulates through the duct part 718 and is sucked by the fan 64.

Meanwhile, in the case where the light source lamp 411 has ruptured, the light source cooling air discharged from the exhaust port 4151 by the blast pressure flows into the duct part 718 connected to the duct part 717 via the opening 7176, after the fragments contained in the air are captured by the mesh 7177.

Thus, the device can be configured in such a way that the air introduced into the duct 7B from the inlet 711 ultimately circulates through the duct part 718 both in the case where the light source lamp 411 has ruptured and in the case where the light source lamp 411 has not ruptured, and the air can be discharged out of the duct 7B by the fan 64. That is, the discharge flow paths of the air can be unified. Therefore, the configuration of the duct 7B can be simplified, compared with the configuration in which the air circulating through the duct part 717 and the air circulating through the duct part 718 are respectively discharged out of the duct from different openings.

[Modification of Second Embodiment]

In the duct 7B, the fan 64 arranged in the arrangement part 73 is arranged in such a way that the air sucking direction and discharge direction are along the direction opposite to the Z-direction. In contrast, similarly to the duct 7A, a duct in which the fan 64 is arranged in such a way that the air sucking direction and discharge direction are along the X-direction may be employed instead of the duct 7B.

Figure 12:
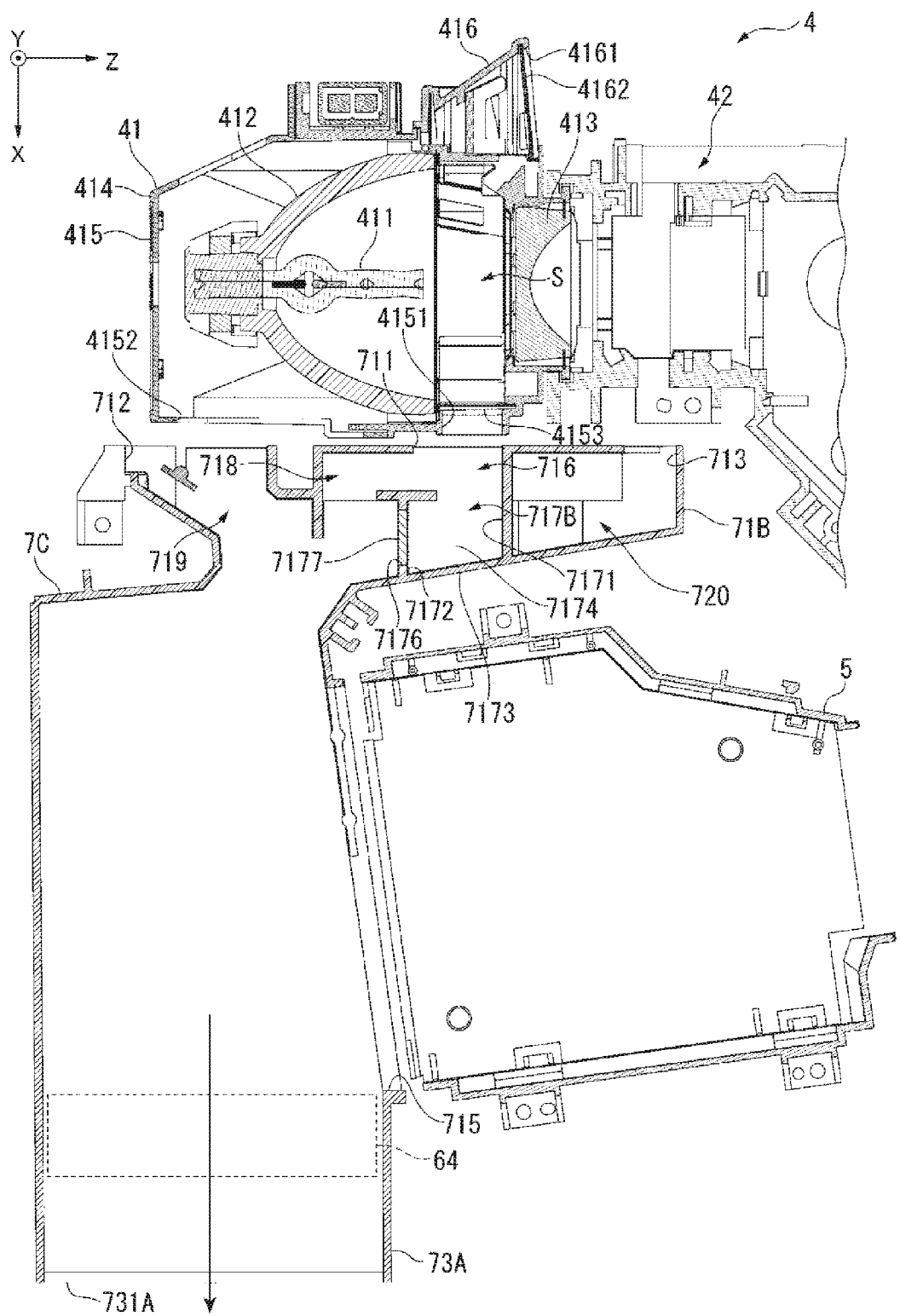
FIG. 12 is a view showing a modification of the duct in the second embodiment.

FIG. 12 is a cross-sectional view taken along the XZ plane, of a duct 7C which is a modification of the duct 7B, a part of the image forming device 4, and the power supply device 5.

The duct 7C, which is a modification of the duct 7B, has a configuration and functions similar to those of the duct 7B except for having an arrangement part 73A instead of the arrangement part 73, as shown in FIG. 12.

The arrangement part 73A is located at the end part on the side of the X-direction of the introduction part 71B, similarly to the arrangement part 73A of the duct 7A. In this arrangement part 73A, the fan 64 made up of an axial fan is arranged in such a way that the air sucking direction and discharge direction are along the X-direction.

Such an arrangement part 73A has a connecting part 731A protruding to the discharge side of the fan 64 arranged in the arrangement part 73A, that is, toward the X-direction with respect to the fan 64, similarly to the above. The connecting part 731A is connected to the inner surface of the front surface part 2C.

In the case where such a duct 7C is employed, the exterior casing 2 in which an exhaust port (not illustrated) is formed in the front surface part 2C is employed, similarly to the above, and the exhaust air from the fan 64 arranged in the arrangement part 73A is discharged out of the exterior casing 2 from the side of the front surface part 2C.

The projector 1B having such a duct 7C, too, can achieve effects similar to the projector 1B having the duct 7B.

[Third Embodiment]

Next, a third embodiment will be described.

The projector according to this embodiment has a configuration similar to that of the projector 1. Here, in the projector 1, the duct 7 arranged facing the housing 414 of the light source device 41 has the duct part 717 in which the mesh 7177 for capturing dust scattered at the time of rupture of the light source lamp 411 is provided, and the duct part 718 through which the air that has cooled the light source lamp 411 circulates. In contrast, in the projector according to this embodiment, the light source device has these duct parts. The projector according to this embodiment is different from the projector 1 in this respect. In the description below, the same parts or substantially the same parts as those already described are denoted by the same reference signs and will not be described further.

Figure 13:
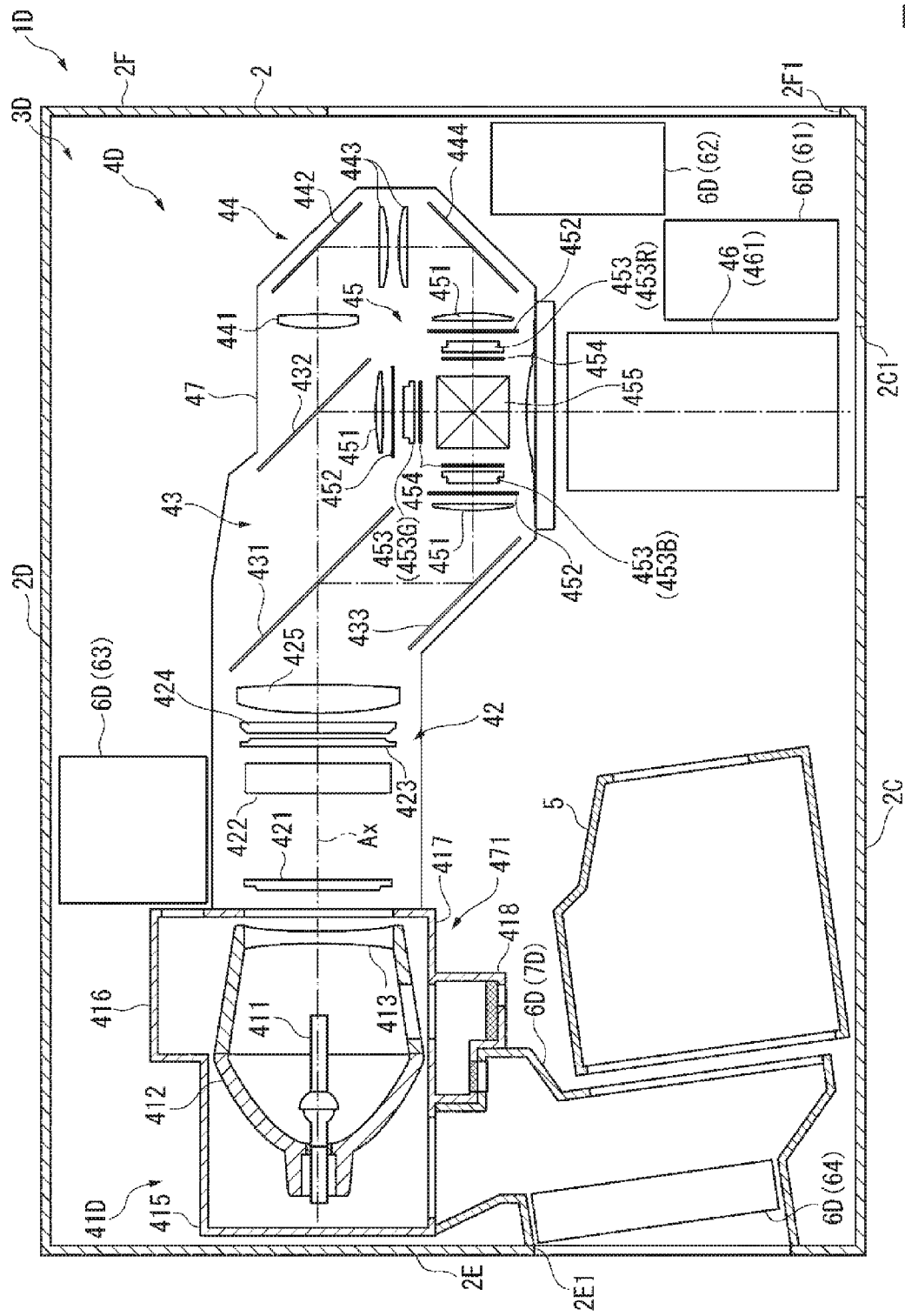
FIG. 13 is a schematic view showing the internal configuration of a projector according to a third embodiment.

FIG. 13 is a schematic view showing the internal configuration of a projector 1D according to this embodiment.

The projector 1D according to this embodiment has an exterior casing 2 and a device main body 3D accommodated in the exterior casing 2, as shown in FIG. 13, and has functions similar to those of the projector 1. Also, the device main body 3D has an image forming device 4D, a power supply device 5, and a cooling device 6D.

The image forming device 40 has a configuration and functions similar to those of the image forming device 4, except for having a light source device 41D instead of the light source device 41. The cooling device 6D (the illustration of the duct 65 is omitted) has a configuration and functions similar to those of the cooling device 6, except for having a duct 7D instead of the duct 7.

Figure 14:
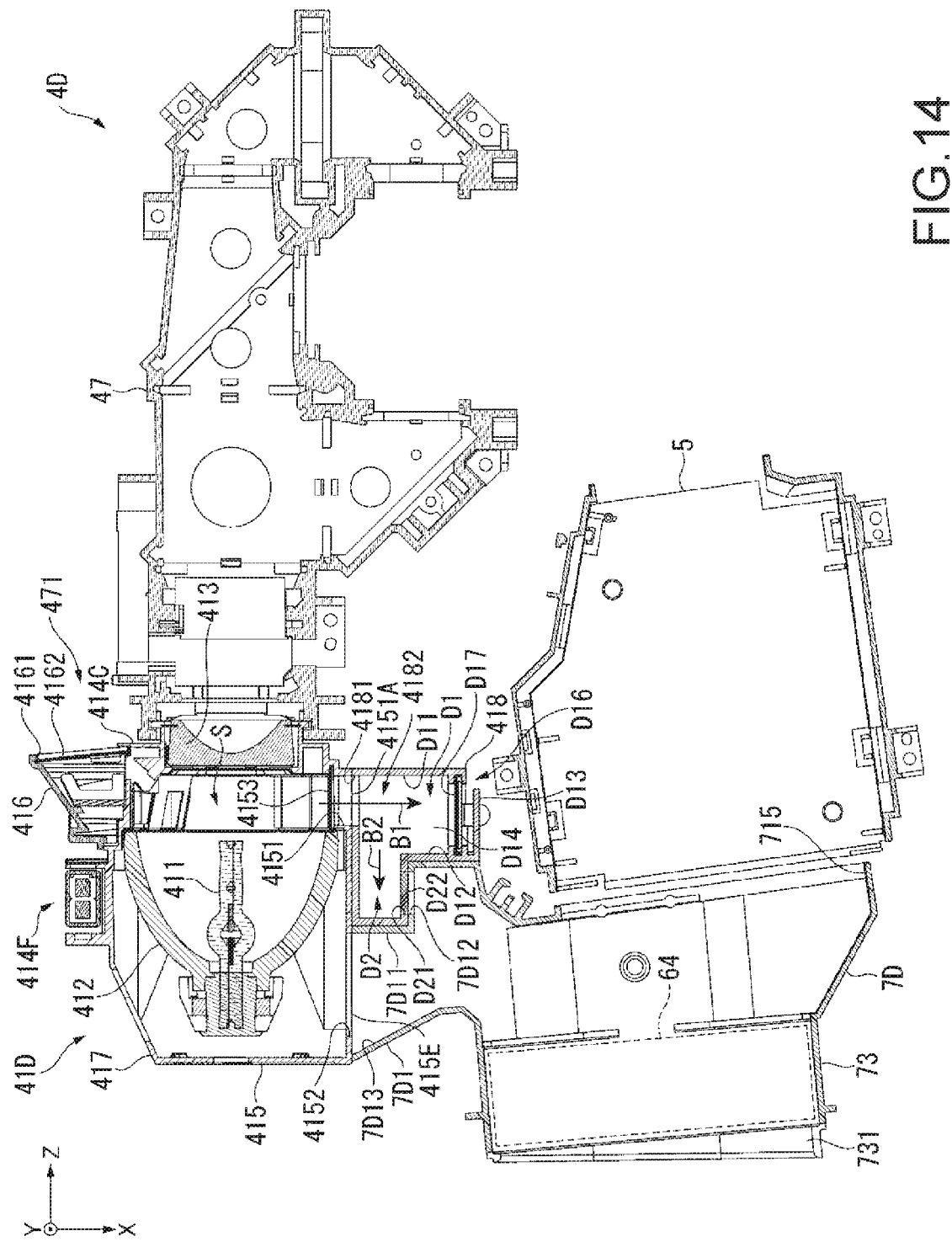
FIG. 14 is a view showing the positional relation between an image forming device, a power supply device, and a duct in the third embodiment.

FIG. 14 is a view showing the positional relation between the image forming device 4D and the power supply device 5, and the duct 7D, and in other words, a view showing a cross section along the XZ plane of the light source device 41D and the duct 7D.

The light source device 41D has a configuration and functions similar to those of the light source device 41, except for having a housing 417 instead of the housing 414, as shown in FIG. 14.

The housing 417 is equivalent to the light source casing in the second aspect. This housing 417, similarly to the housing 414, has the main body part 415, the duct member 416 attached to the right lateral surface part (lateral surface part opposite to the X-direction) of the main body part 415, and an air guide part 418 attached in an attachable/detachable manner to the left lateral surface part 415E of the main body part 415 (corresponding to the part of the main body part 415 in the left lateral surface part 414E of the housing 414).

In the main body part 415, an accommodation space S where a light source lamp 411 and a reflector 412 are accommodated is formed, and a parallelizing lens 413 is attached as well.

[Configuration of Air Guide Part]

The air guide part 418 is a member which is attached to the main body part 415 and which guides the light source cooling air discharged from the exhaust port 4151 of the main body part 415, to the duct 7D, described later, and is also a dust collecting member which restrains fragments of the light source lamp 411 from being scattered at the time of rupture of the light source lamp 411. This air guide part 418 has an inlet 4181, a branching part 4182, and a first duct part D1 and second duct part D2 which are similar to the inlet 711, the branching part 716 and the duct parts 717, 718 forming the introduction part 71 of the duct 7.

The inlet 4181 is formed in a substantially rectangular shape corresponding to the shape of the exhaust port 4151 of the main body part 415. This inlet 4181 faces the exhaust port 4151 when the air guide part 418 is attached to the main body part 415, and the air discharged from the exhaust port 4151 is introduced into the air guide part 418 via the inlet 4181.

The branching part 4182 is, similarly to the branching part 716, located on the inner side of the inlet 4181 and is connected to each of the first duct part D1 and the second duct part D2. Of the air introduced into this branching part 4182 via the inlet 4181, the air with a high exhaust pressure from the exhaust port 4151 flows into the first duct part D1 via the branching part 4182. Meanwhile, the air with a low exhaust pressure from the exhaust port 4151 flows into the second duct part D2 via the branching part 4182 due to the suction force of the fan 64 arranged in the duct 7C connected to the air guide part 418.

The first duct part D1 is a duct part extending from the branching part 4182, along a first direction B1 (X-direction) which is a direction orthogonal to the opening plane 4151A of the exhaust port 4151 (equivalent to the outflow port of the invention) and toward the inlet 4181 from the exhaust port 4151.

This first duct part D1 is formed by sidewall parts D11 to D14 (see the illustration for the sidewall part on the side of the Y-direction) similar to the sidewall parts 7171 to 7174 of the duct parts 717. Of these, at the end part on the side of the Z-direction of the sidewall part D13 located on the side of the first direction B1, an opening D16 in the shape of a slit elongated in the Y-direction is formed.

Also, in the first duct part D1, on the side opposite to the first direction B1 from the opening D16, a mesh D17 made of a metal similar to the mesh 7177 is fixed orthogonally to the first direction B1. That is, the mesh D17 is arranged upstream in the circulating direction in which the air introduced from the inlet 4181 circulates through the first duct part D1, compared with the opening D16. This mesh D17 is formed in the shape of a plate and captures dust (for example, fragments of the light source lamp 411) contained in the air circulating through the first duct part D1 along the first direction B1.

Of the sidewall parts forming the first duct part D1, the sidewall part D11, located on the size of the Z-direction and along the XX plane, forms an edge of the inlet 4181, similarly to the sidewall part 7171. Therefore, even in the case where the air inside the main body part 415 circulates from the exhaust port 4151 in a direction tilted toward the Z-direction as it goes toward the first direction B1 due to the blast pressure when the light source lamp 411 has ruptured, the air circulates along the sidewall part D11 and is guided into the first duct part D1.

The second duct part D2 is a duct part extending from the branching part 4182, along a second direction B2 which is a direction intersecting with the first direction B1 (in this embodiment a direction orthogonal to the first direction B1 and opposite to the Z-direction). This second duct part D2 has the function of guiding the light source cooling air which has cooled the light source lamp 411, to the fan 64 arranged in the duct 7D, when the light source device 41D with the air guide part 418 attached thereto is accommodated in the exterior casing 2 and connected to the duct 7D.

Here, the light source cooling air which has cooled the light source lamp 411 is discharged from the exhaust port 4151 by the convection in the main body part 415, as described above. However, the exhaust pressure of the light source cooling air from the exhaust port 4151 is not so high. Meanwhile, since the terminal end of the second duct part D2 faces an inlet 7D12 of the duct 7D with the fan 64 arranged therein, the suction force of the fan 64 acts inside the second duct part D2. Therefore, the air introduced into the air guide part 418 from the exhaust port 4151 circulates from the branching part 4182 to the second duct part D2 and flows into the duct 7D via an opening D21 formed in the end surface on the side of the X-direction at the terminal end of the second duct part D2, except at the time of rupture of the light source lamp 411. In this opening D21, a mesh D22 similar to the mesh D17 is arranged. However, this mesh D22 may be omitted.

In this embodiment, the air guide part 418 is provided in an attachable/detachable manner to the main body part 415 and attached to the main body part 415, thus forming the housing 417 of the light source device 41D. However, without being limited to this, the configuration of the air guide part 418 may be formed integrally with the main body part 415.

[Configuration of Duct]

The duct 7D is to be connected to the air guide part 418 and guide the air introduced into the air guide part 418 to the outside of the exterior casing 2 via the exhaust port 2E1, when the light source device 41D is accommodated in a light source accommodation section 471 of the optical component casing 47. This duct 7D has an introduction part 7D1 and the arrangement part 73.

Of these, in the arrangement part 73, the fan 64 is arranged in such a way that the air sucking direction and discharge direction are along the direction opposite to the Z-direction.

The introduction part 7D1, similarly to the introduction part 71, faces the light source device 41D and the power supply device 5 and introduces the air which has cooled these, to the inside. This introduction part 701 has a connecting part 7D11 and inlets 7012, 7D13, 714 (not illustrated in FIG. 14), 715.

The connecting part 7D11 is a site facing the air guide part 418 and the left lateral surface part 415E of the duct 7D and also functions as a guide part which contacts these and guides the accommodation of the light source device 41D into the light source accommodation section 471 when the light source device 41D is inserted into the exterior casing 2 along the direction opposite to the Y-direction and accommodated in the light source accommodation section 471.

The inlet 7D12 is formed in a position corresponding to the opening D21 in the connecting part 7D11 and introduces the air which has circulated through the second duct part D2 of the air guide part 418, into the introduction part 7D1.

The inlet 7D13 is formed in a position corresponding to the exhaust port 4152 in the connecting part 7D11 and introduces the air which has cooled the rear part of the reflector 412, into the introduction part 701.

The inlets 714, 715 are formed at sites facing the power supply device 5 in the introduction part 701 and introduces the air inside the exterior casing 2 (for example, the air which has cooled the power supply device 5), into the introduction part 7D1, as in the case of the duct 7.

[Flow Path of Air Introduced from Light Source Device in States Other than Time of Rupture of Light Source Lamp]

Figure 15:
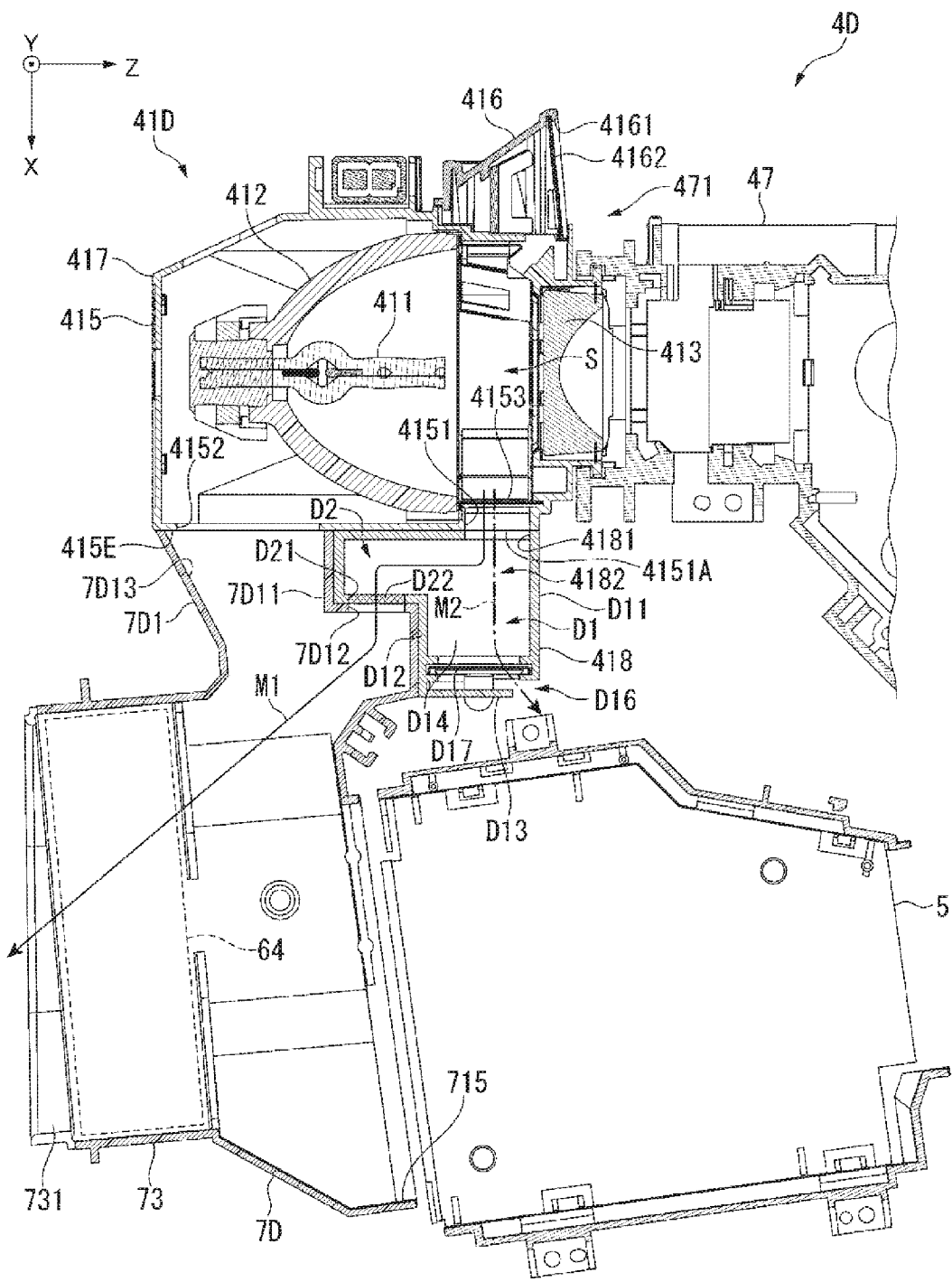
FIG. 15 is a view showing the flow path of air flowing out from a light source device in the third embodiment.

FIG. 15 is a view showing the flow path of the air flowing out from the light source device 41D. In FIG. 15, the flow path of the air in states other than the time of rupture of the light source lamp 411 is indicated by a solid line arrow M1, and the flow path of the air at the time of rupture of the light source lamp 411 is indicated by a chain-dotted line arrow M2.

In this embodiment, in states other than the time of rupture of the light source lamp 411 (the state where the light source lamp 411 has not ruptured or the state after the rupture), the air in the accommodation space S of the main body part 415 (for example, light source cooling air) follows the flow path indicated by the arrow M1 in FIG. 15.

Specifically, the air is discharged from the exhaust port 4151 due to the convection within the main body part 415 and flows into the air guide part 418 via the inlet 4181. Since the suction force of the fan 64 acts in the second duct part D2 in this air guide part 418, the air which has flowed into the air guide part 418 flows into the second duct part D2 from the branching part 4182, along the second direction B2 due to the suction force of the fan 64. Then, the air which has circulated through the second duct part D2 is introduced into the introduction part 7D1 via the opening D21 and the inlet 7D12 and discharged out of the exterior casing 2 from the exhaust port 2E1 by the fan 64.

[Flow Path of Air Introduced from Light Source Device at Time of Rupture of Light Source Lamp]

Meanwhile, at the time of rupture of the light source lamp 411, the blast pressure due to the rupture is generated within the main body part 415, as described above, and therefore the exhaust pressure of the air in the accommodation space S from the exhaust port 4151 is higher than the exhaust pressure in the states other than the time of rupture of the light source lamp 411 and higher than the suction pressure of the fan 64 acting in the branching part 4182. Therefore, the air discharged from the exhaust port 4151 at the time of rupture of the light source lamp 411 follows the flow path indicated by the arrow M2 in FIG. 15.

Specifically, after being introduced into the air guide part 418 via the inlet 4181, the air circulates along the first direction B1 from the branching part 4182 and flows into the first duct part D1. This air moves straight through the first duct part D1 along the first direction B1 and passes through the mesh D17. Thus, the dust contained in the air is captured by the mesh D17, and after the blast pressure subsides, the dust drops in a vertical direction (that is, the direction opposite to the Y-direction) and remains the first duct part D1. Also, the air from which the dust has been eliminated passes through the opening D16 and is discharged out of the first duct part D1, that is, out of the housing 417 (light source device 41D).

Meanwhile, after the blast pressure due to the rupture of the light source lamp 411 has subsided, the air introduced into the air guide part 418 via the inlet 4181 follows the flow path indicated by the arrow M1, as described above. That is, the air flows into the second duct part D2 from the branching part 4182 due to the suction force of the fan 64. In this way, in the case where the blast pressure has subsided, the air does not easily circulate through the first duct part D1, the dust captured by the mesh D17 tends to remain in the first duct part D1 and cannot be easily discharged out of the air guide part 418.

Although not illustrated, the air which has cooled the rear side of the reflector 412 and the air which has cooled the power supply device 5 are introduced into the introduction part 7D1 via the inlets 7D13, 714, 715 by the fan 64, irrespective of the state of the light source lamp 411. These airs, too, are sucked by the fan 64 and discharged out of the exterior casing 2 from the exhaust port 2E1.

[Effects of Third Embodiment]

The projector 1D according to this embodiment described above can achieve effects similar to those of the projector 1.

The air discharged from the exhaust port 4151 (outflow port) of the main body part 415, that is, the air in the accommodation space S where the light source lamp is accommodated, is introduced into the air guide part 418 from the inlet 4181.

Here, in states other than the time of rupture of the light source lamp 411, the exhaust pressure from the exhaust port 4151 is relatively not high. Therefore, as the air in the second duct part D2 is sucked by the fan 64, the air which has cooled the light source lamp 411 can be discharged out of the air guide part 418 and hence out of the housing 417, which is the light source casing.

Meanwhile, at the time of rupture of the light source lamp 411, the air containing dust such as fragments of the light source lamp 411 is introduced into the air guide part 418 from the exhaust port 4151. At this time, since the exhaust pressure from the exhaust port 4151 is relatively high due to the blast pressure, the air introduced into the air guide part 418 moves straight in the first direction B1 orthogonal to the opening plane 4151A of the exhaust port 4151 and flows into the first duct part D1 from the branching part 4182. Since the opening D16 (first opening) is formed in a sidewall part forming the first duct part D1, the air which has flowed into the first duct part D1 is discharged out of the first duct part D1 via the opening D16. At this time, as the dust contained in the air is captured by the mesh D17 covering the opening D16, the dust is retained in the first duct part D1.

Therefore, since small fragments of the light source lamp 411 can be restrained from being scattered out of the light source device 41D without making finer the mesh 4153 provided in the exhaust port 4151, the scattering of the fragments can be restrained without lowering the cooling efficiency of the light source device 41D.

Here, the air in the accommodation space S (the air containing the dust) is discharged in the first direction B1 from the exhaust port 4151 due to the blast pressure generated at the time of rupture of the light source lamp 411 and therefore tends to flow into the first duct part D1 extending in the first direction B1 from the branching part 4182. The opening D16 provided in this first duct part D1 is formed in the sidewall part D13 orthogonal to the side of the first direction B1 in the first duct part D1 and discharges the air circulating through the first duct part D1, along the first direction B1. Thus, the air from which the dust has been captured by the mesh D17 can be quickly discharged out of the first duct part D1. Therefore, the air containing the dust can be restrained from flowing backward and circulating toward the second duct part D2, and the dust can be restrained from being discharged out of the housing 417.

Since the opening D16 is formed in the shape of a slit, the opening area of the opening D16 in the sidewall part D13 can be made small. Therefore, even if the light of the light source lamp 411 leaks out of the main body part 415 via the exhaust port 4151, the light can be restrained from leaking out of the air guide part 418 and hence out of the housing 417.

Also, the mesh D17 is located on the side opposite to the first direction B1 from the opening D16, that is, upstream in the circulating direction of the air passing through the opening D16. Thus, the captured dust can be retained in the first duct part D1 more easily than in the case where the mesh D17 is located downstream. Therefore, the dust including fragments of the light source lamp 411 can be securely restrained from being discharged out of the housing.

The mesh D17 is located in a position substantially orthogonal to the first direction B1. Thus, a configuration such that the air discharged along the first direction B1 from the exhaust port 4151 due to the blast pressure (the air containing the dust) securely passes through the mesh D17 can be provided, enabling the mesh D17 to capture the dust more easily. Therefore, the fragments of the light source lamp 411 can be more securely restrained from being discharged out of the first duct part D1 and hence out of the housing 417.

Since the air guide part 418 is attachable to and detachable from the main body part 415, the air guide part 418 in which the dust including fragments of the light source lamp 411 is retained can be detached from the main body part 415. Therefore, the light source device 41D can be manufactured by replacing the air guide part 418 along with the replacement of the light source lamp 411. Thus, the reusability and recyclability of the light source device 41D can be improved.

[Modification of Third Embodiment]

Figure 16:
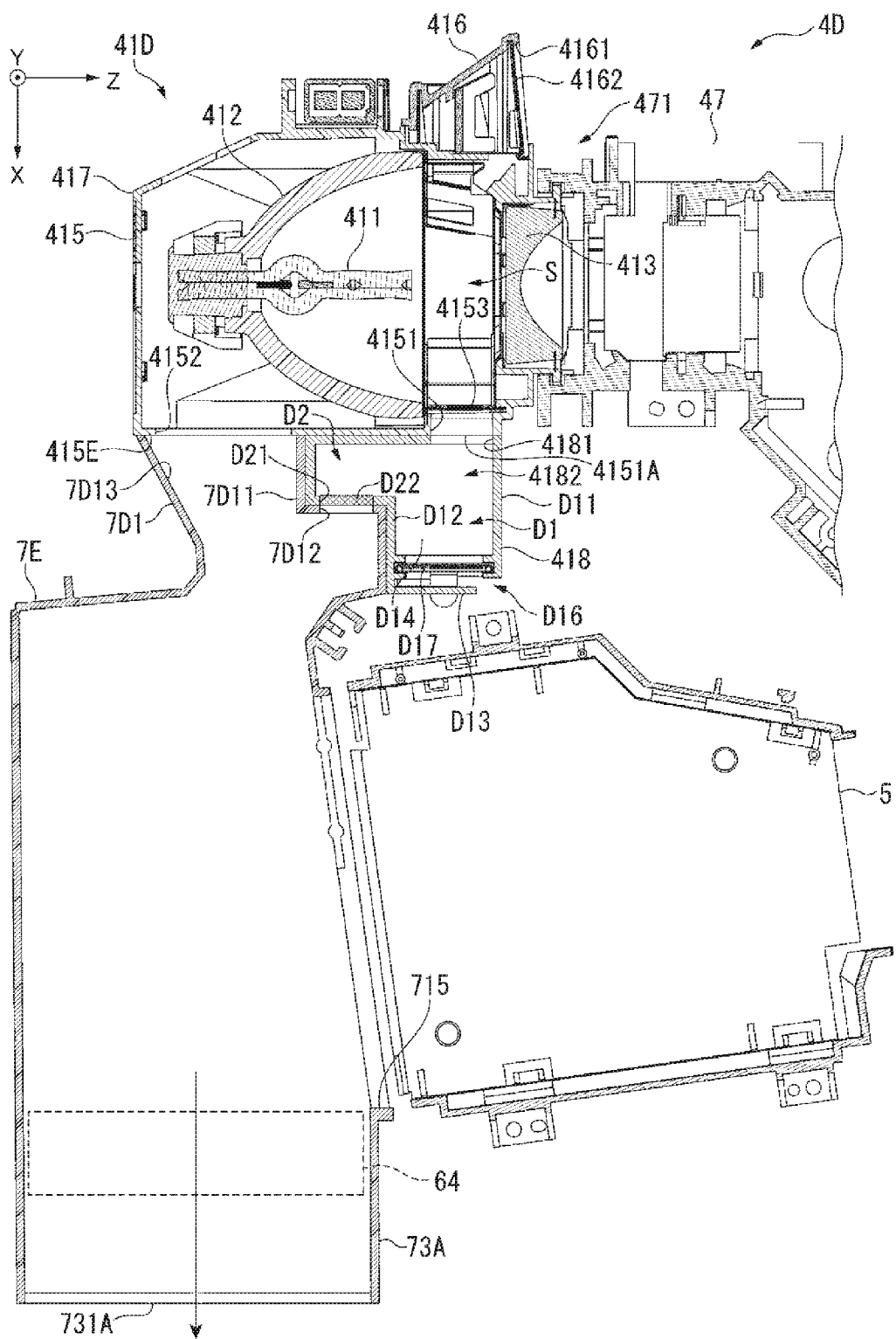
FIG. 16 is a view showing a modification of the duct in the third embodiment.

FIG. 16 is a cross-sectional view along the XZ plane, of a duct 7E which is a modification of the duct 7D, the light source device 41D, and the power supply device 5.

In the duct 7D, the fan 64 is arranged in the arrangement part 73 in such a way that the air sucking direction and discharge direction are along the direction opposite to the Z-direction. In contrast, the duct 7E (FIG. 16) having the arrangement part 73A instead of the arrangement part 73 may be employed, and similarly to the ducts 7A, 7C, the fan 64 may be arranged in the duct 7E in such a way that the air sucking direction and discharge direction are along the X-direction. In the case where such a duct 7E is employed, the exterior casing 2 in which an exhaust port (not illustrated) is formed in the front surface part 2C is employed, similarly to the above.

[Fourth Embodiment]

Next, a fourth embodiment will be described.

The projector according to this embodiment has a configuration similar to the projector 1D. Here, in the air guide part 418 of the projector 1D, the openings D16, D21 located at the terminal ends of the first duct part D1 and the second duct part D2 are formed in positions distant from each other. In contrast, in the projector according this embodiment, the respective openings through which the air that has circulated through the first duct part and the second duct part is discharged are formed in positions close to each other, as in the duct 7B. In this respect, the projector according to this embodiment differs from the projector 1D. In the description below, the same or substantially same parts as those already described are denoted by the same reference signs and will not be described further.

Figure 17:
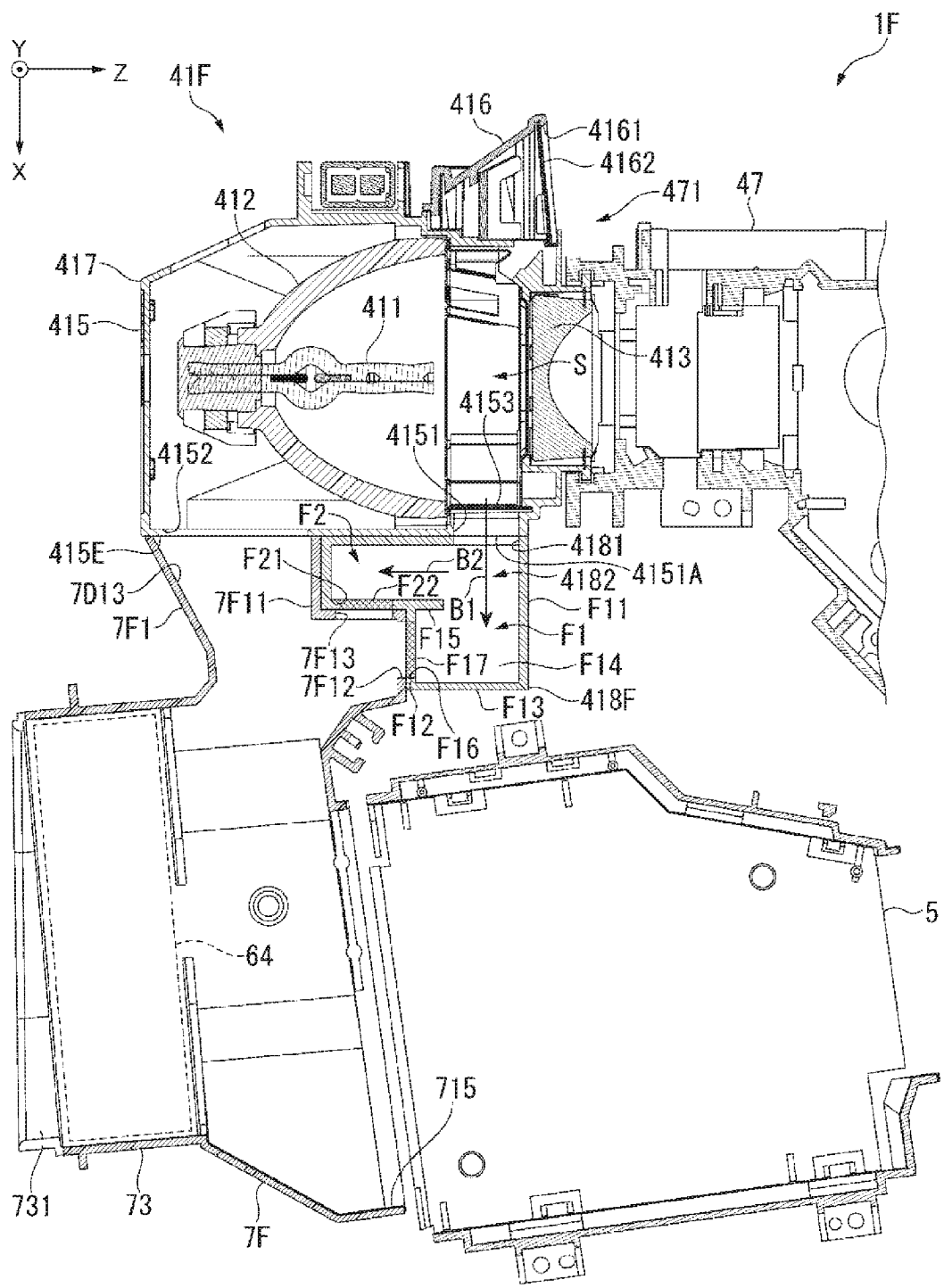
FIG. 17 is a cross-sectional view showing a light source device, a power supply device, and a duct in a fourth embodiment.

FIG. 17 is a cross-sectional view along the XZ plane, of a light source device 41F, the power supply device 5, and a duct 7F provided in a projector 1F according to this embodiment.

The projector 1F according to this embodiment has a configuration and functions similar to those of the projector 1D, except for having the light source device 41F and the duct 7F instead of the light source device 41D and the duct 7D. Of these, the light source device 41F has a configuration and functions similar those of the light source device 41D, except for having an air guide part 418F instead of the air guide part 418, as shown in FIG. 17.

[Configuration of Air Guide Part]

The air guide part 418F is, similarly to the air guide part 418, attached to the left lateral surface part 415E of the main body part 415 in an attachable/detachable manner and thus forms the housing 417, and functions as a member which guides the air discharged from the exhaust port 4151 of the main body part 415, to the duct 7F. In addition, the air guide part 418F also functions as a dust collecting member which collects dust including fragments of the light source lamp 411 at the time of rupture of the light source lamp 411 and restrains the dust from being scattered.

This air guide part 418F has the inlet 4181, the branching part 4182, and a first duct part F1 and a second duct part F2.

The first duct part F1 is a duct part extending along the first direction B1 from the branching part 4182 and subsequently extending along the second direction B2 orthogonal to the first direction B1. This first duct part F1 is formed by a sidewall part F11 forming an edge on the side of the Z-direction of the inlet 4181 and sidewall parts F12 to F15 (see the illustration for the sidewall part on the side of the Y-direction). The extending part along the second direction B2 of the first duct part F1 is closed like a cul-de-sac by the sidewall parts F12 to F15 and the sidewall part on the side of the Y-direction.

An opening F16 is formed in the sidewall part F12, which is one of the sidewall parts forming this closed part and is located on the side of the second direction B2. In the opening F16, a mesh F17 made of a metal similar to the mesh D17 is provided orthogonally to the second direction B2. This mesh F17 is formed in the shape of a plate and captures dust (for example, fragments of the light source lamp 411) contained in the air circulating through the first duct part F1. Also, the mesh F17 may be provided in such a way as to cover the opening F16 on the side of the second direction B2 (opposite to the Z-direction) or on the side opposite to the second direction B2 (on the side of the Z-direction).

The second duct part F2 is a duct part extending along the second direction B2 from the branching part 4182. This second duct part F2 has the function of causing substantially all of the air introduced into the air guide part 418F from the main body part 415, to circulate due to the suction force of the fan 64 and thus guiding the air to the duct 7F, at times other than the time of rupture of the light source lamp 411.

Of the sidewall parts forming the terminal end part of this second duct part F2, the sidewall part on the side of the first direction B1 (X-direction) is the sidewall part F15 forming the first duct part F1. In the sidewall part F15, an opening F21 is formed in a position further on the side of the second direction B2 than the sidewall part F12. Then, the air which has circulated through the second duct part F2 is discharged out of the air guide part 418F and hence out of the light source device 41F via the opening F21. Also, in the opening F21, a mesh F22 similar to the mesh F17 is arranged.

In this way, the opening F21 and the opening F16 are formed in positions relatively close to each other in the sidewall parts F15, F21 orthogonal to each other. Then, a connecting part 7F11 of the duct 7F is connected to the air guide part 418F in such a way as to cover these openings F16, F21.

The air guide part 418F is configured to be attached in an attachable/detachable manner to the main body part 415. However, the air guide part 418F may be formed integrally with the main body part 415, similarly to the air guide part 418.

[Configuration of Duct]

The duct 7F is to guide the air discharged from the light source device 41F, to the outside of the exterior casing 2 via the exhaust port 2E1, similarly to the duct 7C. This duct 7F has an introduction part 7F1, and the arrangement part 73 where the fan 64 is arranged.

The introduction part 7F1, similarly to the introduction parts 71, 7D1, faces the light source device 41F and the power supply device 5 and introduces the air which has cooled these, to the inside. This introduction part 7F1 has a connecting part 7F11 and inlets 7F12, 7F13, 7D13, 714 (not illustrated in FIG. 17), 715.

The connecting part 7F11 is, similarly to the connecting part 7D11, a site facing the air guide part 418F and the left lateral surface part 415E of the duct 7F and also functions as a guide part which contacts these and guides the accommodation of the light source device 41F into the light source accommodation section 471.

The inlets 7F12, 7F13 are formed in positions corresponding to the openings F16, F21 in the connecting part 7F11. Then, the air which has circulated through the first duct part F1 and flows out from the opening F16 is introduced into the introduction part 7F1 via the inlet 7F12, and the air which has circulated through the second duct part F2 and flows out from the opening F21 is introduced into the introduction part 7F1 via the inlet 7F13.

The inlet 7D13 is formed in a position corresponding to the exhaust port 4152 in the connecting part 7F11, and the air which has cooled the rear part of the reflector 412 is introduced into the introduction part 7F1 via the inlet 7D13.

The inlets 714, 715 are formed on the surface facing the power supply device 5 in the introduction part 7F1.

[Flow Path of Air Introduced from Light Source Device in States Other than Time of Rupture of Light Source Lamp]

Figure 18:
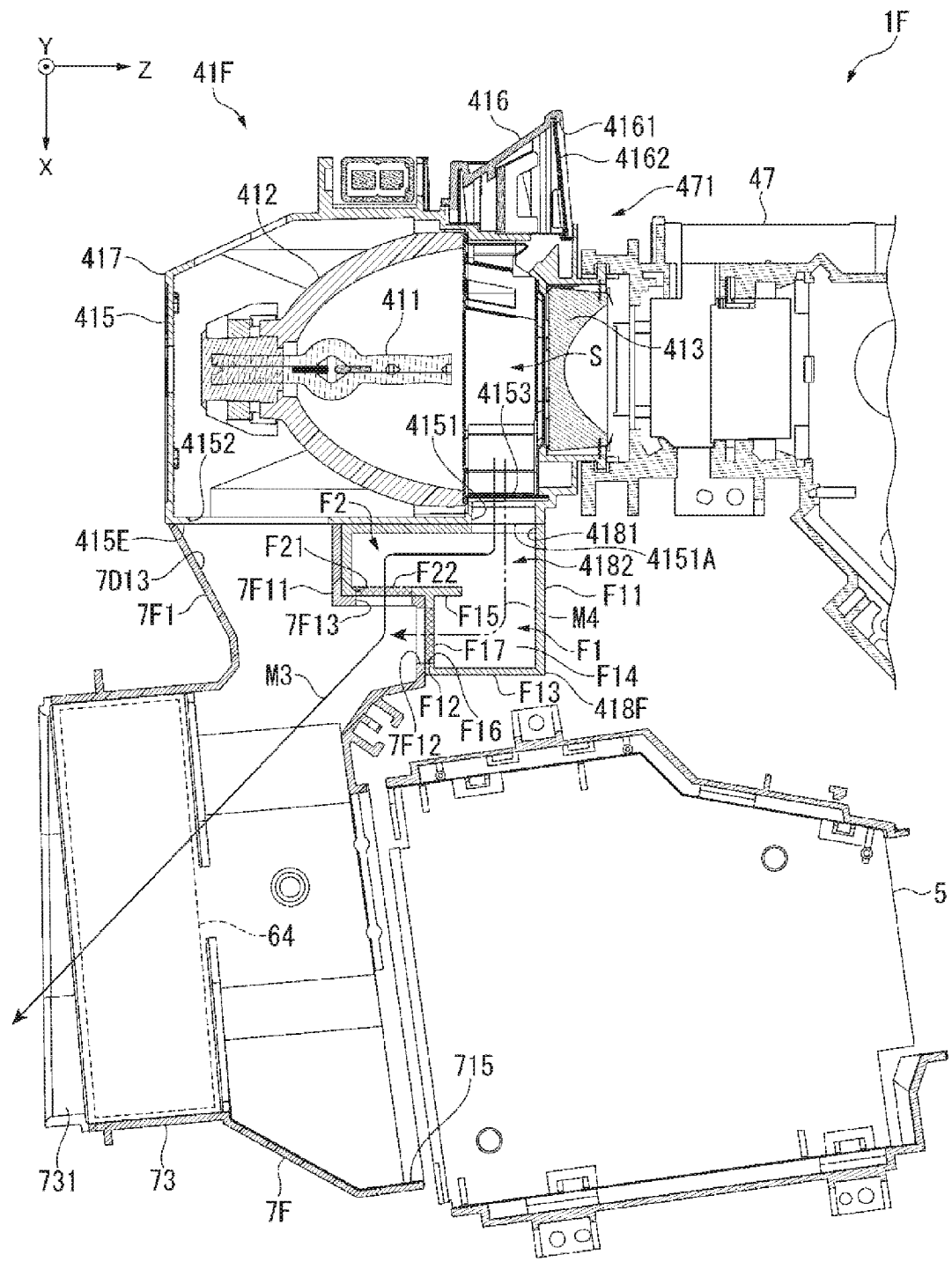
FIG. 18 is a view showing the flow path of air flowing out from the light source device in the fourth embodiment.

FIG. 18 is a view showing the flow path of the air flowing out from the light source device 41F. In FIG. 18, the flow path of the air in states other than the time of rupture of the light source lamp 411 is indicated by a solid line arrow M3, and the flow path of the air at the time of rupture of the light source lamp 411 is indicated by a chain-dotted line arrow M4.

In this embodiment, in states other than the time of rupture of the light source lamp 411, the air in the accommodation space S of the main body part 415 (for example, light source cooling air) follows the flow path indicated by the arrow M3 in FIG. 18.

Specifically, the air flows out from the exhaust port 4151 due to the convection within the main body part 415 and flows into the air guide part 418F via the inlet 4181 from the exhaust port 4151. This air is sucked by the fan 64 arranged in the duct 7F and circulates through the second duct part F2. Then, the air is introduced into the duct 7F via the opening F21 and the inlet 7F13 and discharged out of the exterior casing 2 from the exhaust port 2E1 by the fan 64.

[Flow Path of Air Introduced from Light Source Device at Time of Rupture of Light Source Lamp]

Meanwhile, at the time of rupture of the light source lamp 411, the air in the accommodation space S follows the flow path indicated by the arrow M4 in FIG. 18 due to the blast pressure.

Specifically, after being discharged along the first direction B1 from the exhaust port 4151, the air flows into the air guide part 418F via the inlet 4181 and flows into the first duct part 51 from the branching part 4182. Since this first duct part F1 extends along the first direction B1 from the branching part 4182 and subsequently extends along the second direction B2, the air discharged by the blast pressure circulates through the first duct part F1 and passes through the mesh F17 in the opening F16 formed in the sidewall part F12 on the side of the second direction B2 at the terminal end. The dust contained in the air is captured by this mesh F17 and remains in the terminal end part of the first duct part F1 formed in the shape of a cul-de-sac. Meanwhile, the air from which the dust has been eliminated is introduced into the duct 7F via the inlet 7F12 formed in the position corresponding to the opening F16 and discharged out of the exterior casing 2 from the exhaust port 2E1 by the fan 64.

Although not illustrated, the air which has cooled the rear side of the reflector 412 and the air which has cooled the power supply device 5 are introduced into the introduction part 7F1 via the inlets 7D13, 714, 715 by the fan 64, irrespective of the state of the light source lamp 411, similarly to the above. These airs, too, are discharged out of the exterior casing 2 from the exhaust port 2E1.

[Effects of Fourth Embodiment]

The projector 1F according to this embodiment described above can achieve effects similar to those of the projector 1 and can also achieve the following effects.

The first duct part F1 extends in the first direction B1 and subsequently extends along the second direction B2. The opening F16 through which the air that has circulated through the first duct part F1 flows out is formed in the sidewall part F12 located on the side of the second direction B2. Thus, since the shape of the first duct part F1 on the terminal end side in the flow path of the air circulating through the first duct part F1 is a cul-de-sac, it can be made easier to retain the dust captured by the mesh F17 covering the opening F16, in the first duct part F1. Therefore, the dust including fragments of the light source lamp 411 can be securely restrained from being discharged out of the housing 417.

Also, since the mesh F17 is arranged orthogonally to the second direction B2 at the side extending along the second direction B2 of the first duct part F1, it can be made easier to capture the dust from the air passing through the mesh F17.

[Modification of Fourth Embodiment]

Figure 19:
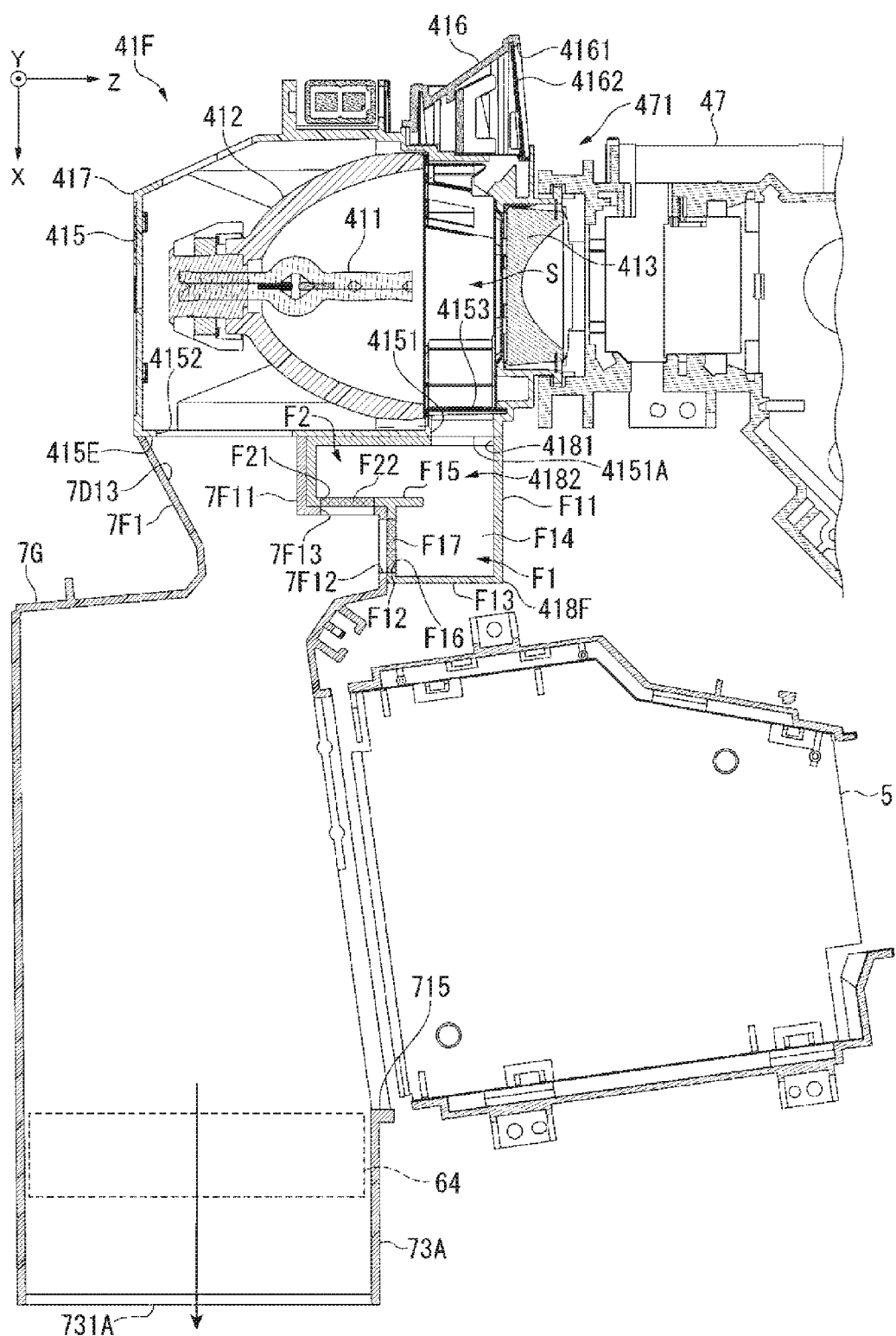
FIG. 19 is a view showing a modification of the duct in the fourth embodiment.

FIG. 19 is a cross-sectional view along the XZ plane, of a duct 7G which is a modification of the duct 7F, the light source device 41F, and the power supply device 5.

In the duct 7F, the fan 64 is arranged in the arrangement part 73 in such a way that the air sucking direction and discharge direction are along the direction opposite to the Z-direction. In contrast, the duct 7G having the arrangement part 73A instead of the arrangement part 73 (FIG. 19) may be employed, and the fan 64 may be arranged in the duct 7G in such a way that the air sucking direction and discharge direction are along the X-direction. In the case where such a duct 7G is employed, the exterior casing 2 having an exhaust port (not illustrated) formed in the front surface part 2C is employed.

[Fifth Embodiment]

Next, a fifth embodiment will be described.

The projector according to this embodiment has a configuration similar to that of the projector 1F. Here, the air guide part 418F of the projector 1F is configured in such a way that, via the openings F16, F21 formed at the terminals ends of the first duct part F1 and the second duct part F2, respectively, the air which has circulated through these duct parts F1, F2 circulates through the duct 7F. In contrast, in the projector according to this embodiment, the air guide part integrates the air which has circulated through the first duct part and the second duct part and allows the air to circulate through the duct from a single exhaust port. In this respect, the projector according to this embodiment differs from the projector 1F. In the description below, the same parts or substantially the same parts as those already described are denoted by the same reference signs and will not be described further.

Figure 20:
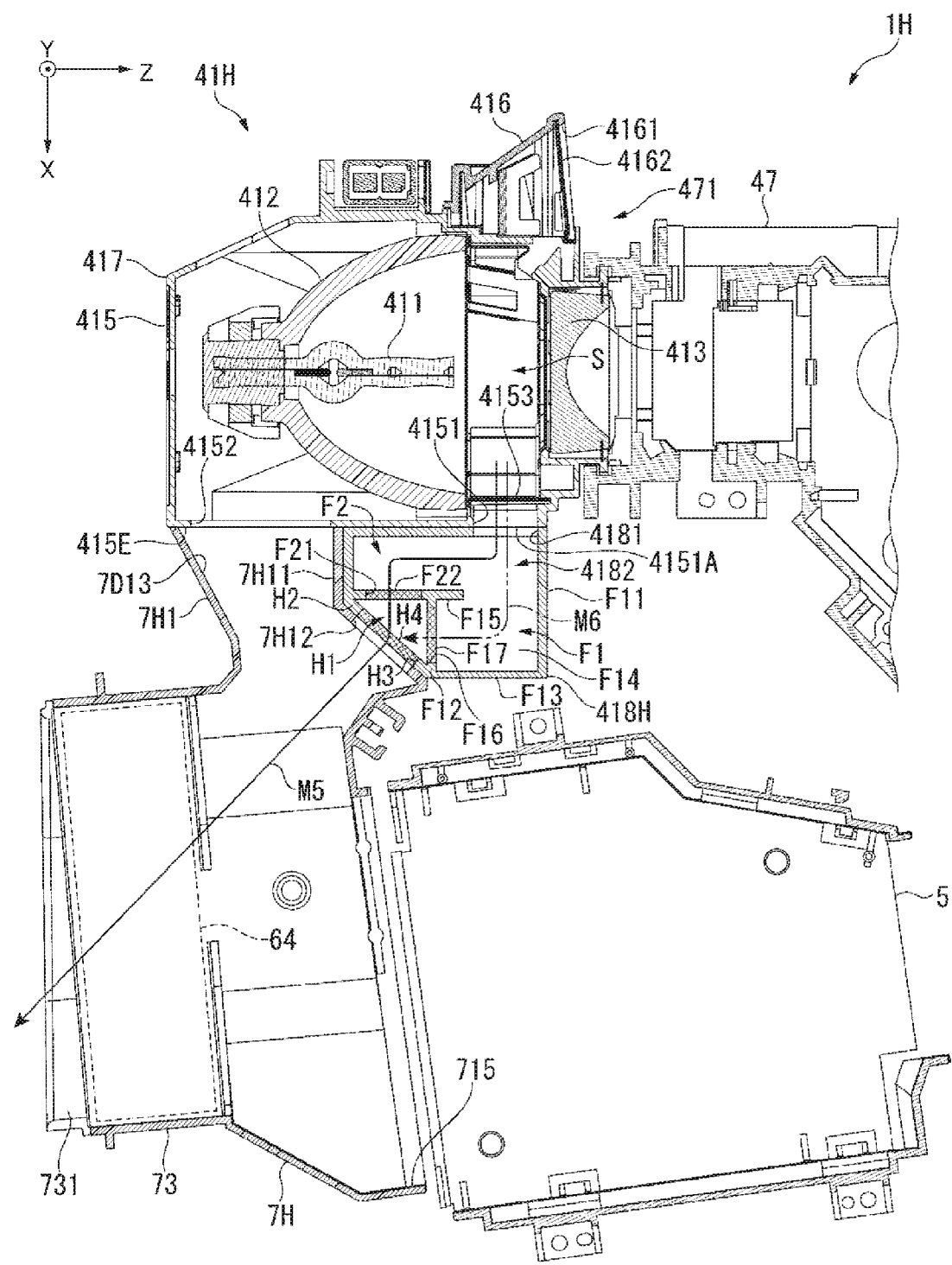
FIG. 20 is a cross-sectional view showing a light source device, a power supply device, and a duct in a fifth embodiment.

FIG. 20 is a cross-sectional view along the XZ plane, of a light source device 41H, the power supply device 5, and a duct 7H provided in the projector 1H according to this embodiment, and is a view showing the flow path of the air circulating through the duct 7H from the light source device 41H.

The projector 1H according to this embodiment has a configuration and functions similar to those of the projector 1F, except for having the light source device 41H and the duct 7H instead of the light source device 41F and the duct 7F. Of these, the light source device 41H has a configuration and functions similar those of the light source device 41F, except for having an air guide part 418H instead of the air guide part 418F, as shown in FIG. 20.

[Configuration of Air Guide Part]

The air guide part 418H is, similarly to the air guide parts 418, 418F, attached to the left lateral surface part 415E of the main body part 415 in an attachable/detachable manner and has the function of guiding the air discharged from the exhaust port 4151 of the main body part 415, to the duct 7H. In addition, the air guide part 418H also has the function of restraining fragments of the light source lamp 411 from being scattered at the time of rupture of the light source lamp 411.

This air guide part 418H has the inlet 4181, the branching part 4182, the first duct part F1 and the second duct part F2, each provided in the air guide part 418F, and also has an integrating part H1.

The integrating part H1 integrates the air which has circulated through the first duct part F1 and the second duct part F2. This integrating part H1 is formed substantially in a triangular shape as viewed from the side of the Y-direction, by sidewall parts F12, F15 and a sidewall part H2 facing these sidewall parts F12, F15, downstream in the circulating direction of the air circulating through the respective duct parts F1, F2. In other words, the integrating part H1 is formed in a position on the direction of the second direction B2 (opposite to the Z-direction) with respect to the terminal end of the first duct part F1 and a position on the side of the first direction B1 (on the side of the X-direction) with respect to the terminal end of the second duct part F2.

To this integrating part H1, the air which has circulated through the first duct part F1 is flows in via the opening F16, and the air which has circulated through the second duct part F2 flows in via the opening F21. Then, these airs flow out of the air guide part 418H via an exhaust port H3 formed in the sidewall part H2.

Also, in this embodiment, meshes F17, F22, and H4 are arranged in the openings F16, F21 and the exhaust port H3, respectively. However, without being limited to this, a configuration in which a mesh is arranged only in one of the opening F16 and the exhaust port H3 may be employed. Also, the mesh F22 provided in the opening F21 may be omitted.

Moreover, the air guide part 418H need not be attachable to/detachable from the main body part 415 and may be formed integrally with the main body part 415, similarly to the above.

[Configuration of Duct]

The duct 7H is to guide the air discharged from the light source device 41H, to the outside of the exterior casing 2 via the exhaust port 251, similarly to the duct 7F. This duct 7H has an introduction part 7H1, and the arrangement part 73 where the fan 64 is arranged.

The introduction part 7H1 faces the light source device 41H and the power supply device 5 and introduces the air which has cooled these, to the inside. This introduction part 7H1 has a configuration similar to the introduction part 7F1, except for having a connecting part 7H11 and an inlet 7H12 instead of the connecting part 7F11 and the inlets 7F12, 7F13. That is, the introduction part 7H1 has the connecting part 7H11, the inlets 7H12, 7D13, 714 (not illustrated in FIG. 20), 715.

The connecting part 7H11 is, similarly to the above, a site facing the air guide part 418H and the left lateral surface part 415E of the duct 7H and also functions as a guide part which contacts these and guides the accommodation of the light source device 41H into the light source accommodation section 471.

The inlet 7H12 is formed in a position corresponding to the exhaust port H3 in the connecting part 7H11. The air which has circulated through the air guide part 418H and is discharged from the exhaust port H3 is introduced into the introduction part 7H1 via this inlet 7H12.

[Flow Path of Air Introduced from Light Source Device in States Other than Time of Rupture of Light Source Lamp]

In states other than the time of rupture of the light source lamp 411, the air in the accommodation space S of the main body part 415 flows into the air guide part 418H via the inlet 4181 from the exhaust port 4151, as indicated by a solid line arrow M5 in FIG. 20. This air is sucked by the fan 64 and circulates mainly through the second duct part F2. Then, after circulating through the integrating part H1, the air is introduced into the duct 7H via the exhaust port H3 and the inlet 7H12 and discharged out of the exterior casing 2 from the exhaust port 2E1 by the fan 64.

[Flow Path of Air Introduced from Light Source Device at Time of Rupture of Light Source Lamp]

At the time of rupture of the light source lamp 411, the air in the accommodation space S is discharged along the first direction B1 from the exhaust port 4151 and flows into the air guide part 418H via the inlet 4181 as indicated by a double chain-dotted line arrow M6 in FIG. 20 due to the blast pressure, as in the case of the light source device 41F having the air guide part 418F. Subsequently, the air circulates along the first duct part F1 from the branching part 4182 and reaches the opening F16 located on the side of the second direction B2. When this air passes through the opening F16, the dust contained in the air is captured by the mesh F17. Then, the air from which the dust has been eliminated circulates through the integrating part H1 and is subsequently introduced into the duct 7H via the exhaust port H3 and the inlet 7H12, as indicated by the arrow M5, and is discharged out of the exterior casing 2 from the exhaust port 2E1 by the fan 64.

Also, the air which has cooled the rear side of the reflector 412 and the air which has cooled the power supply device 5 are introduced into the introduction part 7H1 via the inlets 7D13, 714, 715 by the fan 64, irrespective of the state of the light source lamp 411, similarly to the above. These airs, too, are discharged out of the exterior casing 2 by the fan 64.

[Effects of Fifth Embodiment]

The projector 1H according to this embodiment described above can achieve effects similar to those of the projector 1F and can also achieve the following effects.

Since the air guide part 418H has the integrating part H1, the air which has circulated through the first duct part F1 and the air which has circulated through the second duct part F2 can be integrated together and discharged from the single exhaust port H3. Therefore, the configuration of the duct 7H in which the air flowing out from the air guide part 418H is introduced can be simplified, compared with the case where the air guide part 418F where the air which has circulated through the respective duct parts F1, F2 is discharged from different sites is employed.

Also, even in the case where the dust captured by the mesh F17 moves toward the second duct part F2, the dust can be restrained from being scattered out of the air guide part 418H and hence out of the housing 417, by the mesh H4 provided in the exhaust port H3. Moreover, since the mesh F22 is also provided in the opening F21 through which the air that has circulated through the second duct part F2 passes, the scattering of the dust out of the housing 417 can be securely restrained.

[Modification of Fifth Embodiment]

Figure 21:
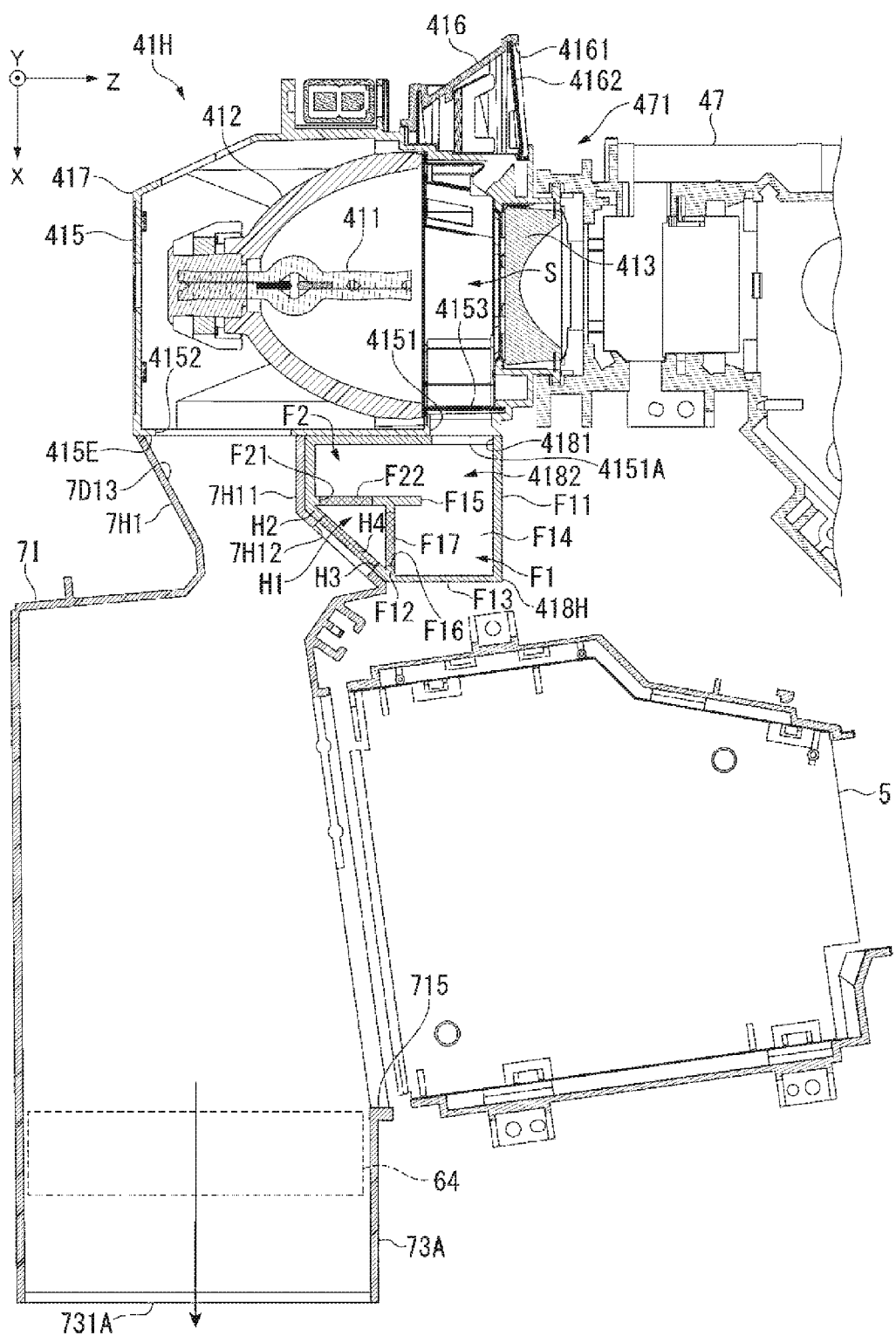
FIG. 21 is a view showing a modification of the duct in the fifth embodiment.

FIG. 21 is a cross-sectional view along the XZ plane, of a duct 7I which is a modification of the duct 7H, the light source device 41H, and the power supply device 5.

In the duct 7H, the fan 64 is arranged in the arrangement part 73 in such a way that the air sucking direction and discharge direction are along the direction opposite to the Z-direction. In contrast, the duct 7I having the arrangement part 73A instead of the arrangement part 73 (FIG. 21) may be employed, and the fan 64 may be arranged in the duct 7G in such a way that the air sucking direction and discharge direction are along the X-direction. In the case where such a duct 7I is employed, the exterior casing 2 having an exhaust port (not illustrated) formed in the front surface part 2C is employed.

[Sixth Embodiment]

Next, a sixth embodiment will be described.

The projector according to this embodiment has a configuration similar to that of the projector 1. Here, in the projector 1, the duct 7 is configured with a structure to capture dust including fragments of the light source lamp 411 which has ruptured. In contrast, the projector according to this embodiment has a duct which is attached in the exterior casing 2 in an attachable/detachable manner, instead of the duct 7, and a dust collecting member which is connected to the duct and the light source device and captures the dust flowing out from the exhaust port 4151 of the light source device 41. The projector according to this embodiment is different from the projector 1 in this respect. In the description below, the same parts or substantially the same parts as those already described are denoted by the same reference signs and will not be described further.

Figure 22:
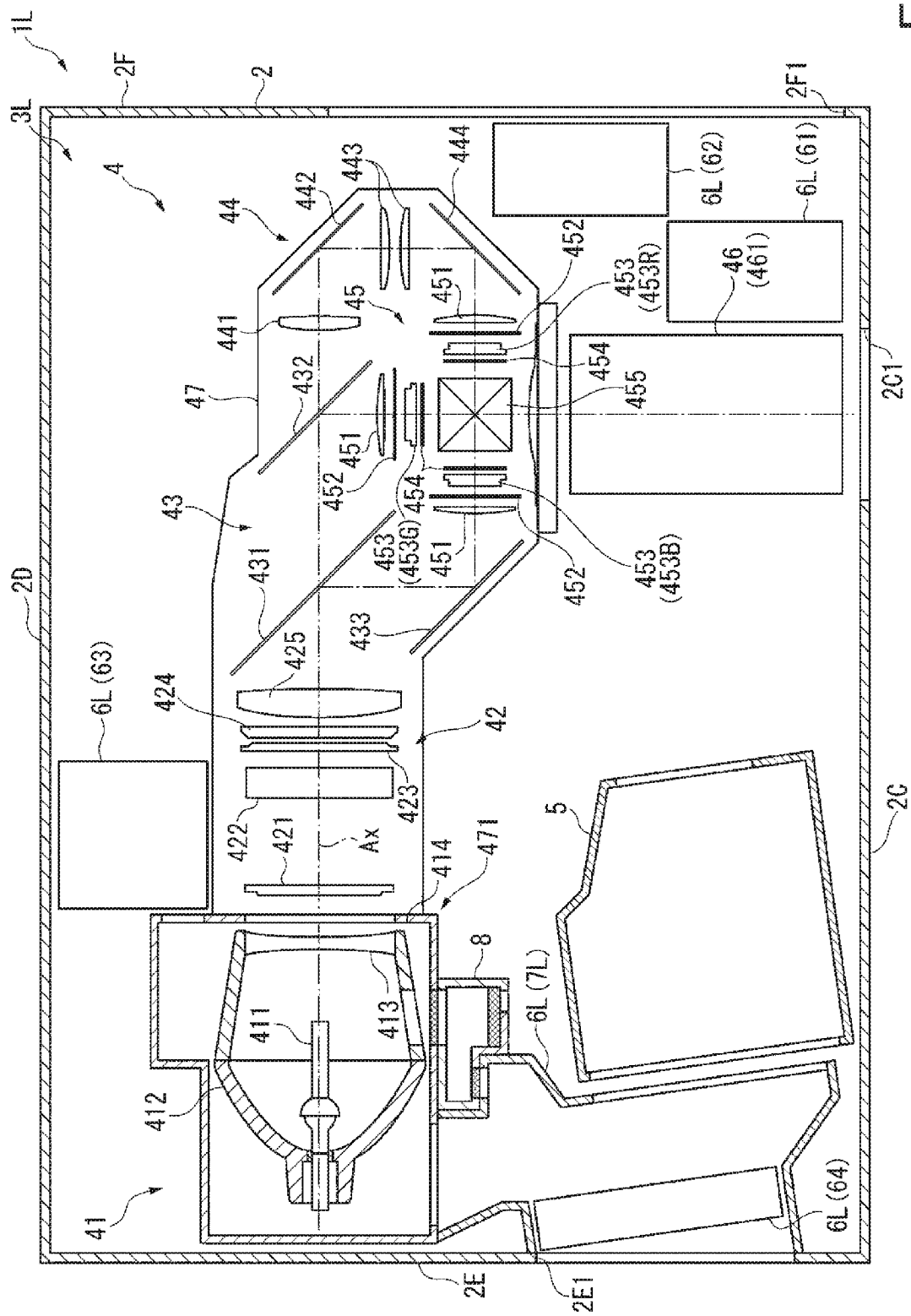
FIG. 22 is a schematic view showing the internal configuration of a projector according to a sixth embodiment.

FIG. 22 is a schematic view showing the internal configuration of a projector 1L according to this embodiment.

The projector 1L according to this embodiment has an exterior casing 2 and a device main body 3L, as shown in FIG. 22, and has functions similar to those of the projector 1.

Of these, the device main body 3L has a configuration similar to that of the device main body 3, except for having a cooling device 6L instead of the cooling device 6, and also having a dust collecting member 8. Also, the cooling device 6L has fans 61 to 64, similarly to the cooling device 6, though having a duct 7L instead of the duct 7.

[Configuration of Dust Collecting Member]

Figure 23:
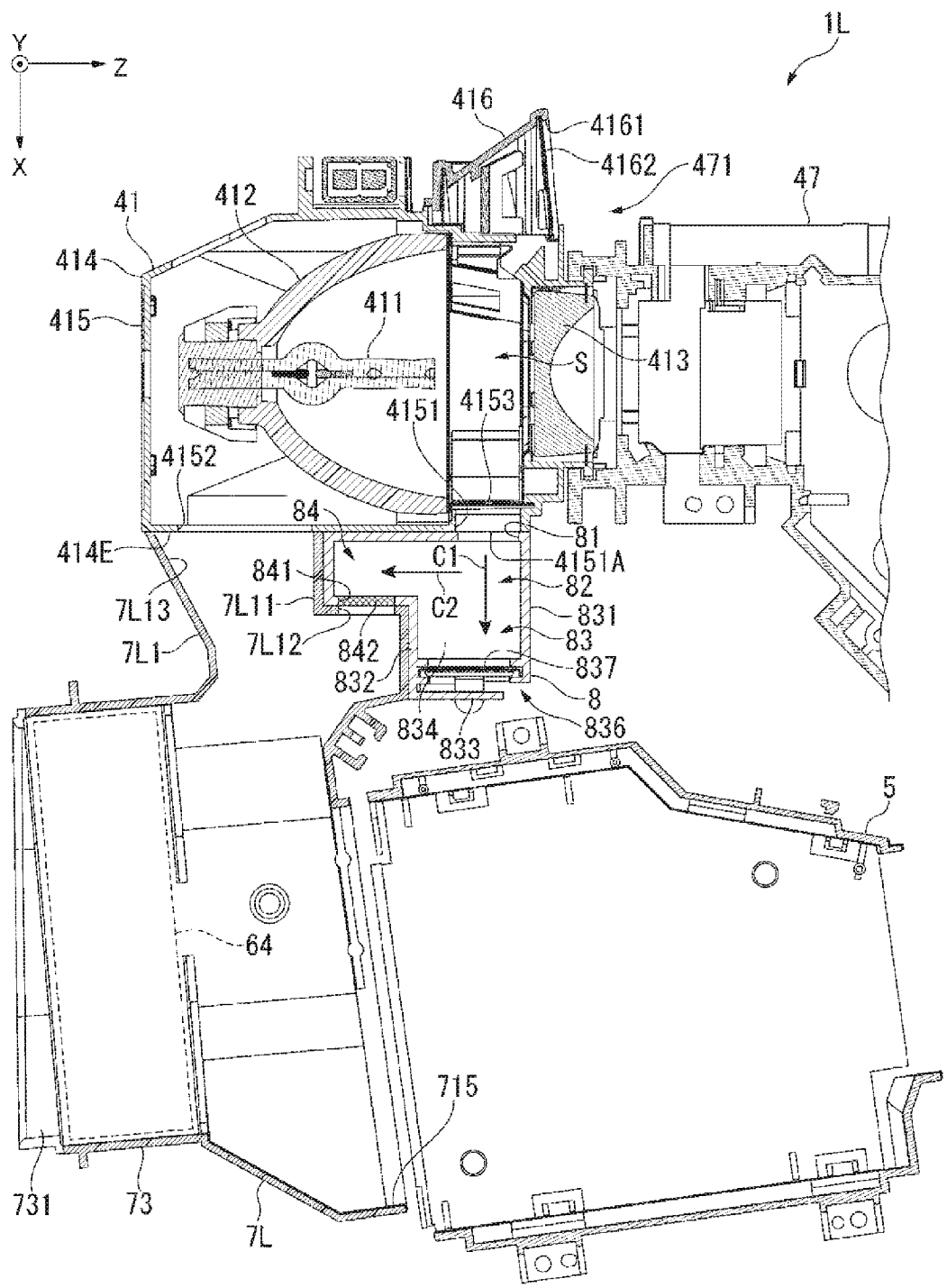
FIG. 23 is a view showing the positional relation between a light source device, a power supply device, a dust collecting member, and a duct in the sixth embodiment.

FIG. 23 is a view showing the positional relation between the light source device 41, the power supply device 5, the dust collecting member 8, and the duct 7L. In other words, FIG. 23 is a view showing a cross section of these, along the XZ plane.

The dust collecting member 8 is attached to the duct 7L in an attachable/detachable manner and has the function of guiding the air discharged from the light source device 41, to the duct 7L. In addition, the dust collecting member 8 has the function of capturing dust such as fragments of the light source lamp 411 from the air discharged from the light source device 41 and retains the dust inside, when the light source lamp 411 has ruptured. This dust collecting member 8 is attached into and detached from the exterior casing 2 via an opening (not illustrated) which is exposed by removing the lamp cover 2A1 (see FIG. 1) and which is closed by the lamp cover 2A1. In this embodiment, the dust collecting member 8 is attached to the duct 7L in an attachable/detachable manner.

This dust collecting member 8 has an inlet 81, a branching part 82, a first duct part 83, and a second duct part 84, as shown in FIG. 23.

The inlet 81 is formed substantially in a rectangular shape corresponding to the shape of the exhaust port 4151 of the main body part 415. This inlet 81 faces the exhaust port 4151, when the dust collecting member 8 is attached to the duct 7L and the light source device 41 is accommodated in the light source accommodation section 471 of the optical component casing 47. The air discharged from the exhaust port 4151 is introduced into the dust collecting member 8 via the inlet 81.

The branching part 82 is, similarly to the branching part 716, located on the inner side of the inlet 81 and communicates with each of the first duct part 83 and the second duct part 84. Of the air introduced into the branching part 82 of the dust collecting member 8 via the inlet 81, the air with a high exhaust pressure circulates toward the first duct part 83, along a first direction C1 which is a direction orthogonal to the opening plane 4151A of the exhaust port 4151 and toward the inlet 81 from the exhaust port 4151 (in this embodiment, the X-direction). Meanwhile, the air with a low exhaust pressure from the exhaust port 4151 circulates toward the second duct part 84, along a second direction C2 which is a direction intersecting with the first direction C1 (in this embodiment, the direction orthogonal to the first direction C1 as viewed from the side of the Y-direction and opposite to the Z-direction).

The first duct part 83 is a duct part extending from the branching part 82, along the first direction C1 (that is, the X-direction). This first duct part 83 is formed by sidewall parts 831 to 834 (see the illustration for the sidewall part on the side of the Y-direction) similar to the sidewall parts 7171 to 7174 of the duct part 717. Of these, at the end part on the side of the Z-direction of the sidewall part 833 located on the side of the first direction C1, an opening 836 is formed. This opening 836 discharges the air which has circulated through the first duct part 83, along the first direction C1, to a site out of the first duct part 83 and hence out of the dust collecting member 8 and out of the duct 7L.

Also, in the first duct part 83, on the side opposite to the first direction C1 from the opening 836, a mesh 837 made of a metal similar to the mesh 7177 is fixed orthogonally to the first direction C1. That is, the mesh 837 is arranged upstream in the circulating direction in which the air introduced from the inlet 81 circulates through the first duct part 83, with respect to the opening 836. This mesh 837 is formed in the shape of a plate and captures dust (for example, fragments of the light source lamp 411) contained in the air circulating through the first duct part 83, along the first direction C1.

Meanwhile, of the sidewall parts forming the first duct part 83, the sidewall part 831 located on the side of the Z-direction and along the XY plane forms an edge of the inlet 81 (the edge on the side of the Z-direction), similarly to the sidewall part 7171. Therefore, even in the case where the air within the main body part 415 circulates from the exhaust port 4151 in a direction tilted as it goes toward the first direction C1, due to the blast pressure when the light source lamp 411 has ruptured, the air circulates along the sidewall part 831 and is guided into the first duct part 83.

The second duct part 84 is a duct part extending from the branching part 82, along the second direction C2 (that is, opposite to the Z-direction). This second duct part 84 has the function of guiding the light source cooling air which has cooled the light source lamp 411 and is discharged from the exhaust port 4151, to the fan 64 arranged in the duct 7L.

Here, the light source cooling air which has cooled the light source lamp 411 is discharged from the exhaust port 4151 by the convection in the main body part 415, as described above. However, the exhaust pressure of the light source cooling air from the exhaust port 4151 is not so high. Meanwhile, since the terminal end of the second duct part 84 faces an inlet 7L12 of the duct 7L with the fan 64 arranged therein, the suction force of the fan 64 acts inside the second duct part 84. Therefore, the air introduced into the dust collecting member 8 from the exhaust port 4151 via the inlet 81 circulates through the second duct part 84 from the branching part 82 and flows into the duct 7L via an opening 841 formed in the end surface on the side of the X-direction at the terminal end of the second duct part 84, except at the time of rupture of the light source lamp 411. In this opening 841, a mesh 842 similar to the mesh 837 is arranged. However, this mesh 842 may be omitted.

[Configuration of Duct]

The duct 7L is to suck the air which has flowed into the dust collecting member 8 from the light source device 41, by the fan 64 provided inside, and to guide the air to the outside of the exterior casing 2 via the exhaust port 2E1. This duct 7L has an introduction part 7L1 and the arrangement part 73.

Of these, in the arrangement part 73, the fan 64 is arranged in such a way that the air sucking direction and discharge direction are along the direction opposite to the Z-direction.

The introduction part 7L1, similarly to the introduction part 71, faces the light source device 41, the power supply device 5, and the dust collecting member 8, and introduces the air which has circulated through the light source device 41 and the power supply device 5, to the inside. This introduction part 7L1 has a connecting part 7L11 and inlets 7L12, 7L13, 714 (not illustrated in FIG. 23), 715.

The connecting part 7L11 is a site facing the left lateral surface part 414E of the light source device 41 and the dust collecting member 8 in the duct 7L. This connecting part 7L11 is an attachment target part to which the dust collecting member 8 is attached in an attachable/detachable manner, and is also a guide part which abuts against the left lateral surface part 414E and guides the accommodation of the light source device 41 into the light source accommodation section 471.

The inlet 7L12 is formed in a position corresponding to the opening 841 in the connecting part 7L11, and introduces the air which has circulated through the second duct part 84 of the dust collecting member 8, into the introduction part 7L1.

The inlet 7L13 is formed in a position corresponding to the exhaust port 4152 in the connecting part 7L11, and introduces the air which has cooled the rear part of the reflector 412, into the introduction part 7L1.

The inlets 714, 715 are formed at sites facing the power supply device 5 in the introduction part 7L1, as in the case of the duct 7, and introduce the air inside the exterior casing 2 (for example, the air which has cooled the power supply device 5), into the introduction part 7L1.

[Flow Path of Air Introduced from Light Source Device in States Other than Time of Rupture of Light Source Lamp]

Figure 24:
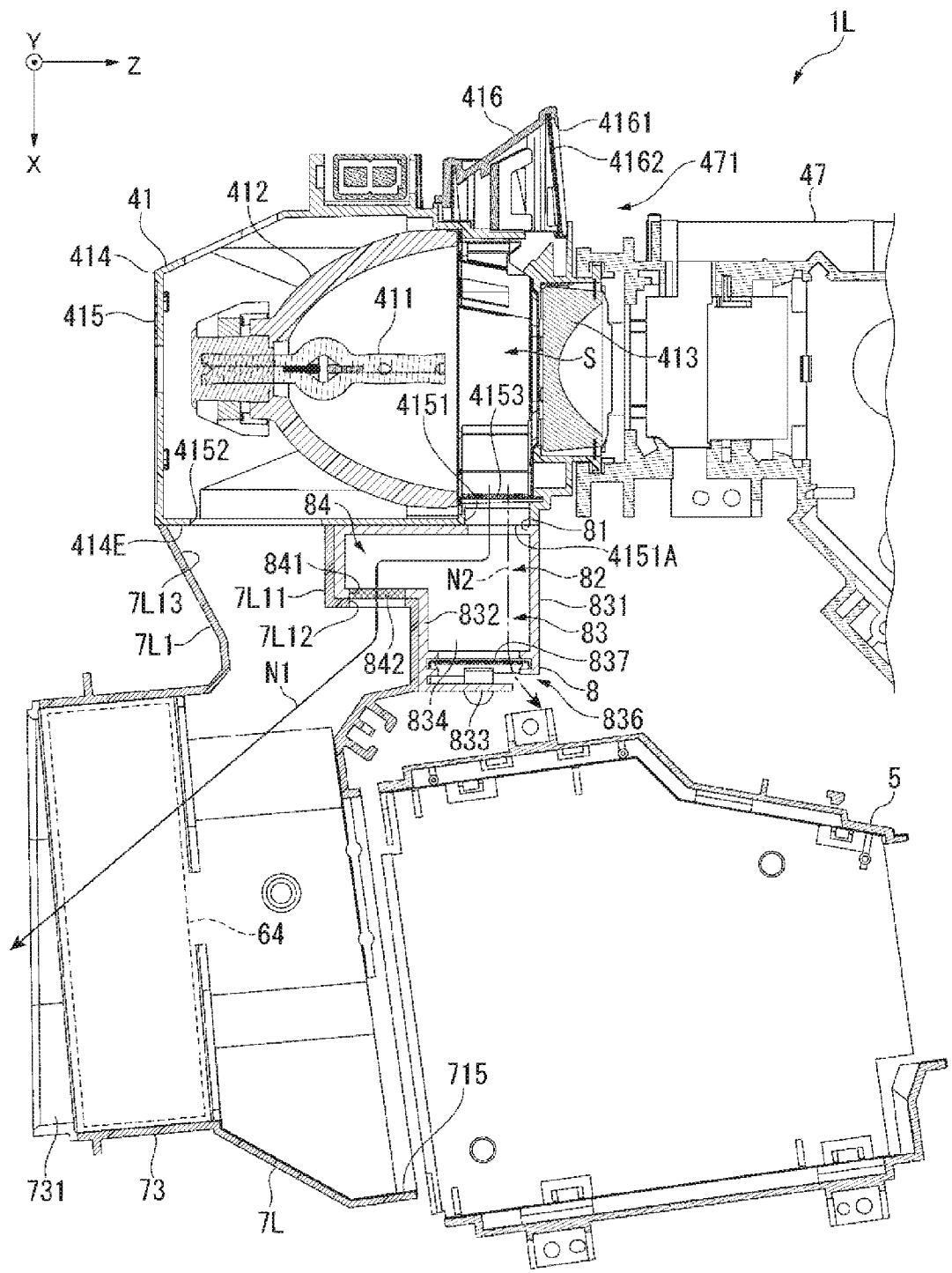
FIG. 24 is a view showing the flow path of air flowing out from the light source device in the sixth embodiment.

FIG. 24 is a view showing the flow path of the air flowing out from the light source device 41. In FIG. 24, the flow path of the air in states other than the time of rupture of the light source lamp 411 is indicated by a solid line arrow N1, and the flow path of the air at the time of rupture of the light source lamp 411 is indicated by a chain-dotted line arrow N2.

In this embodiment, in states other than the time of rupture of the light source lamp 411 (the state where the light source lamp 411 has not ruptured or the state after the rupture), the air in the accommodation space S of the main body part 415 (for example, light source cooling air) follows the flow path indicated by the arrow N1 in FIG. 24.

Specifically, the air is discharged from the exhaust port 4151 due to the convection within the main body part 415 and flows into the dust collecting member 8 via the inlet 81. The suction force of the fan 64 acts in the second duct part 84 of this dust collecting member 8. Therefore, the air which has flowed into the dust collecting member 8 flows into the second duct part 84 from the branching part 82, along the second direction C2 due to the suction force of the fan 64. Then, the air which has circulated through the second duct part 84 is introduced into the introduction part 7L1 of the duct 7L via the opening 841 and the inlet 7L12 and discharged out of the exterior casing 2 from the exhaust port 2E1 by the fan 64.

[Flow Path of Air Introduced from Light Source Device at Time of Rupture of Light Source Lamp]

Meanwhile, at the time of rupture of the light source lamp 411, the blast pressure due to the rupture is generated within the main body part 415, as described above, and therefore the exhaust pressure of the air in the accommodation space S from the exhaust port 4151 is higher than the exhaust pressure in the states other than the time of rupture of the light source lamp 411 and higher than the suction pressure of the fan 64 acting in the branching part 82. Therefore, the air discharged from the exhaust port 4151 at the time of rupture of the light source lamp 411 follows the flow path indicated by the arrow N2 in FIG. 24.

Specifically, after being introduced into the dust collecting member 8 via the inlet 81, the air circulates along the first direction C1 from the branching part 82 and flows into the first duct part 83. This air moves straight through the first duct part 83, along the first direction C1, and passes through the mesh 837. Thus, the dust contained in the air is captured by the mesh 837, and after the blast pressure subsides, the dust drops in a vertical direction (that is, the direction opposite to the Y-direction) and remains the first duct part 83. Also, the air from which the dust has been eliminated passes through the opening 836, along the first direction C1, and is discharged out of the first duct part 83 and hence out of the dust collecting member 8 and out of the duct 7L.

Meanwhile, after the blast pressure due to the rupture of the light source lamp 411 has subsided, the air introduced into the dust collecting member 8 via the inlet 81 follows the flow path indicated by the arrow N1, as described above. That is, the air flows into the second duct part 84 from the branching part 82 due to the suction force of the fan 64. In this way, in the case where the blast pressure has subsided, since the air does not easily circulate through the first duct part 83, the dust captured by the mesh 837 tends to remain in the first duct part 83 and cannot be easily discharged out of the dust collecting member 8.

Although not illustrated, the air which has cooled the rear side of the reflector 412 and the air which has cooled the power supply device 5 are introduced into the introduction part 7L1 via the inlets 7L13, 714, 715 by the fan 64, irrespective of the state of the light source lamp 411. These airs, too, are sucked by the fan 64 and discharged out of the exterior casing 2 from the exhaust port 2E1.

[Effects of Sixth Embodiment]

The projector 1L according to this embodiment described above can achieve effects similar to those of the projector 1.

The air discharged from the exhaust port 4151 (outflow port of the light source casing) of the housing 414 is introduced into the dust collecting member 8 from the inlet 81.

Here, in states other than the time of rupture of the light source lamp 411 (the state where the light source lamp 411 has not ruptured or the state after the light source lamp 411 has ruptured), the exhaust pressure from the exhaust port 4151 is relatively not high. Therefore, as the air introduced into the dust collecting member 8 due to the suction force of the fan 64 in the duct 7L connected to the dust collecting member 8 circulates through the second duct part 84 and flows into the duct 7L, the air which has cooled the light source lamp 411 can be discharged out of the dust collecting member 8.

Meanwhile, at the time of rupture of the light source lamp 411, the air containing dust such as fragments of the light source lamp 411 flows into the dust collecting member 8 from the exhaust port 4151. At this time, since the exhaust pressure from the exhaust port 4151 is relatively high due to the blast pressure generated by the rupture of the light source lamp 411, the air introduced into the dust collecting member 8 circulates in the first direction C1 orthogonal to the opening plane 4151A of the exhaust port 4151 and flows into the first duct part 83 from the branching part 82. Since the opening 836 (first opening) is formed in the sidewall part 833 forming the first duct part 83, the air which has flowed into the first duct part 83 is discharged out of the first duct part 83 via the opening 836. When this air passes through the opening 836, the dust is captured by the mesh 837 covering the opening 836. Thus, the dust is retained in the first duct part 83 and therefore the scattering of the dust out of the dust collecting member 8 is restrained.

Thus, since small fragments of the light source lamp 411 can be restrained from being scattered out of the dust collecting member 8 without making finer the mesh 4153 provided in the exhaust port 4151, the scattering of the fragments can be restrained without lowering the cooling efficiency of the light source lamp 411.

The air in the accommodation space S of the housing 414 (the air containing the dust) tends to flow into the first duct part 83 extending in the first direction C1 via the exhaust port 4151, the inlet 81, and the branching part 82, due to the blast pressure generated at the time of rupture of the light source lamp 411. The opening 836 provided in this first duct part 83 is formed in the sidewall part 833 substantially orthogonal to the first direction C1 and discharges the air circulating through the first duct part 83 out of the dust collecting member 8, along the first direction C1. Thus, since the air circulating through the first duct part 83 can be quickly discharged from the opening 836, the air circulating through the first duct part 83 can be restrained from flowing backward by being blasted against the sidewall part 833. Therefore, the air containing the dust can be restrained from circulating toward the second duct part 84, and the dust can be restrained from being discharged out of the dust collecting member 8.

Here, in the case where the light of the light source lamp 411 leaks out from the exhaust port 4151, if the opening 836 is formed substantially on the entire surface of the sidewall part 833 orthogonal to the first direction C1, the leaking light travels in the first direction C1 and can leak outside the dust collecting member 8 via the opening 836.

To cope with this, since the opening 836 is formed in the shape of a slit, the opening area of the opening 836 can be made small. Therefore, even if the light leaks out of the housing 414 via the exhaust port 4151, the light can be restrained from leaking out of the dust collecting member 8.

Also, the mesh 837 is located on the side opposite to the first direction C1 from the opening 836, that is, upstream in the circulating direction of the air passing through the opening 836. Thus, the captured dust can be retained in the first duct part 83 more easily than in the case where the mesh 837 is located downstream. Therefore, the dust including fragments of the light source lamp 411 can be securely restrained from being discharged out of the dust collecting member 8.

The mesh 837 is located in a position substantially orthogonal to the first direction C1. Thus, a configuration such that the air containing the dust and discharged along the first direction C1 from the exhaust port 4151 at the time of rupture of the light source lamp 411 securely passes through the mesh 837 can be provided, enabling the mesh 837 to capture the dust more easily. Therefore, the fragments of the light source lamp 411 can be further restrained from being discharged out of the first duct part 83 and hence out of the dust collecting member 8.

The dust collecting member 8 is attached in an attachable/detachable manner to the connecting part 7L11 of the duct 7L arranged in the exterior casing 2. Thus, when the light source lamp 411 has ruptured, the dust collecting member 8 can be replaced together with the light source device 41 and therefore the inside of the exterior casing 2 can be kept clean.

As the fan 64 in the duct 7L connecting the dust collecting member 8 with the exhaust port 2E1 (casing-side exhaust port) is driven, the air in the accommodation space S of the housing 414 (for example, the air which has cooled the light source lamp 411) can be sucked and the air can be discharged out of the exterior casing 2 via the exhaust port 2E1. Thus, the cooling efficiency of the light source lamp 411 can be improved.

[Modification of Sixth Embodiment]

Figure 25:
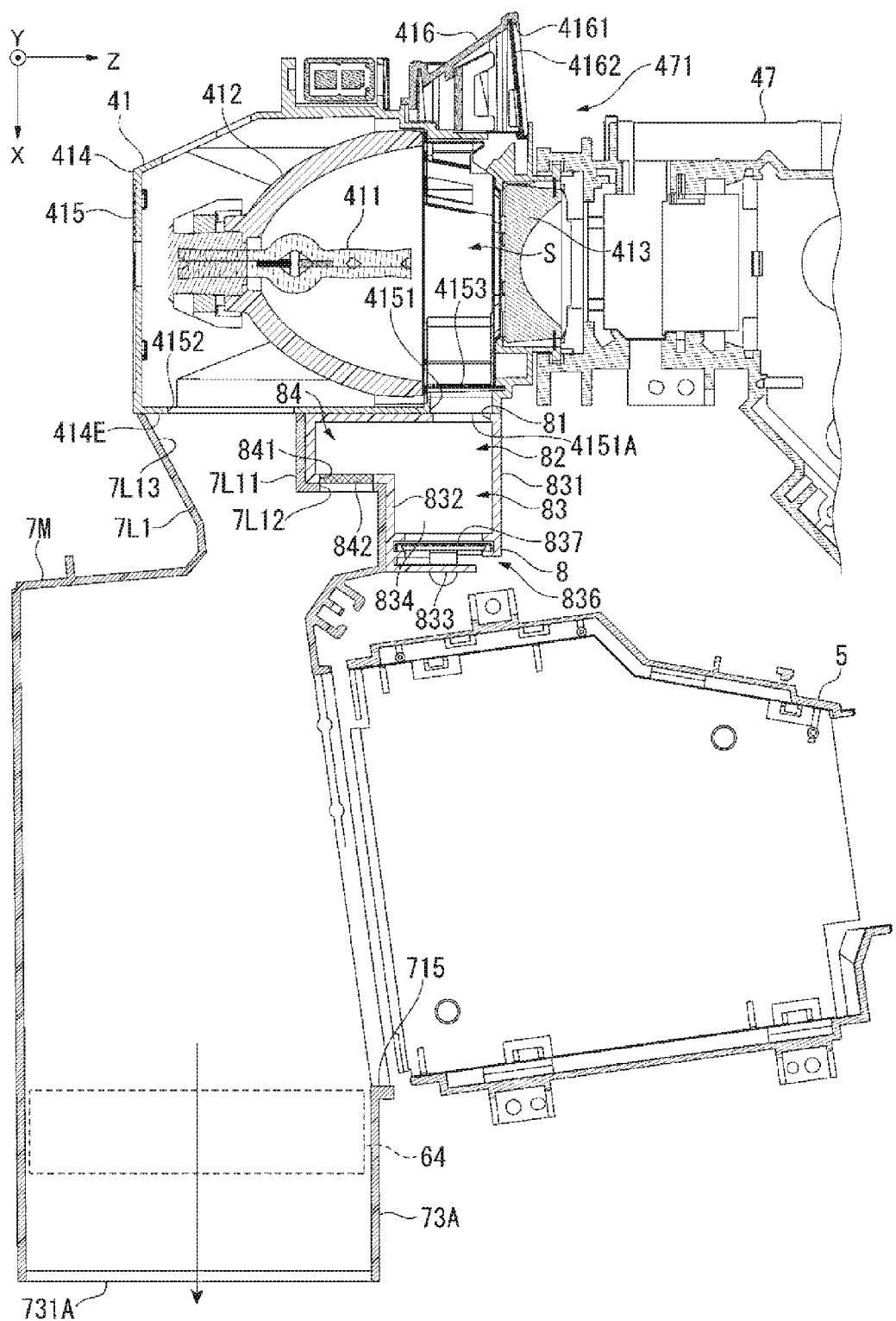
FIG. 25 is a view showing a modification of the duct in the sixth embodiment.

FIG. 25 is a cross-sectional view along the XZ plane, of a duct 7M which is a modification of the duct 7L, the light source device 41, and the power supply device 5.

In the duct 7L, the fan 64 is arranged in the arrangement part 73 in such a way that the air sucking direction and discharge direction are along the direction opposite to the Z-direction. In contrast, the duct 7M (FIG. 25) having the arrangement part 73A instead of the arrangement part 73 may be employed, and similarly to the ducts 7A, 7C, the fan 64 may be arranged in the duct 7M in such a way that the air sucking direction and discharge direction are along the X-direction. In the case where such a duct 7M is employed, the exterior casing 2 in which an exhaust port (not illustrated) is formed in the front surface part 2C is employed, similarly to the above.

[Seventh Embodiment]

Next, a seventh embodiment will be described.

The projector according to this embodiment has a configuration similar to that of the projector 1L. Here, in the dust collecting member 8 of the projector 1L, the openings 836, 841 located at the terminal ends of the first duct part 83 and the second duct part 84 are formed in positions distant from each other. In contrast, in the projector according to this embodiment, as in the duct 7B, the respective openings through which the air which has circulated through the first duct part and the second duct part is discharged are formed in positions close to each other. The projector according to this embodiment is different from the projector 1L in this respect. In the description below, the same parts or substantially the same parts as those already described are denoted by the same reference signs and will not be described further.

Figure 26:
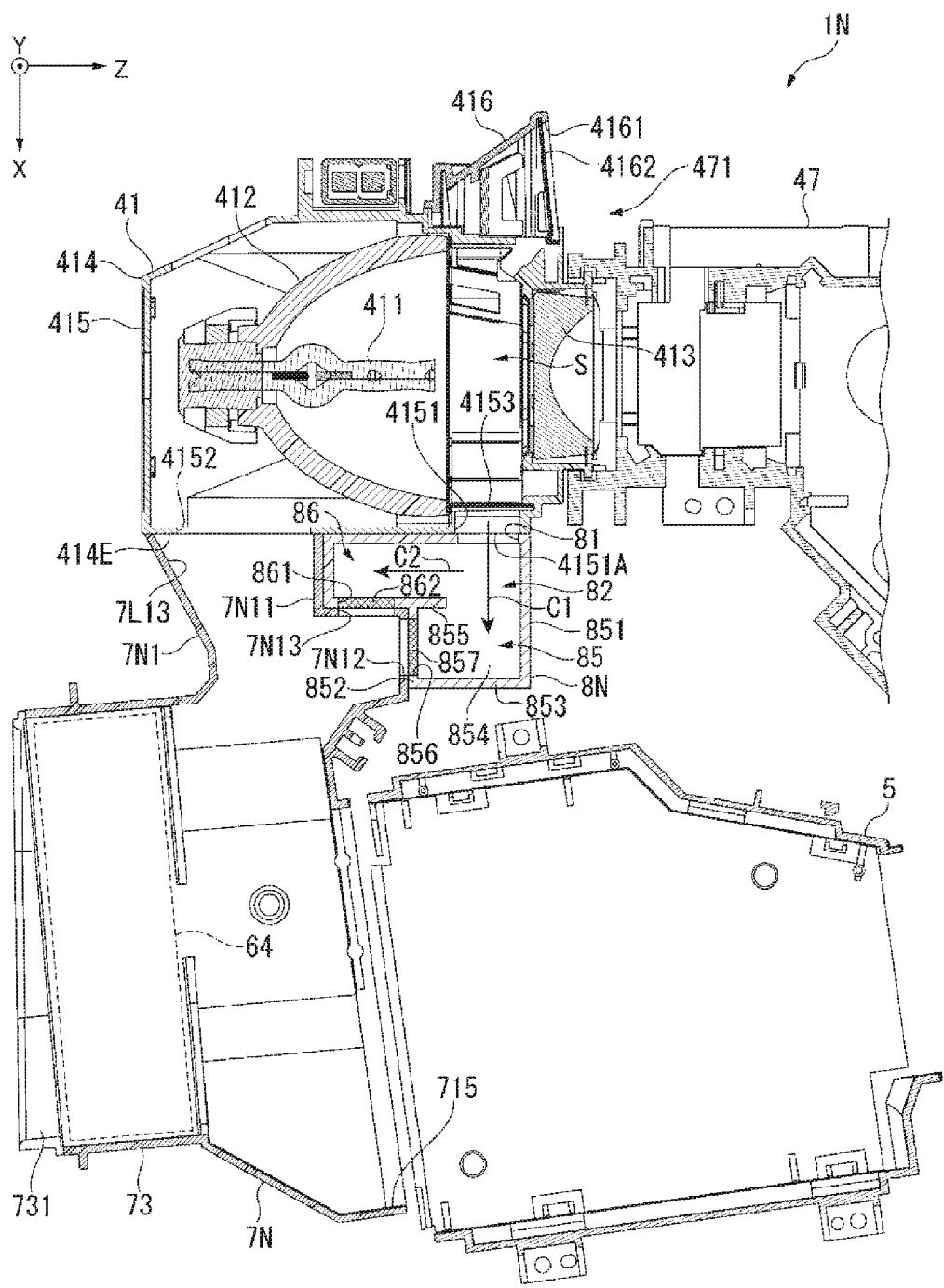
FIG. 26 is a cross-sectional view showing a light source device, a power supply device, a dust collecting member, and a duct in a seventh embodiment.

FIG. 26 is a cross-sectional view along the XZ plane, of the light source device 41, the power supply device 5, a dust collecting member 8N, and a duct 7N provided in the projector 1N according to this embodiment.

The projector 1N according to this embodiment has a configuration and functions similar to those of the projector 1L, except for having the dust collecting member 8N and the duct 7N instead of the dust collecting member 8 and the duct 7L, as shown in FIG. 26.

[Configuration of Dust Collecting Member]

The dust collecting member 8N is, similarly to the dust collecting member 8, attached to the inlet 7N1 (specifically, the connecting part 7N11) of the duct 7N in an attachable/detachable manner and has the function as a duct member which guides the air discharged from the exhaust port 4151 of the light source device 41, to the duct 7N. In addition, the dust collecting member 8N has the function of capturing dust such as fragments of the light source lamp 411 and restraining the dust from being scattered, at the time of rupture of the light source lamp 411.

This dust collecting member 8N has the inlet 81, the branching part 82, a first duct part 85, and a second duct part 86.

The first duct part 85 is a duct part through which the air within the accommodation space S that has flowed out from the exhaust port 4151 mainly due to the blast pressure generated at the time of rupture of the light source lamp 411 circulates. The first duct part 85 extends along the first direction C1 from the branching part 82 and subsequently extends along the second direction C2 orthogonal to the first direction C1. This first duct part 85 is formed by a sidewall part 851 forming the edge on the side of the Z-direction of the inlet 81, and sidewall parts 852 to 855 (see the illustration for the sidewall part on the side of the Y-direction). The extending part along the second direction C2 of the first duct part 85 is closed like a cul-de-sac by the sidewall parts 852 to 855 and the sidewall part on the side of the Y-direction.

An opening 856 is formed in the sidewall part 852, which is one of the sidewall parts forming this closed part and is located on the side of the second direction C2. In the opening 856, a mesh 857 made of a metal similar to the mesh 837 is provided orthogonally to the second direction C2. This mesh 857 is formed in the shape of a plate and captures dust (for example, fragments of the light source lamp 411) contained in the air circulating through the first duct part 85. Also, the mesh 857 may be provided in such a way as to cover the opening 856 on the side of the second direction C2 (opposite to the Z-direction) or on the side opposite to the second direction C2 (on the side of the Z-direction).

The second duct part 86 is a duct part through which the air within the accommodation space S that has flowed out from the exhaust port 4151 mainly at times other than the time of rupture of the light source lamp 411. The second duct part 86 extends along the second direction C2 from the branching part 82. That is, the second duct part 86 has the function of causing substantially all of the air introduced into the dust collecting member 8N from the main body part 415, to circulate due to the suction force of the fan 64 and thus guiding the air to the duct 7N, at times other than the time of rupture of the light source lamp 411.

Of the sidewall parts forming the terminal end part of this second duct part 86, the sidewall part on the side of the first direction C1 (X-direction) is the sidewall part 855 forming the first duct part 85. In the sidewall part 855, an opening 861 is formed in a position further on the side of the second direction C2 than the sidewall part 852. Then, the air which has circulated through the second duct part 86 is discharged out of the dust collecting member 8N via the opening 861. Also, in the opening 861, a mesh 862 similar to the mesh 857 is arranged.

In this way, the opening 861 and the opening 856 are formed in positions relatively close to each other in the sidewall parts 855, 852 orthogonal to each other. Then, the connecting part 7N11 of the duct 7N is connected to the dust collecting member 8N in such a way as to cover these openings 856, 861.

[Configuration of Duct]

The duct 7N is to suck the air which has flowed into the dust collecting member 8N from the light source device 41, by the fan 64, and guide the air to the outside of the exterior casing 2 via the exhaust port 2E1, similarly to the duct 7L. This duct 7N has an introduction part 7N1 and the arrangement part 73.

The introduction part 7N1, similarly to the introduction parts 71, 7L1, faces the light source device 41, the power supply device 5, and the dust collecting member 8N, and introduces the air which has cooled these, to the inside. This introduction part 7N1 has a connecting part 7N11 and inlets 7N12, 7N13, 7L13, 714 (not illustrated in FIG. 26), 715.

The connecting part 7N11 is, similarly to the connecting part 7L11, a site facing the left lateral surface part 414E of the light source device 41 and the dust collecting member 8N in the duct 7N. This connecting part 7N11 is an attachment target part to which the dust collecting member 8N is attached, and is also a guide part which guides the accommodation of the light source device 41 into the light source accommodation section 471.

The inlets 7N12, 7N13 are formed in positions corresponding to the openings 856, 861 in the connecting part 7N11. Then, the air circulating through the first duct part 85 and flowing out from the opening 856 is introduced into the introduction part 7N1 via the inlet 7N12, and the air circulating through the second duct part 86 and flowing out from the opening 861 is introduced into the introduction part 7N1 via the inlet 7N13.

The inlet 7L13 is formed in a position corresponding to the exhaust port 4152 in the connecting part 7N11, and the air which has cooled the rear part of the reflector 412 is introduced into the introduction part 7N1 via the inlet 7L13.

The inlets 714, 715 are formed on the surface facing the power supply device 5, of the introduction part 7N1.

[Flow Path of Air Introduced from Light Source Device in States Other than Time of Rupture of Light Source Lamp]

Figure 27:
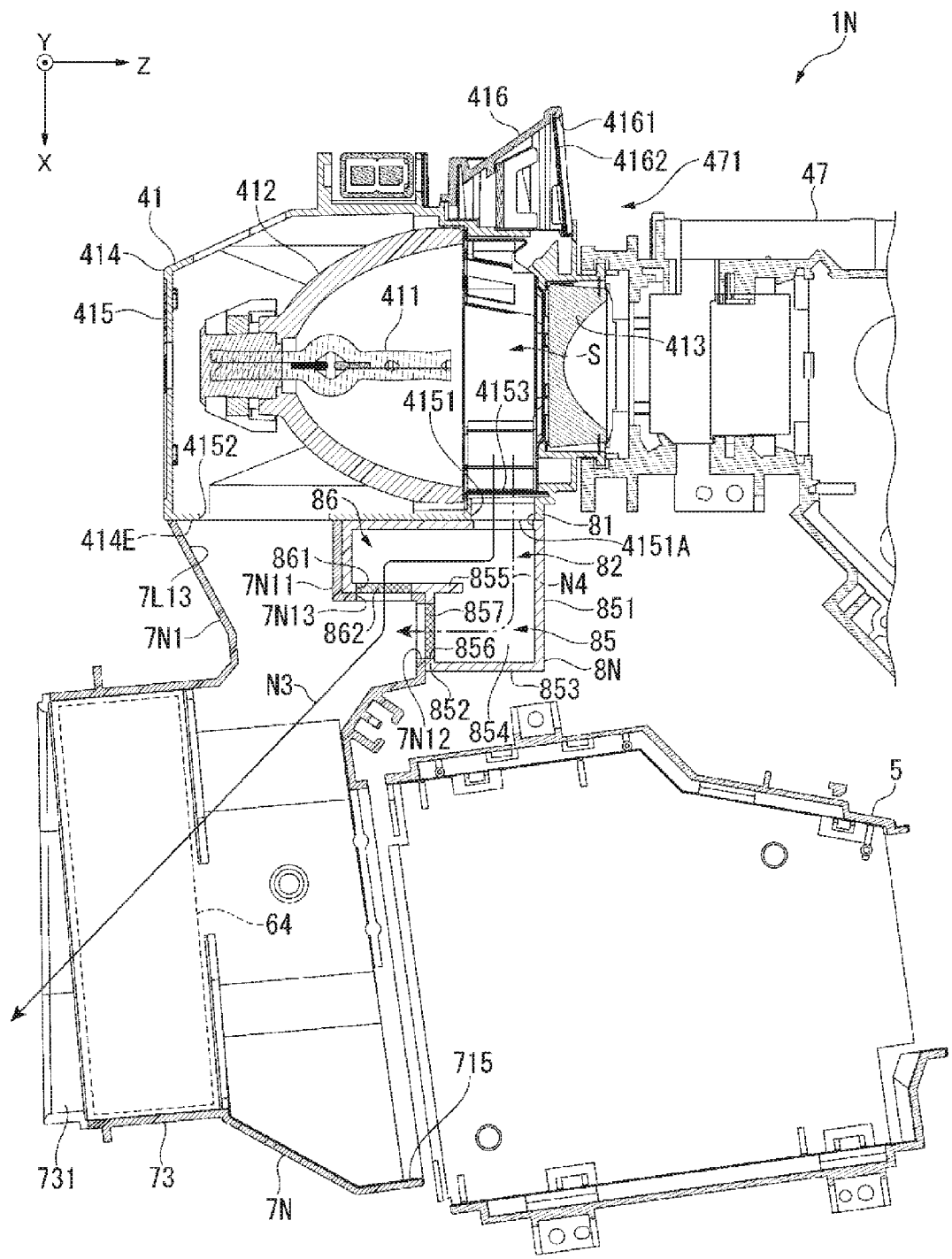
FIG. 27 is a view showing the flow path of air flowing out from the light source device in the seventh embodiment.

FIG. 27 is a view showing the flow path of the air flowing out from the light source device 41. In FIG. 27, the flow path of the air at times other than the time of rupture of the light source lamp 411 is indicated by a solid line arrow N3, and the flow path of the air at the time of rupture of the light source lamp 411 is indicated by a chain-dotted line arrow N4.

In this embodiment, in states other than the time of rupture of the light source lamp 411, the air in the accommodation space S of the main body part 415 (for example, light source cooling air) follows the flow path indicated by the arrow N3 in FIG. 27.

Specifically, the air flows out from the exhaust port 4151 due to the convection within the main body part 415 and flows into the dust collecting member 8N via the inlet 81 from the exhaust port 4151. This air is sucked by the fan 64 in the duct 7N connected to the dust collecting member 8N, and circulates mainly through the second duct part 86. Then, the air is introduced into the duct 7N via the opening 861 and the inlet 7N13 and discharged out of the exterior casing 2 from the exhaust port 2E1 by the fan 64.

[Flow Path of Air Introduced from Light Source Device at Time of Rupture of Light Source Lamp]

Meanwhile, at the time of rupture of the light source lamp 411, the air in the accommodation space S follows the flow path indicated by the arrow N4 in FIG. 27 due to the blast pressure.

Specifically, after being discharged along the first direction C1 from the exhaust port 4151, the air flows into the dust collecting member 8N via the inlet 81 and flows into the first duct part 85 from the branching part 82. Since this first duct part 85 extends along the first direction C1 from the branching part 82 and subsequently extends along the second direction C2, the air discharged by the blast pressure circulates through the first duct part 85 and passes through the mesh 857 in the opening 856 formed in the sidewall part 852 on the side of the second direction C2 at the terminal end. The dust contained in the air is captured by this mesh 857 and remains in the terminal end part of the first duct part 85 formed in the shape of a cul-de-sac. Meanwhile, the air from which the dust has been eliminated is introduced into the duct 7N via the inlet 7N12 formed in the position corresponding to the opening 856 and discharged out of the exterior casing 2 from the exhaust port 2E1 by the fan 64.

Although not illustrated, the air which has cooled the rear side of the reflector 412 and the air which has cooled the power supply device 5 are introduced into the introduction part 7N1 via the inlets 7L13, 714, 715 by the fan 64, irrespective of the state of the light source lamp 411. These airs, too, are discharged out of the exterior casing 2 from the exhaust port 2E1.

[Effects of Seventh Embodiment]

The projector 1N according to this embodiment described above can achieve effects similar to those of the projector 1L and can also achieve the following effects.

The first duct part 85 extends in the first direction C1 and subsequently extends along the second direction C2. The opening 856 through which the air that has circulated through the first duct part 85 flows out is formed in the sidewall part 852 located on the side of the second direction C2. Thus, since the shape of the first duct part 85 on the terminal end side in the flow path of the air circulating through the first duct part 85 is a cul-de-sac, it can be made easier to retain the dust captured by the mesh 857 covering the opening 856, in the first duct part 85. Therefore, the dust including fragments of the light source lamp 411 can be securely restrained from being discharged out of the dust collecting member 8N.

Also, since the mesh 857 is arranged orthogonally to the second direction C2 at the side extending along the second direction C2 of the first duct part 85, it can be made easier to capture the dust from the air passing through the mesh 857.

[Modification of Seventh Embodiment]

Figure 28:
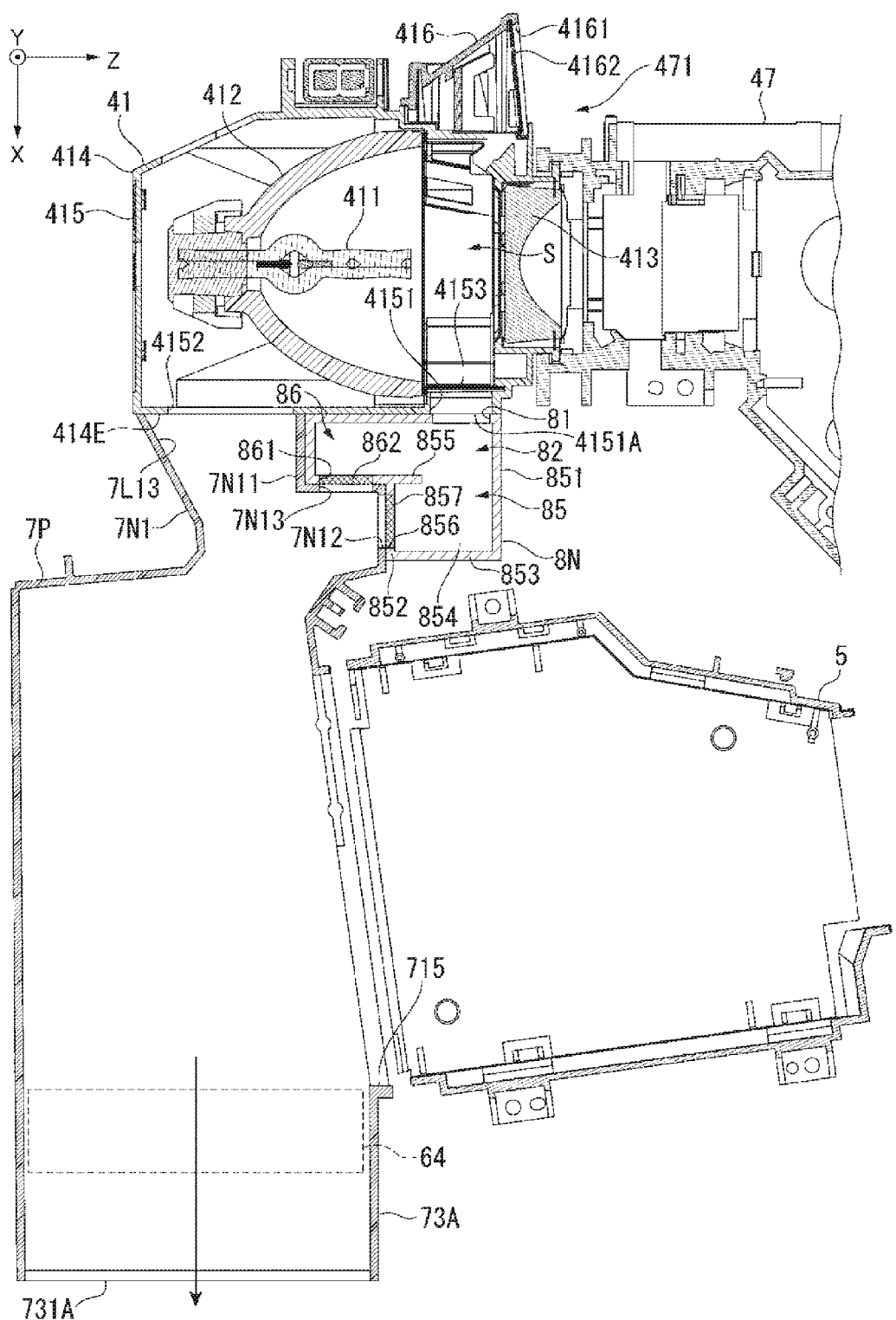
FIG. 28 is a view showing a modification of the duct in the seventh embodiment.

FIG. 28 is a cross-sectional view along the XZ plane, of a duct 7P which is a modification of the duct 7N, the light source device 41, the power supply device 5, and the dust collecting member 8N.

In the duct 7N, the fan 64 is arranged in the arrangement part 73 in such a way that the air sucking direction and discharge direction are along the direction opposite to the Z-direction. In contrast, the duct 7P having the arrangement part 73A instead of the arrangement part 73 (FIG. 28) may be employed, and the fan 64 may be arranged in the duct 7P in such a way that the air sucking direction and discharge direction are along the X-direction. In the case where such a duct 7P is employed, the exterior casing 2 having an exhaust port (not illustrated) formed in the front surface part 2C is employed.

[Eighth Embodiment]

Next, an eighth embodiment will be described.

The projector according to this embodiment has a configuration similar to that of the projector 1N. Here, the dust collecting member 8N of the projector 1N is configured in such a way that, via the openings 856, 861 formed at the terminal ends of the first duct part 85 and the second duct part 86, the air which has circulated through these duct parts 85, 86 is made to circulate in the duct 7N. In contrast, in the projector according to this embodiment, the dust collecting member integrates the air which has circulated through the first duct part and the second duct part and causes the air to circulate through the duct from a single exhaust port. The projector according to this embodiment is different from the projector 1N in this respect. In the description below, the same parts or substantially the same parts as those already described are denoted by the same reference signs and will not be described further.

Figure 29:
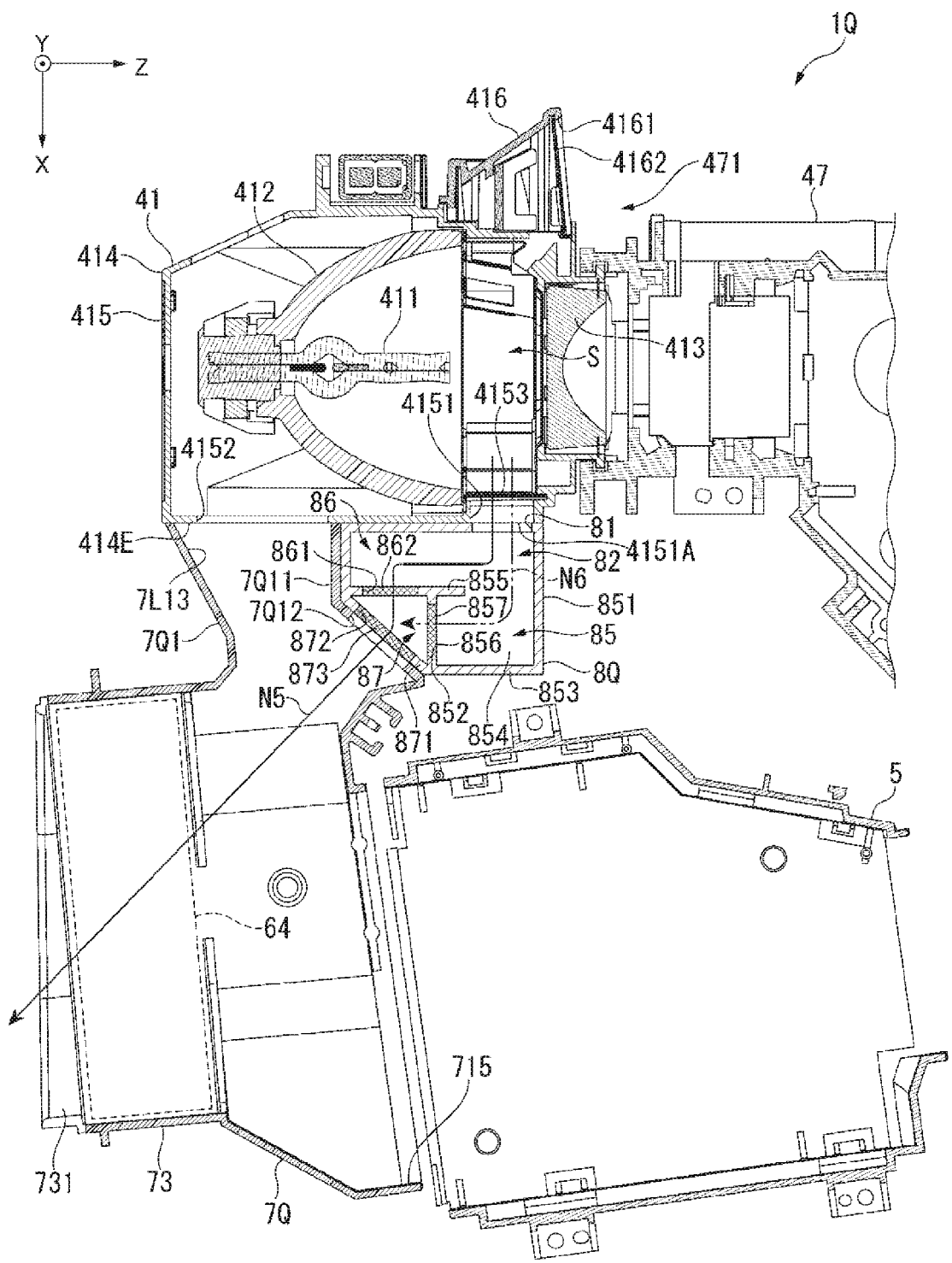
FIG. 29 is a cross-sectional view showing a light source device, a power supply device, a dust collecting member, and a duct in an eighth embodiment.

FIG. 29 is a cross-sectional view along the XZ plane, of the light source device 41, the power supply device 5, a dust collecting member 8Q, and a duct 7Q provided in a projector 1Q according to this embodiment, and is a view showing the flow path of the air circulating through the duct 7Q via the dust collecting member 8Q from the light source device 41.

The projector 1Q according to this embodiment has a configuration and functions similar to those of the projector 1N, except for having the dust collecting member 8Q and the duct 7Q instead of the dust collecting member 8N and the duct 7N, as shown in FIG. 29.

[Configuration of Dust Collecting Member]

The dust collecting member 8Q is, similarly to the dust collecting members 8, 8N, attached to the duct 7Q in an attachable/detachable manner and has the function of guiding the air discharged from the exhaust port 4151 of the light source device 41, to the duct 7Q. In addition, the dust collecting member 8Q has the function of restraining fragments of the light source lamp 411 from being scattered at the time of rupture of the light source lamp 411.

This dust collecting member 8Q has an integrating part 87 in addition to the configuration of the dust collecting member 8N. That is, the dust collecting member 8Q has the inlet 81, the branching part 82, the first duct part 85, the second duct part 86, and the integrating part 87.

The integrating part 87 integrates the air which has circulated through the first duct part 85 and the second duct part 86. This integrating part 87 is formed substantially in a triangular shape as viewed from the side of the Y-direction by the sidewall parts 852, 855 and a sidewall part 871 facing each of the sidewall parts 852, 855, downstream in the circulating direction of the air circulating through the respective duct parts 85, 86. In other words, the integrating part 87 is formed in a position on the side of the second direction C2 (opposite to the Z-direction) with respect to the terminal end of the first duct part 85 and on the side of the first direction C1 (on the side of the X-direction) with respect to the terminal end of the second duct part 86.

To this integrating part 87, the air which has circulated through the first duct part 85 flows in via the opening 856, and the air which has circulated through the second duct part 86 flows in via the opening 861. Then, these airs flow out of the dust collecting member 8Q via an exhaust port 872 formed in the sidewall part 871.

Also, in this embodiment, meshes 857, 862, 873 are arranged in the openings 856, 861 and the exhaust port 872, respectively. However, without being limited to this, a configuration in which a mesh is arranged only in one of the opening 856 and the exhaust port 872 may be employed. Also, the mesh 862 provided in the opening 861 may be omitted.

[Configuration of Duct]

The duct 7Q is to guide the air which has flowed out to the dust collecting member 8Q from the light source device 41, to the outside of the exterior casing 2 via the exhaust port 2E1, similarly to the duct 7N. This duct 7Q has an introduction part 7Q1, and the arrangement part 73 where the fan 64 is arranged.

The introduction part 7Q1, similarly to the introduction part 7N1, faces the light source device 41, the power supply device 5, and the dust collecting member 8Q, and introduces the air which has circulated through the light source device and the power supply device 5, to the inside. This introduction part 7Q1 has a configuration similar to that of the introduction part 7N1, except for having a connecting part 7Q11 and an inlet 7Q12 instead of the connecting part 7N11 and the inlets 7N12, 7N13. That is, this introduction part 7Q1 has the connecting part 7Q11 and the inlets 7Q12, 7L13, 714 (not illustrated in FIG. 29), 715.

The connecting part 7Q11 is, similarly to the connecting part 7N11, a site facing the left lateral surface part 414E of the light source device 41 and the dust collecting member 8Q in the duct 7Q. This connecting part 7Q11 is an attachment target part to which the dust collecting member 8Q is attached in an attachable/detachable manner, and is also a guide part which abuts against the left lateral surface part 414E and guides the accommodation of the light source device 41 into the light source accommodation section 471.

The inlet 7Q12 is formed in a position corresponding to the exhaust port 872 in the connecting part 7Q11. The air which has circulated through the dust collecting member 8Q and is discharged from the exhaust port 872 is introduced into the introduction part 7Q1 via this inlet 7Q12.

[Flow Path of Air Introduced from Light Source Device in States Other than Time of Rupture of Light Source Lamp]

In states other than the time of rupture of the light source lamp 411, the air in the accommodation space S of the main body part 415 flows into the dust collecting member 8Q via the inlet 81 from the exhaust port 4151, as indicated by a solid line arrow N5 in FIG. 29. This air is sucked by the fan 64 and circulates mainly through the second duct part 86. Then, after circulating through the integrating part 87, the air is introduced into the duct 7Q via the exhaust port 872 and the inlet 7Q12 and discharged out of the exterior casing 2 from the exhaust port 2E1 by the fan 64.

[Flow Path of Air Introduced from Light Source Device at Time of Rupture of Light Source Lamp]

At the time of rupture of the light source lamp 411, the air in the accommodation space S is discharged along the first direction C1 from the exhaust port 4151 and flows into the dust collecting member 8Q via the inlet 81 as indicated by a double chain-dotted line arrow N6 in FIG. 29 due to the blast pressure, as in the case of the projector 1N. Subsequently, the air circulates along the first duct part 85 from the branching part 82 and reaches the opening 856 located on the side of the second direction C2. When this air passes through the opening 856, the dust contained in the air is captured by the mesh 857. Then, the air from which the dust has been eliminated circulates through the integrating part 87 and is subsequently introduced into the duct 7Q via the exhaust port 872 and the inlet 7Q12, as indicated by the arrow N5, and is discharged out of the exterior casing 2 from the exhaust port 2E1 by the fan 64.

Also, the air which has cooled the rear side of the reflector 412 and the air which has cooled the power supply device 5 are introduced into the introduction part 7Q1 via the inlets 7L13, 714, 715 by the fan 64 and discharged out of the exterior casing 2 by the fan 64, irrespective of the state of the light source lamp 411, similarly to the above.

[Effects of Eighth Embodiment]

The projector 1Q according to this embodiment described above can achieve effects similar to those of the projector 1N and can also achieve the following effects.

Since the dust collecting member 8Q has the integrating part 87, the air which has circulated through the first duct part 85 and the air which has circulated through the second duct part 86 can be integrated together and discharged from the single exhaust port 872. Therefore, the configuration of the duct 7Q in which the air flowing out from the dust collecting member 8Q is introduced can be simplified, compared with the case where the dust collecting member 8Q where the air which has circulated through the respective duct parts 85, 86 is discharged from different sites is employed.

Also, even in the case where the dust captured by the mesh 857 moves toward the second duct part 86, the dust can be restrained from being scattered out of the dust collecting member 8Q by the mesh 873 provided in the exhaust port 872. Moreover, since the mesh 862 is also provided in the opening 861 through which the air that has circulated through the second duct part 86 passes, the scattering of the dust out of the dust collecting member 8Q can be securely restrained.

[Modification of Eighth Embodiment]

Figure 30:
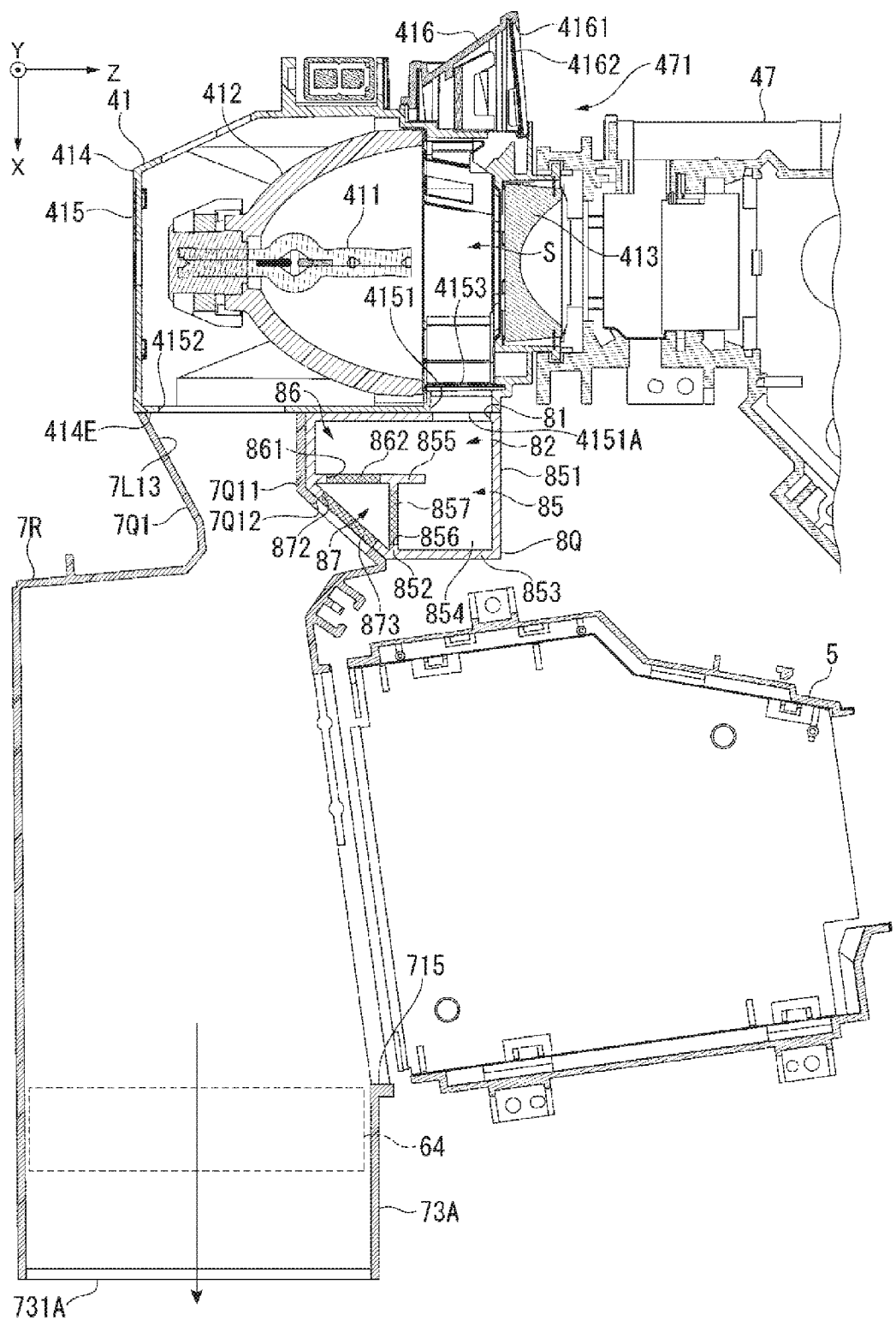
FIG. 30 is a view showing a modification of the duct in the eighth embodiment.

FIG. 30 is a cross-sectional view along the XZ plane, of a duct 7R which is a modification of the duct 7Q, the light source device 41, the power supply device 5, and the dust collecting member 8Q.

In the duct 7Q, the fan 64 is arranged in the arrangement part 73 in such a way that the air sucking direction and discharge direction are along the direction opposite to the Z-direction. In contrast, the duct 7R having the arrangement part 73A instead of the arrangement part 73 (FIG. 30) may be employed, and the fan 64 may be arranged in the duct 7R in such a way that the air sucking direction and discharge direction are along the X-direction. In the case where such a duct 7R is employed, the exterior casing 2 having an exhaust port (not illustrated) formed in the front surface part 2C is employed.

[Modifications of Each Embodiment]

The invention is not limited to the respective embodiments. Modifications, improvements and the like within the scope that can achieve the object of the invention are included in the invention.

In the respective embodiments, the ducts 7, 7A to 7I, 7L to 7N, 7F to 7R are substantially L-shaped as viewed from the side of the Y-direction. However, this is not limiting. For example, the shape of the duct may be substantially in a U-shape in which the duct part 717, 717B extends further in the first direction A1. That is, the shape of the duct can be changeable when appropriate.

In the first and second embodiments, the ducts 7, 7A to 7C are configured in such a way that at least a part of the duct parts 717, 717B extends from the branching part 716, along the first direction A1 orthogonal to the opening plane 4151A, which is a plane connecting the edges of the exhaust port 4151, and that at least a part of the duct part 718 extends from the branching part 716, along the second direction A2 orthogonal to the first direction A1. Of these, the first direction A1 is a direction along the X-direction in the projectors 1, 1B, and the second direction A2 is a direction along the direction opposite to the Z-direction. However, this is not limiting. For example, in the case where the exhaust port 4151 is formed in a position opening in the Z-direction, the first direction A1 may be a direction along the Z-direction, and the second direction A2 may be a direction orthogonal to the Z-direction. That is, the position of the exhaust port 4151 in the light source device 41 is changeable when appropriate, and in the projector, the direction of each of the first direction A1 orthogonal to the opening plane 4151A and the second direction A2 orthogonal to the first direction A1 is changeable when appropriate in consideration of the configuration of the light source device 41 and the position of the exhaust port 4151 or the like.

Similarly, in the third to eighth embodiments, the first directions B1, C1 are directions along the X-direction, and the second direction B2, C2 are directions opposite to the Z-direction. However, this is not limiting. For example, the second directions B2, C2 may be directions along the Z-direction. That is, the direction of each of the first directions B1, C1 and the second directions B2, C2 intersecting with the first directions B1, C1 is changeable when appropriate in consideration of the configurations of the light source devices 41, 41D, 41F, 41H and the position of the exhaust port 4151 or the like.

In the first embodiment, the opening 7176 of the duct part 717 is formed in the sidewall part 7173 located on the side of the first direction A1 in the duct part 717. Meanwhile, in the second embodiment, the opening 7176 is formed in the sidewall part 7172 located on the side of the second direction A2 in the duct part 717. However, this is not limiting. For example, the opening 7176 may be formed in the sidewall part 7171 on the side opposite to the second direction A2 in the duct part 717, and may be formed in the sidewall part in the direction orthogonal to each of the first direction A1 and the second direction A2 (for example, the sidewall part 7174). That is, the position where the opening 7176 is formed may be in any sidewall part. Moreover, a configuration in which the air that has passed through the opening 7176 formed in the sidewall part 7173 of the duct part 717 circulates through the duct part 718 may be employed. In this case, the opening 7176 may be formed in a position on the side opposite to the Z-direction in the sidewall part 7173, and the air which has passed through the opening 7176 may be guided to the duct part 718.

Similarly, in the third embodiment, in the air guide part 418, the opening D16 through which the air that has circulated through the first duct part D1 is discharged is formed in the sidewall part D13 located in the first direction E1 in the first duct part D1 and substantially orthogonal to the first direction. B1. However, this is not limiting. For example, the opening may be formed in the sidewall part D11, and may be formed in the sidewall part (not illustrated) located on the side of the Y-direction or in the sidewall part D14 located on the side opposite to the Y-direction. That is, the position of the opening D16 may be in any part of the first duct part D1.

Also, in the sixth embodiment, in the dust collecting member 8, the opening 836 through which the air that has circulated through the first duct part 83 is discharged is formed in the sidewall part 833 located in the first direction C1 in the first duct part 83 and substantially orthogonal to the first direction C1. However, this is not limiting. For example, the opening may be formed in the sidewall part 831, and may be formed in the sidewall part (not illustrated) located on the side of the Y-direction or in the sidewall part 834 located on the side opposite to the Y-direction. That is, the position of the opening 836 may be in any part of the first duct part 83.

In the first, third, and sixth embodiments, the plate-like meshes 7177, D17, 837 are arranged in positions orthogonal to the first directions A1, B1, C1. However, this is not limiting. That is, the meshes 7177, D17, 837 may be arranged in any direction and position as long as the meshes are arranged in positions covering the openings 7176, D16, 836 and can capture the fragments of the light source lamp 411 (dust) from the air discharged from the air discharged from the light source devices 41, 41D. For example, the meshes 7177, D17, 837 may be arranged, tilted in the first directions A1, B1, C1.

Also, each of the meshes is not limited to a metal and may be made of a resin or the like as long as strength and durability can be secured.

In the first, third, and sixth embodiments, the openings 7176, D16, 836 are formed in the shape of a slit at the end on the side of the Z-direction of the sidewall parts 7173, D13, 833. However, this is not limiting. That is, the openings 7176, D16, 836 may be formed, for example, at the center of sidewall parts 7173, D13, 833 and need not be in the shape of a slit, if the light shielding property or the like is not considered.

In the first, third, and sixth embodiments, the meshes 7177, D17, 837 are located on the side opposite to the first directions A1, B1, C1 with respect to the openings 7176, D16, 836 (that is, upstream in the flow path of the air passing through the openings 7176, D16, 836). However, this is not limiting. For example, the meshes 7177, D17, 837 may be fitted in the openings 7176, D16, 836. Also, the meshes 7177, D17, 837 may be arranged downstream of the openings 7176, D16, 836 (on the side of the first directions A1, B1, C1) in such a way as to cover the openings 7176, D16, 836.

In the respective embodiments, the fan 64 is arranged in the ducts 7, 7B, 7D, 7F, 7H, 7L, 7N, 7Q in such a way that the air sucking direction and discharge direction are along the direction opposite to the Z-direction, and also arranged in the ducts 7A, 7C, 7E, 7G, 7I, 7M, 7P, 7R in such a way that the air sucking direction and discharge direction are along the X-direction. However, this is not limiting. For example, the fan 64 may be arranged in the duct in such a way that the air sucking direction and discharge direction are along the Y-direction or the direction opposite to the Y-direction. In this case, the exhaust port of the exterior casing 2 through which air is discharged by the fan 64 may be formed in the top surface part 2A or the bottom surface part 2B. That is, in the first and second embodiments, the position of the fan 64 does not matter if the air introduced in the duct can be made to circulate through the duct part 718 in the state where the light source lamp 411 has not ruptured. Also, in the third to fifth embodiments, the position of the fan 64 does not matter if the air introduced in the air guide parts 418, 418F, 418H can be made to circulate through the second duct parts D2, F2 in the state where the light source lamp 411 has not ruptured. Moreover, in the sixth to eighth embodiments, the position of the fan 64 does not matter if the air introduced in the dust collecting members 8, 8N, 8Q can be made to circulate through the second duct parts 84, 86 in the state where the light source lamp 411 has not ruptured.

In addition, the fan 64 is not limited to an axial fan and may also be a centrifugal fan (sirocco fan). For example, the fan 64 formed by a centrifugal fan may be arranged with its sucking side facing the Z-direction side and its exhaust side facing the X-direction side. In other words, the fan 64 may be arranged in the arrangement part 73A in such a way that the air sucking direction is along the direction opposite to the Z-direction and that the discharge direction is along the X-direction.

The first and second embodiments are configured in such a way that the fragments of the light source lamp 411 captured by the mesh 7177 are retained in the duct parts 717, 717B is employed. Also, the third to fifth embodiments are configured in such a way that the fragments of the light source lamp 411 captured by the meshes D17, F17 are retained in the first duct parts D1, F1 is employed. Moreover, the sixth to eighth embodiments are configured in such a way that the fragments of the light source lamp 411 captured by the meshes 837, 857 are retained in the first duct parts 83, 85 is employed. In contrast to these, a recess part recessed in the vertical direction from the arrangement position of the meshes 7177, D17, F17, 837, 857 may be formed in the duct parts 717, 717B and the first duct parts D1, F1, 83, 85, thus providing a configuration in which the fragments (dust)

captured by the meshes 7177, D17, F17, 837, 857 drop within the recess part and therefore are securely prevented from being scattered.

In the third embodiment, the opening D16 located at the terminal end of the first duct part D1 in the light source device 41D is covered by the mesh D17 located on the side opposite to the first direction B1, and the mesh D22 is arranged in the opening D21 located at the terminal end of the second duct part D2. Also, in the fourth embodiment, the meshes F17, F22 are provided respectively in the opening F16 located at the terminal end of the first duct part F1 and the opening F21 located at the terminal end of the second duct part F2 in the light source device 41F. Moreover, in the fifth embodiment, the mesh H4 is provided in the exhaust port H3 of the integrating part H1 in the light source device 41H. Then, with these configurations, dust such as fragments of the light source lamp 411 is restrained from being scattered out of the air guide parts 418, 418F, 418H. However, such structures with a mesh to restrain the scattering of the dust from the openings and the exhaust port are not limiting. For example, a configuration in which the openings D16, D21, F16, F21 and the exhaust port H3 are closed by a shutter when the light source devices 41D, 41F, 41H are detached from the light source accommodation section 471, and in which the openings D16, D21, F16, F21 and the exhaust port H3 are opened when the light source devices 41D, 41F, 41H are loaded in the light source accommodation section 471, may be employed. In this case, for example, a configuration in which, when the lamp cover 2A1 is loaded on the top surface part 2A, an operating member such as a button or lever provided on the light source devices 41D, 41F, 41H is pressed by the lamp cover 2A1, thus moving the shutter in the opening direction to open the openings D16, D21, F16, F21 and the exhaust port H3, whereas the shutter is moved in the closing direction to close the openings D16, D21, F16, F21 and the exhaust port H3 when the lamp cover 2A1 is detached, can be employed. Also, a mesh may be provided according to the openings and the exhaust port. The arrangement position of the mesh may be inside the openings and the exhaust port, as described above, or may be upstream or downstream in the circulating direction of the air passing through the openings.

In the sixth embodiment, the opening 836 located at the terminal end of the first duct part 83 of the dust collecting member 8 is covered by the mesh 837 located on the side opposite to the first direction C1, and the mesh 842 is arranged in the opening 841 located at the terminal end of the second duct part 84. Also, in the seventh embodiment, the meshes 857, 862 are provided respectively in the opening 856 located at the terminal end of the first duct part 85 of the dust collecting member 8N and in the opening 861 located at the terminal end of the second duct part 86. Moreover, in the eighth embodiment, the mesh 873 is provided in the exhaust port 872 of the integrating part 87 of the dust collecting member 8Q. Then, with these configurations, the dust such as the fragments of the light source lamp 411 is restrained from being scattered out of the dust collecting members 8, 8N, 8Q. However, such structures with a mesh to restrain the scattering of the dust from the openings and the exhaust port are not limiting. For example, a configuration in which the openings 836, 841, 856, 861 and the exhaust port 872 are closed by a shutter when the dust collecting members 8, 8N, 8Q are detached from the exterior casing 2, and in which the openings 836, 841, 856, 861 and the exhaust port 872 are opened when the dust collecting members 8, 8N, 8Q are loaded in the exterior casing 2, may be employed. In this case, for example, a configuration in which, when the lamp cover 2A1 is loaded on the top surface part 2A, an operating member such as a button or lever provided on the dust collecting members 8, 8N, 8Q is pressed by the lamp cover 2A1, thus moving the shutter in the opening direction to open the openings 836, 841, 856, 861 and the exhaust port 872, whereas the shutter is moved in the closing direction to close the openings 836, 841, 856, 861 and the exhaust port 872 when the lamp cover 2A1 is detached, can be employed. Also, a mesh may be provided according to the openings and the exhaust port. The arrangement position of the mesh may be inside the openings and the exhaust port, as described above, or may be upstream or downstream in the circulating direction of the air passing through the openings.

In the sixth to eighth embodiments, the dust collecting members 8, 8N, 8Q are attached to the ducts 7L to 7N, 7P to 7R in an attachable/detachable manner, and connect the light source device 41 to the ducts 7L to 7N, 79 to 7R by being attached to these ducts 7L to 7N, 7P to 7R. However, the configurations to which the dust collecting members 8, 8N, 8Q are attached are not limited to the ducts 7L to 7N, 7P to 7R and may be other configurations inside the exterior casing 2. For example, an attachment part to which the dust collecting members 8, 8N, 8Q are attached in an attachable/detachable manner may be provided on an inner surface of the exterior casing 2.

In the respective embodiments, the light source devices 41, 41D, 41F, 41H are configured to have the light source lamp 411, the reflector 412, the parallelizing lens 413, and the housing 141 as a light source casing for accommodating these inside. Such a light source device 41 is not limited to the configuration in which a single light source device is provided in a projector. A plurality of light sources may be provided. In this case, the dust collecting member and the duct may be provided corresponding to each of the light sources, and a configuration in which the air discharged from each light source is gathered through a single duct may be employed.

In the respective embodiments, the image forming devices 4, 4D are formed substantially in an L-shape as viewed from the side of the Y-direction. However, this is not limiting. For example, the image forming device may be formed substantially in a U-shape as viewed from the side of the Y-direction.

In the respective embodiments, the projectors 1, 1B, 1D, 1F, 1H, 1L, 1N, 1Q have the three liquid crystal panels 453 (453R, 453G, 453B). However, this is not limiting. That is, the invention is also applicable to a projector using two or fewer, or four or more liquid crystal panels. Also, the liquid crystal panels that are employed are not limited to the transmission-type liquid crystal panels 453 in which the light incident surface and the light exiting surface are different. A reflection-type liquid crystal panel in which the light incident surface and the light exiting surface are the same may be used. Moreover, as long as it is a light modulation device capable of modulating incident light and thus forming an image corresponding to image information, a light modulation device that does not use liquid crystal, such as a device using a micromirror, for example, a device using DMD (digital micromirror device) or the like, may be used.

In the respective embodiments, the front-type projectors 1, 1B, 1D, 1F, 1H, 1L, 1N, 1Q in which the projection direction of an image and the observation direction of the image are substantially the same are given as examples. However, this is not limiting. For example, the invention is also applicable to a rear-type projector in which the projection direction and the observation direction are opposite to each other.

The present application claim priority from Japanese Patent Application No. 2014-145425 filed on Jul. 15, 2014, No. 2015-014824 filed on Jan. 28, 2015, and No. 2015-014825 filed on Jan. 28, 2015, which is hereby incorporated by reference in its entirety.

REFERENCE SIGNS LIST 1, 1B, 1D, 1I, 1F, 1H, 1L, 1N, 1Q . . . projector, 2 . . . exterior casing, 2E1 . . . exhaust port (casing-side exhaust port), 41, 41D, 41F, 41H . . . light source device, 411 . . . light source lamp, 414 . . . housing (light source casing, 415 . . . main body part, 4151 . . . exhaust ports (outflow port), 4151A . . . opening plane, 417 . . . housing (light source casing), 418, 418F, 418H . . . air guide part, 4182 . . . branching part, 453 (453R, 452G, 453B) . . . liquid crystal panel (light modulation device), 46 . . . projection optical device, 64 . . . fan, 7, 7A to 7I, 7L to 7N, 7P to 7R . . . duct, 711 . . . inlet, 716 . . . branching part, 717, 717B . . . duct part (first duct part), 718 . . . duct part (second duct part), 7171 to 7174 . . . sidewall part, 7176 . . . opening, 7177 . . . mesh, 8, 8N, 8Q . . . dust collecting member, 81 inlet, 82 . . . branching part, 83, 85, D1, F1 . . . first duct part, 831 to 834, 851 to 855, D11 to D14, F11 to F15 . . . sidewall part, 836, 856, D16, F16 . . . opening (first opening), 837, 857, D17, F17 . . . mesh, 84, 86, D2, F2 . . . second duct part, 841, 861, D21, F21 . . . opening (second opening), 87, H1 . . . integrating part, 872, H3 . . . exhaust port, A1, B1, C1 . . . first direction, A2, B2, C2 . . . second direction, S . . . accommodation space.

The invention claimed is:

1. A projector comprising:
a light source device having a light source lamp and a housing for accommodating the light source lamp inside;
a duct through which air discharged from the housing circulates; and
a fan which discharges the air circulating through the duct, to outside the duct;
wherein the housing has an exhaust port for discharging the air in the housing,
the duct includes:
an inlet which faces the exhaust port and introduces the air discharged from the exhaust port into the duct;
a branching part which branches the air introduced from the inlet;
a first duct part which extends along a first direction that is a direction orthogonal to an opening plane connecting an edge of the exhaust port and also heading toward the inlet from the exhaust port, and through which the air introduced from the inlet can circulate via the branching part; and
a second duct part which extends from the branching part, along a second direction intersecting with the first direction, and through which the air introduced from the inlet can circulate via the branching part,
the fan is arranged at a position for sucking the air circulating through the second duct part,
the first duct part includes:
a plurality of sidewall parts forming the first duct part;
an opening which is formed at least in one of the plurality of sidewall parts and through which the air circulating through the first duct part is discharged out of the first duct part; and
a mesh covering the opening.

2. The projector according to claim 1, wherein the opening is a duct-side exhaust port through which the air circulating through the first duct part is discharged out of the duct.

3. The projector according to claim 2, wherein the mesh is arranged in a position substantially orthogonal to the first direction.

4. The projector according to claim 3, wherein the opening is formed in the shape of a slit on one end side of the sidewall part substantially orthogonal to the first direction, of the plurality of sidewall parts, and
the mesh is located on the side opposite to the first direction from the opening.

5. The projector according to claim 1, wherein the first duct part extends along the second direction after extending in the first direction, and
the opening is formed in the sidewall part located on the side of the second direction, of the plurality of sidewall parts, and connects the first duct part to the second duct part.

6. A light source device comprising:
a light source lamp; and
a light source casing in which the light source lamp is accommodated,
wherein the light source casing includes:
a main body part having an accommodation space where the light source lamp is accommodated; and
an air guide part which guides air in the accommodation space to outside,
the main body part has an outflow port through which the air in the accommodation space flows out,
the air guide part includes:
a branching part which branches the air introduced from the outflow port;
a first duct part which extends along a first direction orthogonal to an opening plane connecting an edge of the outflow port, and through which the air introduced into the air guide part can circulate via the branching part; and
a second duct part which extends from the branching part, along a second direction intersecting with the first direction, and through which the air introduced into the air guide part can circulate via the branching part,
the first duct part includes:
a plurality of sidewall parts forming the first duct part;
a first opening which is formed at least in one of the plurality of sidewall parts and allows the air circulating through the first duct part to circulate outside the first duct part; and
a mesh covering the first opening, and
the second duct part includes a second opening which allows the air circulating therein to circulate outside the second duct part.

7. The light source device according to claim 6, wherein the first opening is formed in the sidewall part substantially orthogonal to the first direction, of the plurality of sidewall parts forming the first duct part, and discharges the air circulating through the first duct part, out of the light source casing along the first direction.

8. The light source device according to claim 7, wherein the first opening is formed in the shape of a slit, and
the mesh is located on the side opposite to the first direction from the first opening.

9. The light source device according to claim 6, wherein the mesh is arranged in a position substantially orthogonal to the first direction.

10. The light source device according to claim 6, wherein
the first duct part extends along the second direction after extending in the first direction,
the first opening is formed in the sidewall part located on the side of the second direction, of the plurality of sidewall parts forming the first duct part, and
the mesh is arranged in a position substantially orthogonal to the second direction.

11. The light source device according to claim 10, comprising
an integrating part where the air which has circulated through the first duct part and has passed through the mesh and the air which has circulated through the second duct part are integrated together,
wherein the integrating part has an exhaust port through which the air flowing therein is discharged out of the light source casing.

12. The light source device according to claim 6, wherein the air guide part is provided in attachable/detachable manner to the main body part.

13. A projector comprising:
the light source device according to claim 6;
a light modulation device which modulates light emitted from the light source device;
a projection optical device which projects the light modulated by the light modulation device; and
an exterior casing forming an exterior;
wherein the light source device is arranged in an attachable/detachable manner inside the exterior casing.

14. The projector according to claim 13, comprising
a duct and a fan, each arranged inside the exterior casing,
wherein the exterior casing has a casing-side exhaust port through which inside air is discharged,
the duct connects the air guide part to the casing-side exhaust port, and
the fan is arranged in the duct and discharges the air which has circulated through the air guide part out of the exterior casing from the casing-side exhaust port.

15. A dust collecting member which is used when incorporated in a projector which includes a light source lamp and a light source device having a light source casing for accommodating the light source lamp, and which is to collect dust from air flowing in from the light source casing, the dust collecting member comprising:
an inlet through which air flowing out from an outflow port of the light source casing is introduced;
a branching part which branches the air introduced from the inlet;
a first duct part which extends along a first direction orthogonal to an opening plane connecting an edge of the outflow port, and through which the air introduced from the inlet can circulate via the branching part; and
a second duct part which extends from the branching part, along a second direction intersecting with the first direction, and through which the air introduced from the inlet can circulate via the branching part;
wherein the first duct part includes:
a plurality of sidewall parts forming the first duct part;
a first opening which is formed at least in one of the plurality of sidewall parts and allows the air circulating through the first duct part to circulate outside the first duct part; and
a mesh covering the first opening, and
the second duct part includes a second opening which allows the air circulating therein to circulate outside the second duct part.

16. The dust collecting member according to claim 15, wherein
the first opening is formed in the sidewall part substantially orthogonal to the first direction, of the plurality of sidewall parts forming the first duct part, and discharges the air circulating through the first duct part, out of the dust collecting member along the first direction.

17. The dust collecting member according to claim 16, wherein
the first opening is formed in the shape of a slit, and
the mesh is located on the side opposite to the first direction from the first opening.

18. The dust collecting member according to claim 15, wherein
the mesh is arranged in a position substantially orthogonal to the first direction.

19. The dust collecting member according to claim 15, wherein
the first duct part extends along the second direction after extending in the first direction,
the first opening is formed in the sidewall part located on the side of the second direction, of the plurality of sidewall parts forming the first duct part, and
the mesh is arranged in a position substantially orthogonal to the second direction.

20. The dust collecting member according to claim 19, comprising
an integrating part where the air which has circulated through the first duct part and has passed through the mesh and the air which has circulated through the second duct part are integrated together,
wherein the integrating part has an exhaust port through which the air flowing therein is discharged out of the dust collecting member.

21. A projector comprising:
an exterior casing forming an exterior;
a light source device;
a light modulation device which modulates light emitted from the light source device;
a projection optical device which projects the light modulated by the light modulation device; and
the dust collecting member according to claim 15;
wherein the light source device includes:
a light source lamp; and
a light source casing which accommodates the light source lamp and has an exhaust port through which air that has cooled the light source lamp is discharged, and
the dust collecting member is installed in an attachable/detachable manner in a position inside the exterior casing in which the air discharged from the exhaust port is introduced via the inlet.

22. The projector according to claim 21, comprising
a duct and a fan, each arranged inside the exterior casing, are provided,
wherein the exterior casing has a casing-side exhaust port through which inside air is discharged,
the duct connects the dust collecting member to the casing-side exhaust port, and
the fan is arranged in the duct and discharges the air which has circulated through the dust collecting member out of the exterior casing from the casing-side exhaust port.

* * * * *